United States Patent [19]

Fujino

[11] Patent Number: 5,546,382
[45] Date of Patent: Aug. 13, 1996

[54] COMMUNICATION METHOD AND COMMUNICATIONS CONTROL APPARATUS IN CIRCUIT SWITCHING NETWORK

[75] Inventor: Nobutsugu Fujino, Kawasaki, Japan

[73] Assignee: Fujitsu Limited, Kanagawa, Japan

[21] Appl. No.: 294,748

[22] Filed: Aug. 23, 1994

[30] Foreign Application Priority Data

Oct. 21, 1993 [JP] Japan .................................. 5-285622

[51] Int. Cl.$^6$ .................................................. H04L 12/64
[52] U.S. Cl. ............................ 370/24; 370/60.1; 370/80; 370/110.1; 370/118; 379/59; 379/190; 375/240; 371/32
[58] Field of Search .......................... 370/24, 58.1, 58.2, 370/60.1, 79, 80, 110.1, 118; 379/58, 59, 63, 90, 93, 94, 190, 191, 97, 192, 193; 371/32, 34, 35; 375/240, 241, 222; 455/33.1

[56] References Cited

U.S. PATENT DOCUMENTS

| | | | |
|---|---|---|---|
| 5,027,376 | 6/1991 | Friedman et al. | 375/240 |
| 5,163,055 | 11/1992 | Lee et al. | 371/32 |
| 5,249,185 | 9/1993 | Kanno et al. | 370/60 X |
| 5,333,134 | 7/1994 | Ishibashi et al. | 370/110.1 X |

*Primary Examiner*—Douglas W. Olms
*Assistant Examiner*—Russell W. Blum

[57] ABSTRACT

A communication control unit connecting a terminal and a network temporarily disconnects a circuit of the network without ending a session, when no data is received from the network or when no data is transmitted to the network. In response to an occurrence of the transmitted data in the terminal or in response to an occurrence of a request for the connection of the circuit, the temporarily disconnected circuit is re-connected so that the session is resumed.

35 Claims, 57 Drawing Sheets

① PASSAGE OF PREDETERMINED TIME OR DETECTION OF SPECIFIED TRANSMITTED DATA SEQUENCE

② PASSAGE OF PREDETERMINED TIME OR DETECTION OF SPECIFIED RECEIVED DATA SEQUENCE

① TRANSMISSION OF SPECIFIED DATA SEQUENCE
② RECEPTION OF SPECIFIED DATA SEQUENCE

① TIME-OUT OF SESSION HOLDING TIME
② TIME-OUT OF SESSION HOLDING TIME

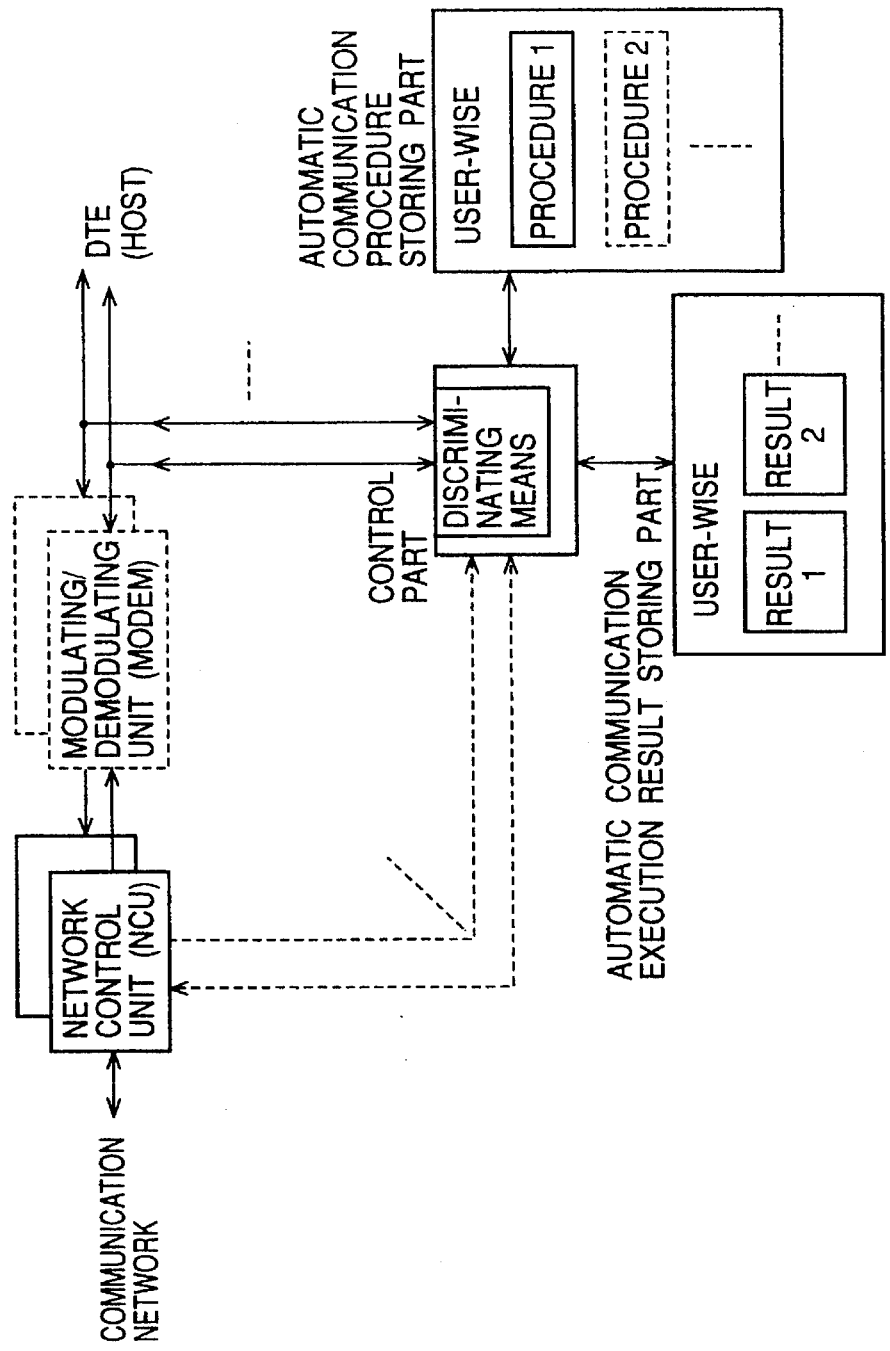

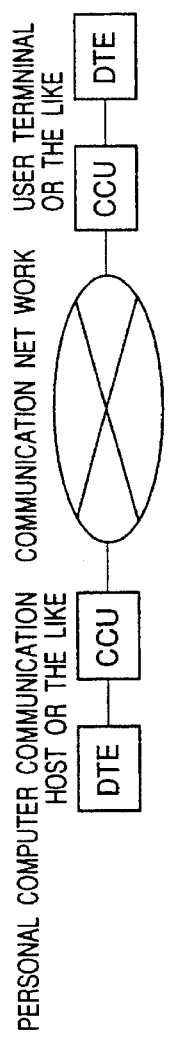
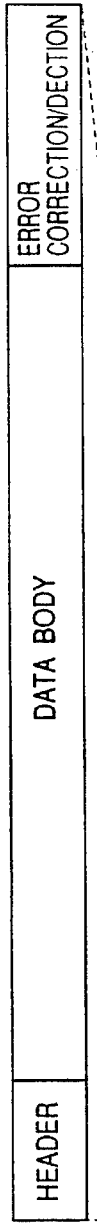
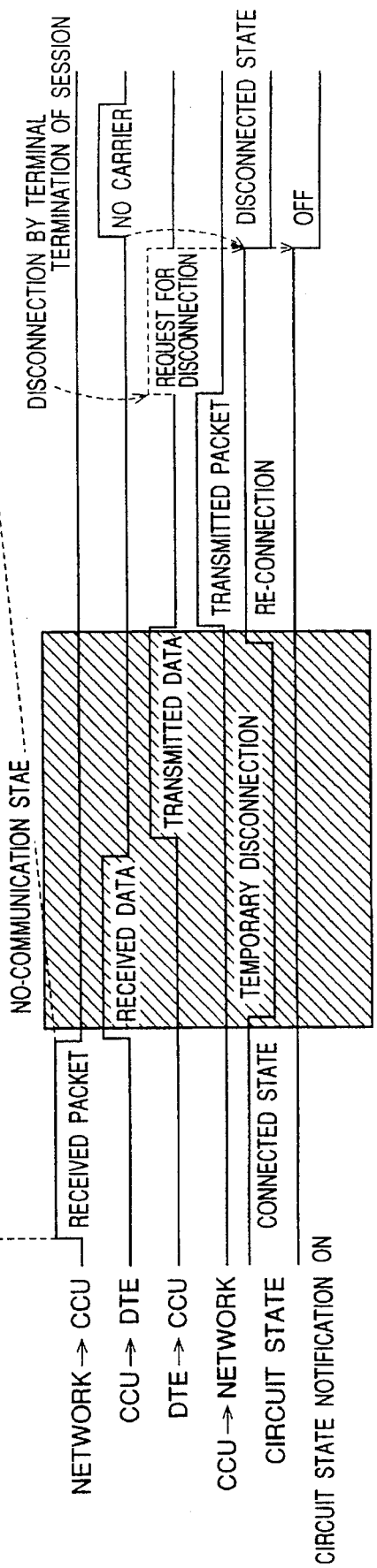
FIG.18A
FIG.18B

FIG.39

| MODE | BUFFER GATE | | | |
|---|---|---|---|---|
| | 31 | 32 | 33 | 34 |
| H1=T4 | 1 | 0 | 0 | 1 |
| H2 | 1 | 0 | 0 | 0 |
| H3=T1 | 0 | 0 | 1 | 0 |
| H4 | 0 | 1 | 0 | 0 |
| H2 | 0 | 1 | 1 | 1 |
| H3 | 0 | 1 | 0 | 1 |

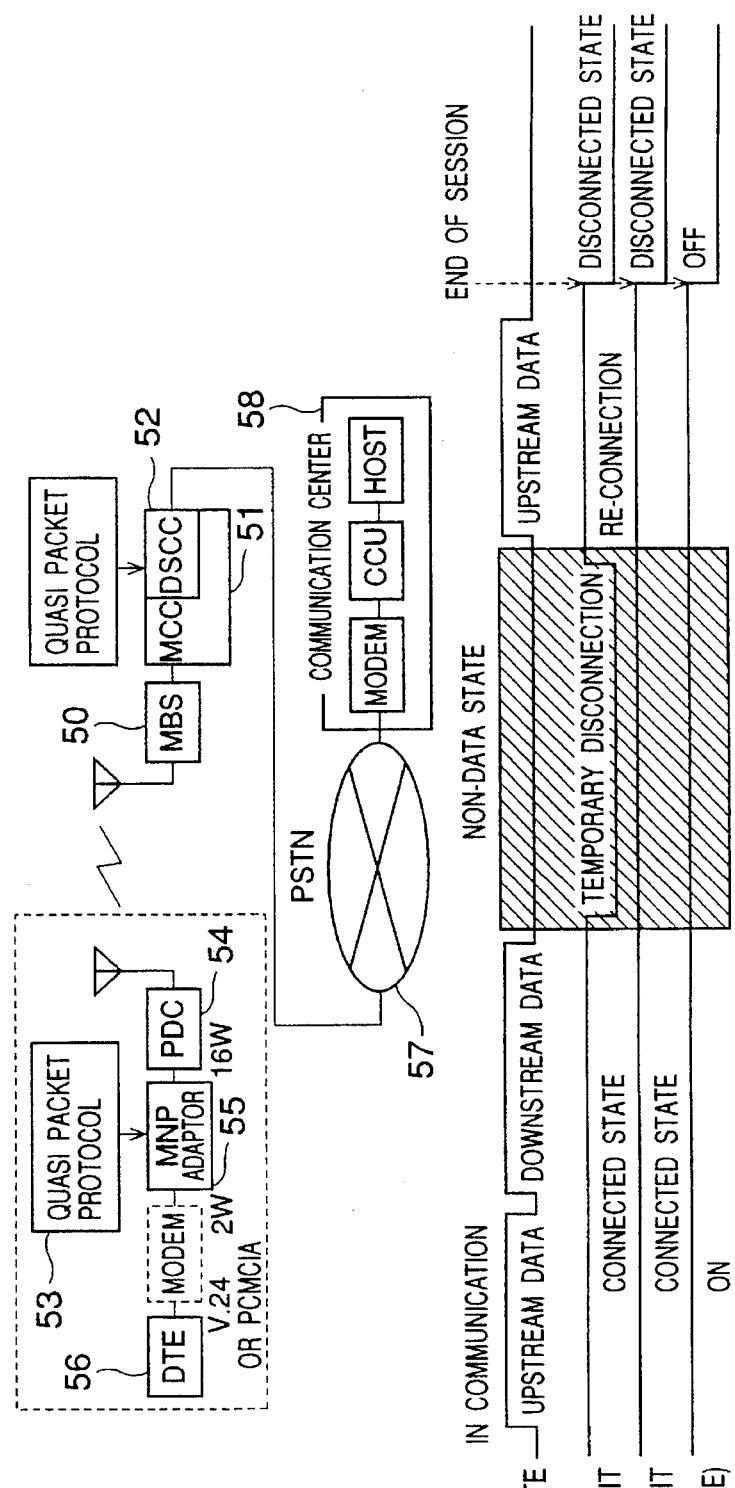

FIG.53

| BLANK TIME | FREQUENCY | SUBTOTAL OF BLANK TIME | CUMULATIVE BLANK TIME |
|---|---|---|---|
| 0.1 SEC | 6 | 0.6 SEC | 0.6 SEC |
| 0.2 | 12 | 2.4 | 3.0 |
| 0.3 | 15 | 4.5 | 7.5 |
| 0.4 | 3 | 1.2 | 8.7 |
| 0.5 | 2 | 1.0 | 9.7 |
| 0.6 | 1 | 0.6 | 10.3 |
| 0.8 | 1 | 0.8 | 11.1 |
| 0.9 | 2 | 1.8 | 12.9 |
| 1.0 | 4 | 4.0 | 16.9 |
| 1.1 | 1 | 1.1 | 18.0 |
| 1.6 | 1 | 1.6 | 19.6 |
| 1.9 | 1 | 1.9 | 21.5 |
| 2.2 | 1 | 2.2 | 23.7 |
| 4.9 | 1 | 4.9 | 28.6 |
| 6.2 | 1 | 6.2 | 34.8 |
| 11.6 | 1 | 11.6 | 46.4 |
| 11.7 | 1 | 11.7 | 58.1 |
| 28.9 | 1 | 28.9 | 87.0 |

---- TELETERMINAL
—— CELLULAR
—·— CELLULAR+PRESENT INVENTION

FIG.56

| BLANK TIME | FREQUENCY | SUBTOTAL | CUMULATIVE BLANK TIME |
|---|---|---|---|
| 0.1 SEC | 0 | 0.0 SEC | 0.0 SEC |
| 0.2 | 16 | 3.2 | 3.2 |
| 0.3 | 11 | 3.3 | 6.5 |
| 0.4 | 5 | 2.0 | 8.5 |
| 0.5 | 5 | 2.5 | 11.0 |
| 0.6 | 6 | 3.6 | 14.6 |
| 0.7 | 4 | 2.8 | 17.4. |
| 0.8 | 4 | 3.2 | 20.6 |
| 0.9 | 3 | 2.7 | 23.3 |
| 1.0 | 0 | 0.0 | 23.3 |
| 1.1 | 0 | 0.0 | 23.3 |
| 1.2 | 2 | 2.4 | 25.7 |
| 1.3 | 1 | 1.3 | 27.0 |
| 1.4 | 1 | 1.4 | 28.4 |
| 1.5 | 0 | 0.0 | 28.4 |

5,546,382

COMMUNICATION METHOD AND COMMUNICATIONS CONTROL APPARATUS IN CIRCUIT SWITCHING NETWORK

BACKGROUND OF THE INVENTION

The present invention relates to a communication method and a communications control apparatus adapted for circuit switching networks in which a user is charged with a relatively high communication fee, examples of such circuit switching networks being an automobile telephone network or a portable telephone network, wherein a user pays a charge in accordance with the connect time.

FIG. 1 is a diagram explaining the data communication using a conventional circuit switching network. Specifically, FIG. 1 shows the data flow observed from the user terminal when a personal computer communication is carried out via a modem having a built-in network control unit (NCU). In the figure, DTE indicates a terminal; CCU a communication control unit (or DCE: data circuit terminal equipment). CCU and the terminal of the personal computer communication host are connected to CCU and the terminal of the user via a communication network.

As shown in FIG. 1, when observed from the user side, the user remains connected to the circuit even when there is no communication data (no-data state), this being so until the user terminal issues a disconnection instruction or the circuit is disconnected from the user.

When the network disconnects the circuit from the user, it either turns off a carrier detection signal (CD) or transmits a character string "NO CARRIER" to the terminal so as to notify the terminal of the circuit disconnection.

Hence, there is a problem that, in circuit switching networks in which a user is charged with a relatively high communication fee such as an automobile telephone network or a portable telephone network, the circuit is used in a wasteful manner because the user is charged even when there is no data to be transmitted or received.

SUMMARY OF THE INVENTION

Accordingly, a general object of the present invention is to prevent the user from being charged when the data is absent and to achieve an economical data communication on a circuit switching network.

Another and more specific object of the present invention is to provide a communication method of a circuit switching network wherein a communication control unit connecting a first terminal with a network temporarily disconnects a circuit of the network without ending a session, when no data is received from the network or when no data is to be transmitted to the network, and re-connects the circuit that had been temporarily disconnected so that the session is resumed, when data to be transmitted is produced in the first terminal or when there is a request from a second terminal for a connection of the circuit.

According to the communication method of the present invention, the circuit is automatically disconnected when no data is transmitted or received. Hence, an economical data communication is possible. It will also be appreciated that, even in a manual communication, the communication control unit automatically disconnects the circuit temporarily, without the intervention of the user. The user is required to be less attentive during the communication, and thus can benefit from a larger degree of convenience.

Still another object of the present invention is to provide a communication control unit comprising transmitted/received data state monitoring means for monitoring the presence/absence of data received from a network and data transmitted to the network; circuit connection/re-connection means for disconnecting and connecting a circuit in the network; and control part for temporarily disconnecting a circuit in the network by means of the circuit connection/re-connection means when there is no data to be transmitted or when no data is received, while maintaining the session and keeping the other circuits connected, the temporary disconnection being performed on the basis of the monitoring result of the transmitted/received data state monitoring means, and for re-connecting the circuit that had been disconnected, when the data to be transmitted is produced by a terminal or when there is a request for a re-connection of the circuit from the distant terminal.

According to the communication control unit of the present invention, there is no need to provide modifications to the user terminal software and the host terminal software, thus increasing the convenience for the user and improving the efficiency in the communication.

BRIEF DESCRIPTION OF THE DRAWINGS

Other objects and further features of the present invention will be apparent from the following detailed description when read in conjunction with the accompanying drawings, in which:

FIG. 17 is a diagram explaining the principle (construction of a unit managing automatic communication for multiple users) of the present invention;

FIG. 18 is a diagram explaining the principle (procedure wherein data is turned into a packet) of the present invention;

FIG. 39 is a diagram showing settings of buffer gates in the unit of FIG. 38;

FIG. 52 illustrates an application of the present invention to certain network sections;

FIG. 53 is a diagram showing the distribution of the blank time in a normal communication;

FIG. 56 is a diagram showing the distribution of the blank time in the automatic communication.

DESCRIPTION OF THE PREFERRED EMBODIMENTS

A description will first be given, with reference to FIGS. 2–4, of the basic operation of the present invention. This basic operation is designed to prevent the user from being charged with a communication fee when no data is transmitted or received after a session (communication) is started between terminals so as to achieve an economical data communication on a circuit switching network used.

Figure 1A:
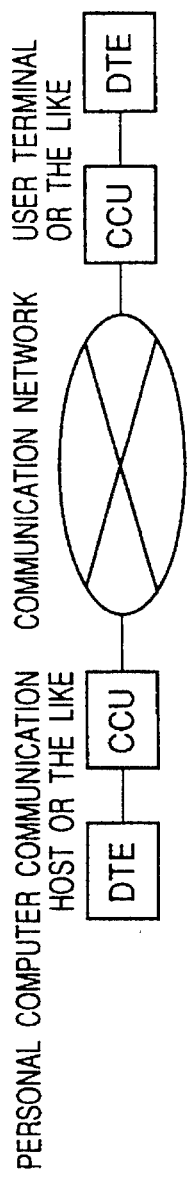
FIG. 1 is a diagram explaining a conventional communication such as a personal computer communication.
Figure 1B:
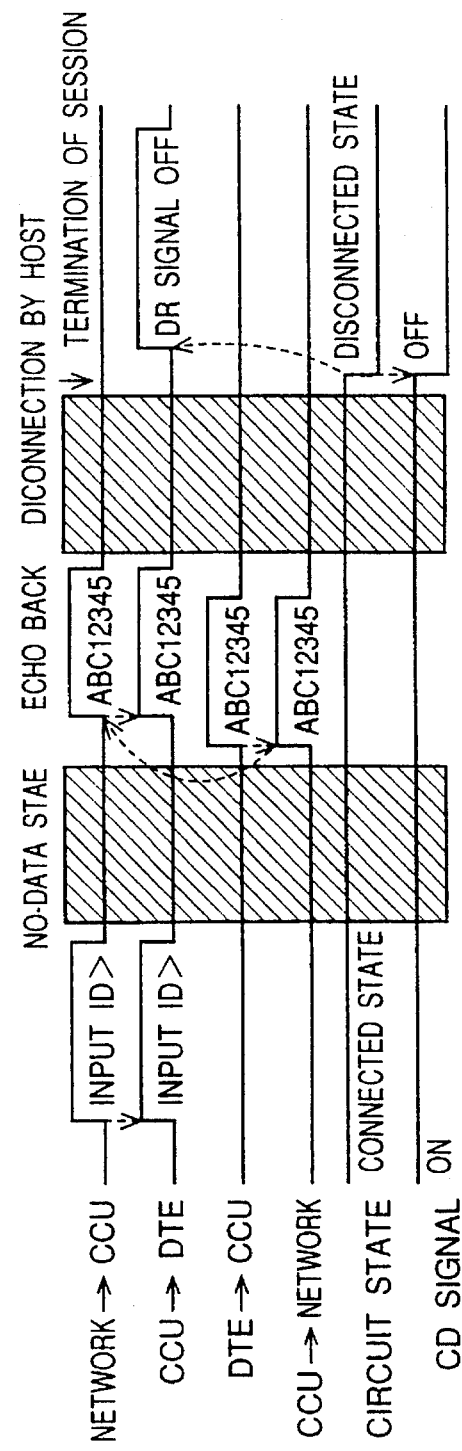
Figure 2A:
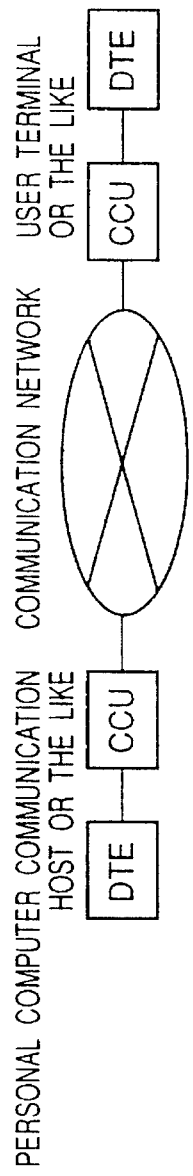
FIG. 2 is a diagram explaining the principle (concept of temporary disconnection and re-connection) of the present invention.
Figure 2B:
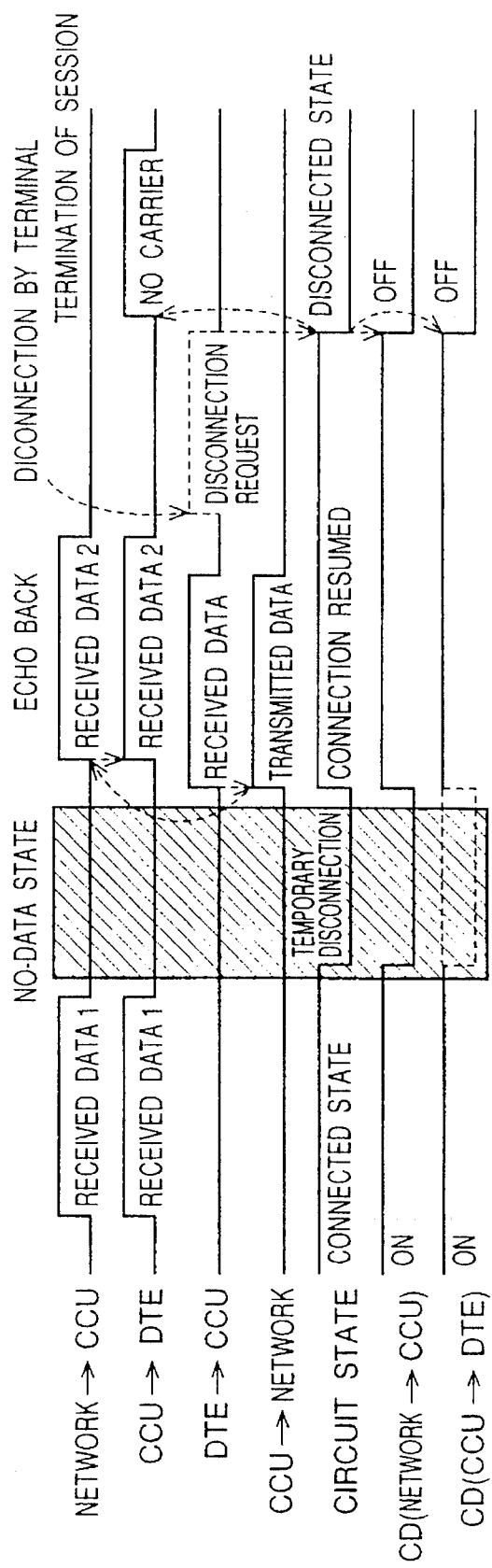

As shown in FIG. 2, the communication system according to the present invention generally includes a communication network; terminals for carrying out a communication via the communication network (hereinafter, the host of the personal computer communication and the user terminal are assumed in the description); and a communication control unit (CCU) for connecting a terminal to the communication terminal. In the case of an analog circuit, the communication control unit includes a modem unit having a built-in network control unit (NCU). A disconnection request by the terminal may be inserted as a command in a transmitted data, as indicated by a dotted line in FIG. 2, or may be transmitted via a control line.

Figure 3:
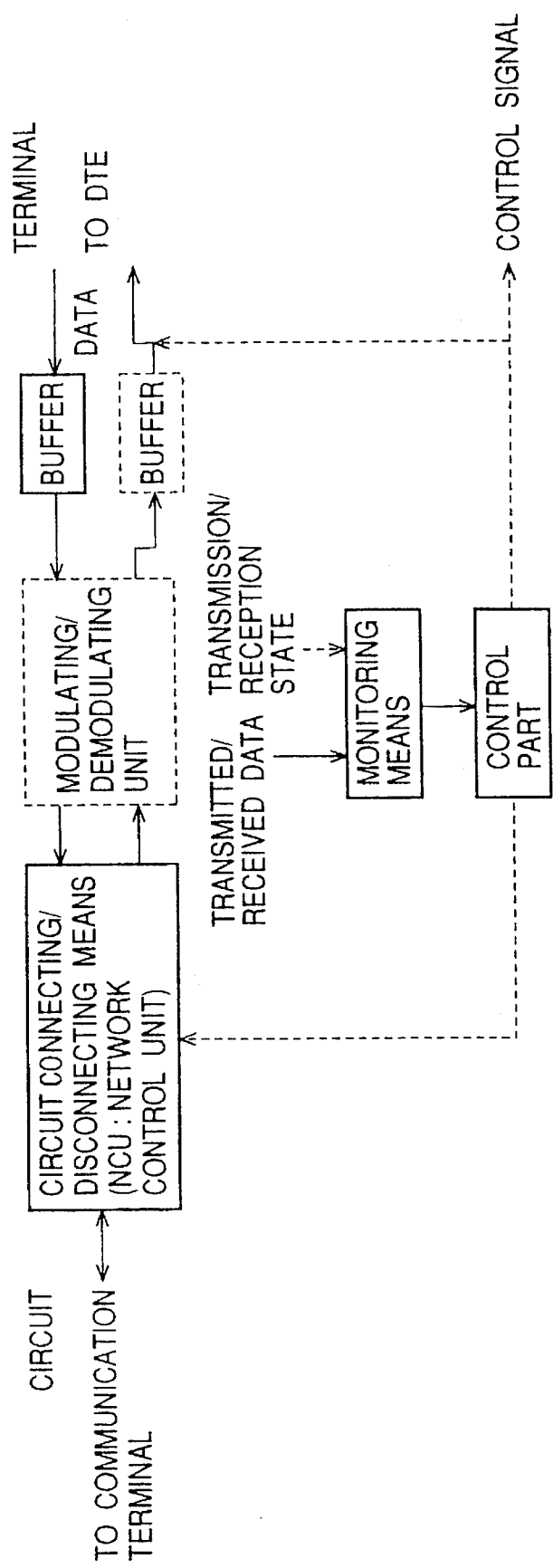
FIG. 3 is a diagram explaining the principle (configuration of a unit which implements basic temporary disconnection and re-connection procedures)

FIG. 3 shows the communication control unit according to the present invention. As shown in FIG. 3, the communication control unit (more specifically, the NCU) includes a monitoring means, a control unit and a transmission/reception buffer. In the case of an analog circuit, there is needed a modulating/demodulating unit as indicated by a dotted line in FIG. 3. The modulating/demodulating unit may be provided between the communication control unit and the terminal equipment unit (DTE). Notification of the connection state to the terminal may be conducted via a signal line, as shown in FIG. 3, or the data indicating the state may be inserted in the received data on the communication line.

Figure 4:
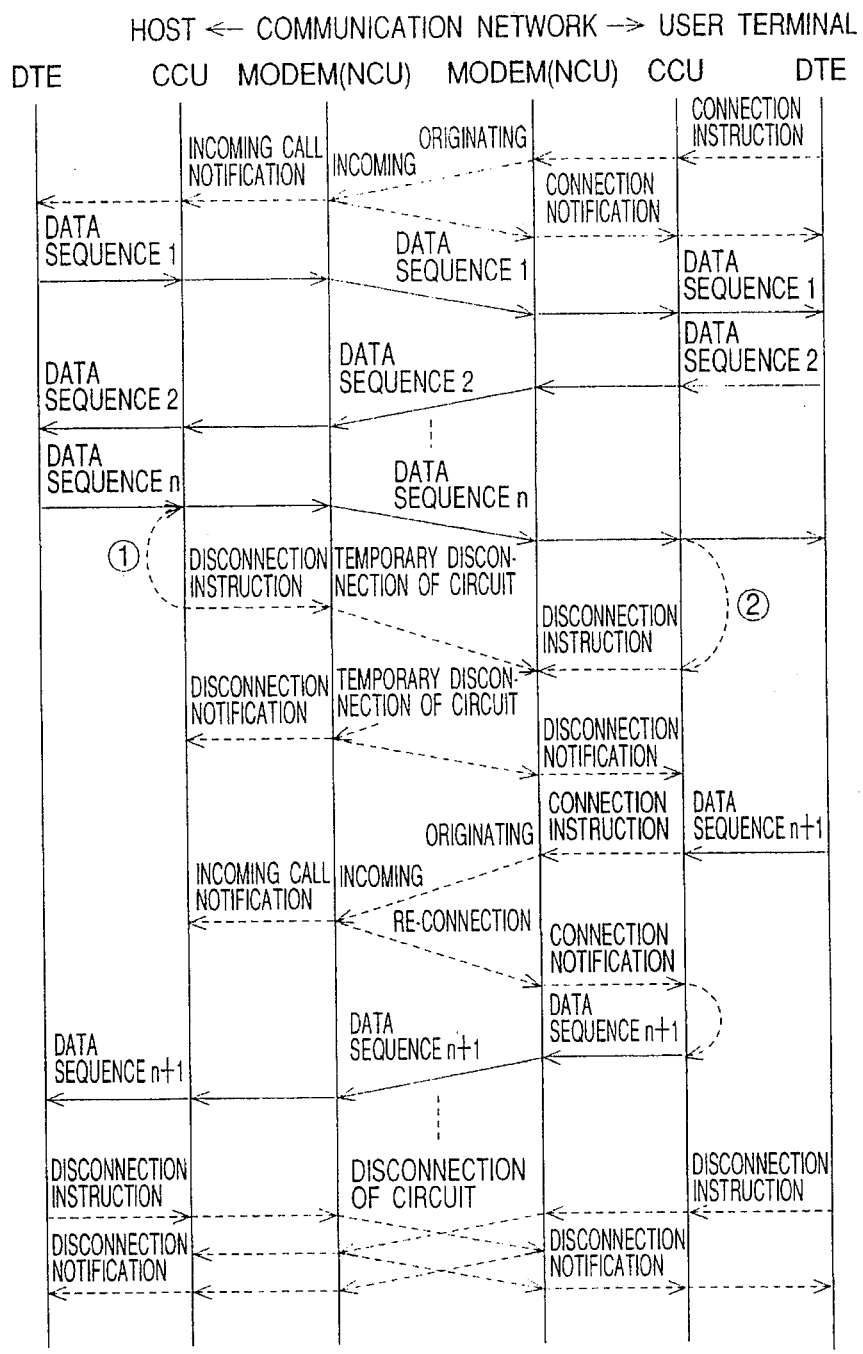
FIG. 4 is a diagram explaining the principle (sequence of a basic procedure) of the present invention.

FIG. 4 explains the basic operation of the present invention, showing an example of sequence of processes executed between the host and the user. While the modem (NCU) and the communication control unit are shown as separate units in FIG. 4 for the sake of description, the modem may be included in the communication control unit.

Referring to FIG. 4, when the user terminal issues a connect request to the user communication control unit, the user modem makes a call. When the call is received by the host modem, the host communication control unit and the host terminal is notified of the call, while the user terminal is notified of the establishment of the call. Data transmission/reception is repeated thereafter such that, for example, the host terminal transmits a data sequence 1 to the user terminal, and the user terminal transmits a data sequence 2 to the host terminal. It is supposed that the host terminal and the user terminal has no data to be transmitted after the host terminal has transmitted the data sequence n.

In the communication method of the present invention, the circuit is temporarily disconnected in a no-data state (for example, when the transmitted/received data does not exist for a predetermined period of time). In the example shown in FIG. 4, the host communication control unit detects a non-data state after a predetermined period of time has elapsed in which there is no transmission or reception, and instructs the host modem to disconnect the circuit (① in FIG. 4). The user communication control unit detects a non-data state after a predetermined period of time has elapsed in which there is no transmission or reception, and instructs the user modem to disconnect the circuit (② in FIG. 4). The circuit disconnection instruction is sent from the host modem and the user modem to the host communication control unit and the user communication control unit, respectively. The host communication control unit and the user communication control unit do not provide a disconnection notification to the host terminal and the user terminal, respectively. Accordingly, the host terminal and the user terminal do not recognize the circuit disconnection, and the session remains active.

When transmission data is produced in the terminal during this temporary disconnection state of the circuit, the circuit is reconnected. For example, in FIG. 4, a data sequence n+1 which is to be transmitted is produced in the user terminal, and the same sequence is transmitted from the user terminal to the user communication control unit. The user communication control unit then stores the data sequence n+1 and instructs the user modem to re-establish a connection with the circuit, whereupon the data sequence n+1 is transmitted to the host. While a notification of completion of re-connection is given to the user communication control unit, and a notification of reception of a call is given to the host communication control unit, the user terminal and the host terminal are not notified of the re-connection. Hence, the user terminal and the host terminal do not recognize the temporary disconnection of the circuit in the communication network and the subsequent re-connection, and operates on the assumption that a session is maintained active even after the transmission/reception of the data sequence n in the above example.

In case the host is not capable of issuing a call to the user terminal, the reconnection of the circuit of the network has to wait until the user executes the re-connection of the circuit.

As has been described, the terminals are not notified of the disconnection of the circuit and are made to recognize that the circuit is being connected even when it is temporarily disconnected. Further, the notification of completion of a re-connection and the notification of reception of a call upon completion of the re-connection are not given to the user terminal and the host terminal, respectively.

While, in the above description, it is assumed that the terminals are not notified of the temporary circuit disconnection and the subsequent re-connection, the terminals may be notified of the same if communication software of the terminals is configured to recognize the meaning of the temporary disconnection and the re-connection and to maintain a session during the temporary disconnection of the circuit. In this case, the terminals recognize that the session is maintained active even when they are notified of the temporary disconnection or the re-connection.

When there occurs a circuit disconnection request from the terminal in order to end a session, the circuit is disconnected, and the terminals are notified of the circuit disconnection.

In the above example, the temporary disconnection of the circuit is carried out by making a determination of an absence of the transmitted/received data when a state in which no data is transmitted or received has lasted for a predetermined period of time. In data communication like a personal computer communication, there may be produced an absence of transmission/reception of data between the terminals for a certain period of time during a predetermined process executed in response to the reception of a specific data sequence (for example, a data sequence for instruction of an execution of a specific process). In such a case, a determination of an absence of transmitted/received data may be made and the circuit may be temporarily disconnected.

In the communication method of an embodiment, a monitoring means of the communication control unit monitors the status of the transmitted data and the received data. When the above-mentioned specific data sequence is received during an absence of the transmitted data, the control unit disconnects the network circuit by means of a circuit connecting/disconnecting means. When the specific data sequence is transmitted during an absence of the received data, the network circuit is disconnected. As a result of this, the communication circuit may be temporarily disconnected so that the usage amount of the circuit is reduced until the next transmitted data is produced after the predetermined process based on the reception of this specific data sequence is completed.

The above-mentioned specific data sequence may be predetermined and set in the communication control unit. Alternatively, the data sequence may be learned. The communication method is configured such that the data sequence is learned, and the circuit of the network is temporarily disconnected when the data sequence learned is received. That is, the control unit (or a learning means in the control unit) learns that an absence of transmitted/received data for a predetermined period of time follows the reception or transmission of the specific data sequence. Once this learning process is completed, the circuit is disconnected after the reception or transmission of the specific data sequence.

Discrimination of a Plurality of Sessions

In the above described invention, there is a problem with a 1:n communication wherein a station such as a personal computer communication center (host station) communicates with a plurality of user terminals. In the 1:n communication, it is impossible to discriminate between sessions when a communication is restarted after the circuit is re-connected, and it is impossible for the host to determine to which terminal (port) the re-connected circuit should be connected to so that a proper restart of the communication session cannot be performed.

Figure 5:
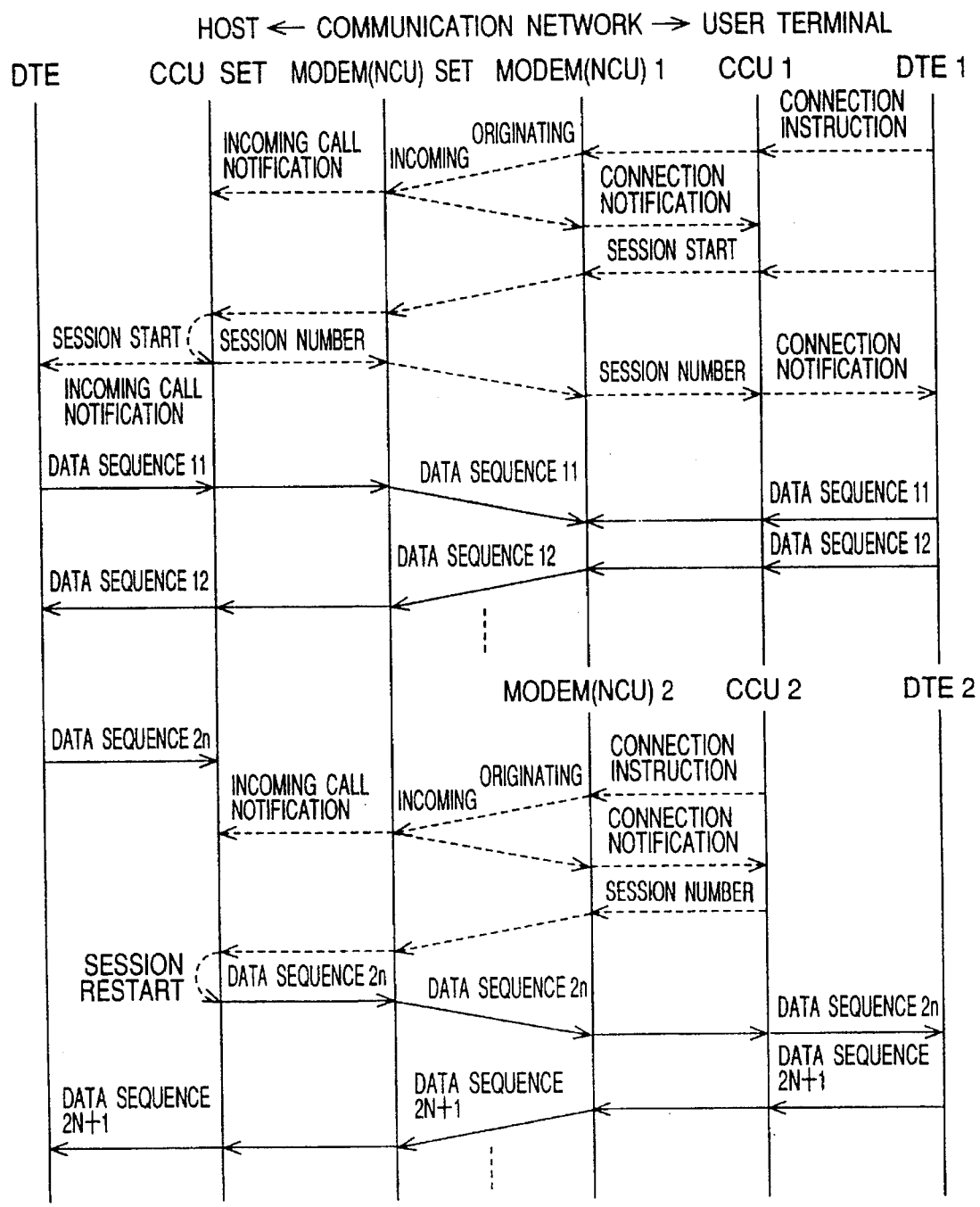
FIG. 5 is a diagram explaining the principle (sequence of a procedure wherein multiple sessions are managed) of the present invention.
Figure 6:
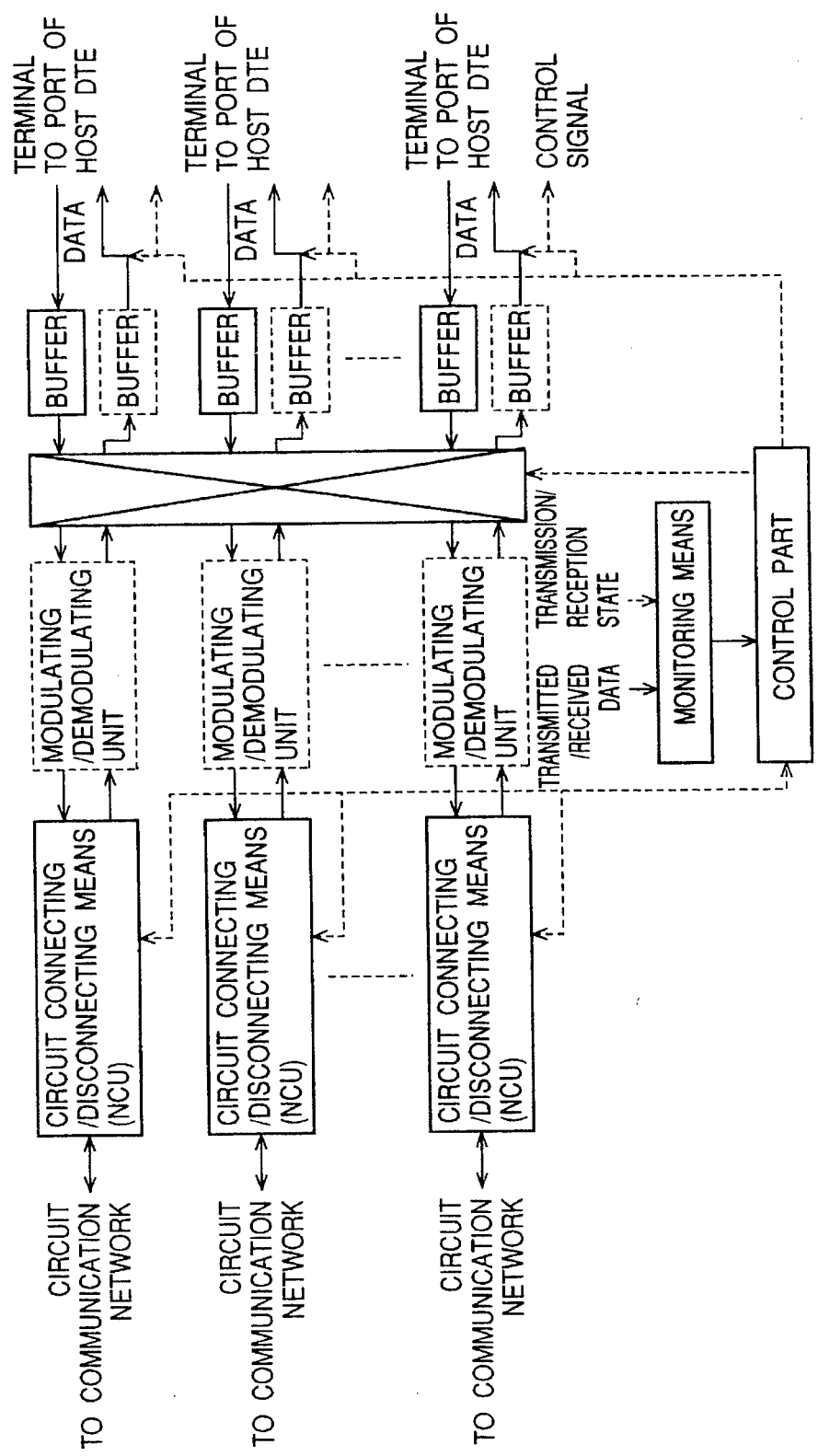
FIG. 6 is a diagram explaining the principle (multiple unit construction) of the present invention.

The communication method and the communication control unit of another embodiment resolves this problem. FIG. 5 shows the principle of operation thereof; and FIG. 6 shows the construction of the communication control unit (or units).

As shown in FIG. 5, a communication control unit originating a call (in this example, a user communication control unit) transmits, when a new connection is established (in other words, when a new session is started), a code indicating a start of a session to a communication control unit with (in this case, the host communication control unit) which the call-originating communication control unit is to communicate. Upon receipt of the code, the host communication control unit assigns a session number (a number enabling a discrimination between sessions) to the session to be started, and returns the session number to the user communication control unit. Upon receipt of this code, the user communication control unit notifies the user terminal of the establishment of connection. Thereafter, the same procedure as the other procedures are executed.

When the circuit is re-connected after a temporary disconnection, the call-originating user communication control unit sends the session number. Upon receipt of the session number, the call-receiving host communication control unit recognizes which session should be restarted, and controls a switchboard so as to restart the session such that the user terminal is connected to the same host terminal as before the temporary disconnection. Thereupon, the session between the user terminal and the host terminal is restarted.

Termination of a Session

In the above described inventions, there is a problem that the termination of a session can only be executed by the call-originating terminal (not by the network or the call-receiving terminal). There is also a problem that the communication control unit cannot notify the terminal connected thereto of the disconnection of the circuit and cannot properly end the session, when the maintenance of a session becomes impossible while the circuit is temporarily disconnected due to an error in the call-receiving terminal or due to an error in the communication network, etc.

Figure 7A:
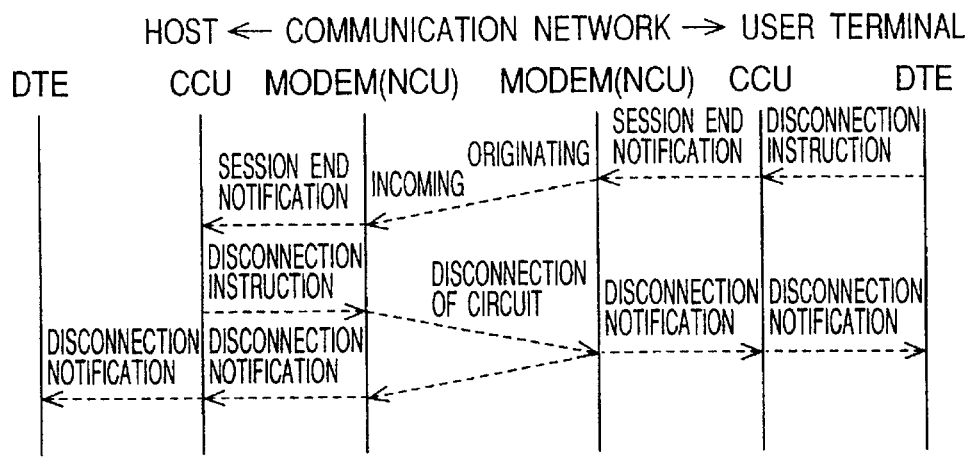
FIG. 7A is a diagram explaining the principle (sequence of a procedure wherein a session is terminated in response to a session end notification) of the present invention.
Figure 7B:
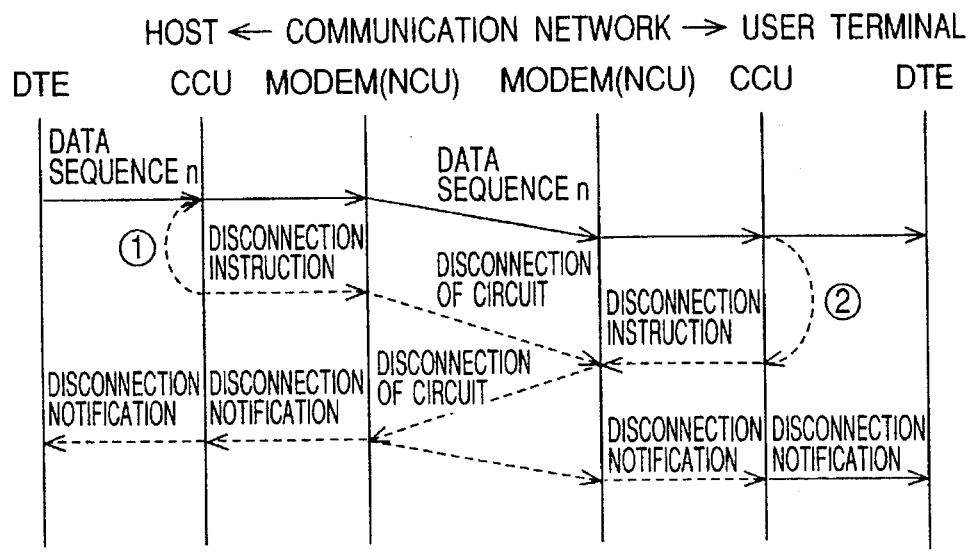
FIG. 7B is a diagram explaining the principle (sequence of a procedure wherein a session is terminated in response to a reception of a specified data sequence) of the present invention.
Figure 8:
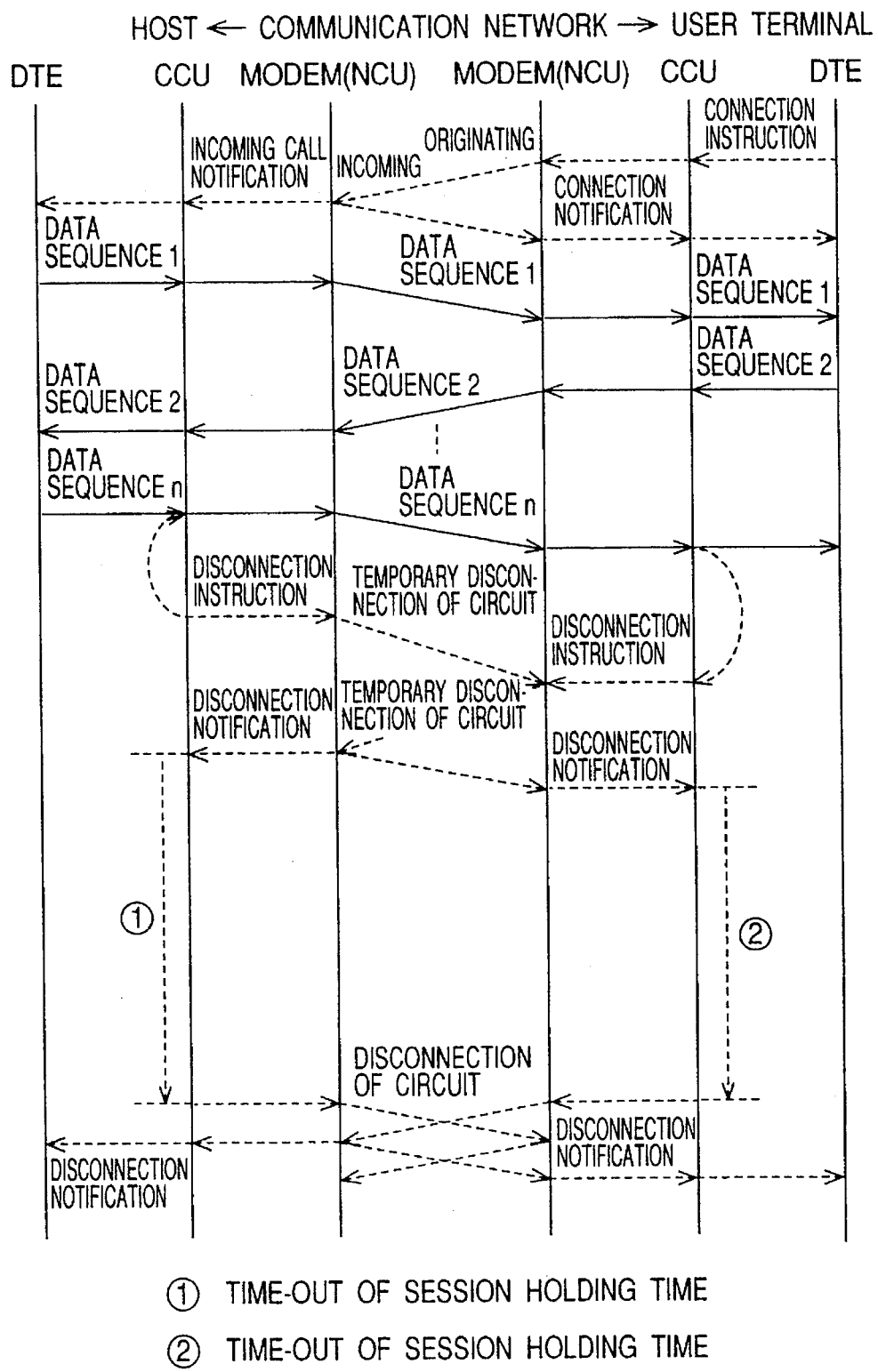
FIG. 8 is a diagram explaining the principle (sequence of a procedure wherein a session is terminated in response to a determination that a time-out of a session holding time has occurred)

The communication method of another embodiment is the method for resolving the above problem. The communication control unit of another embodiment is the unit for resolving the same problem. FIGS. 7A and 7B show examples of sequence of processes and explain the principle of the communication method of yet another embodiment. FIG. 8 shows an example of sequence of processes and explains the principle of the communication method of still another embodiment.

As shown in FIG. 7A, the party which intends to end a session (in the example shown in FIG. 7A) operates such that, when the user communication control unit receives, from the user terminal, an instruction for disconnection, a session end notification is sent to a distant communication control unit (in the example of FIG. 7A, the host communication control unit). Upon receipt of the session end notification, the host communication control unit disconnects or releases the circuit of the network so that the session is forced to end. The host terminal is notified of the disconnection of the circuit. When the user modem detects the disconnection of the circuit, the user communication control unit is notified of the disconnection, whereupon the user communication control unit notifies the user terminal of the disconnection. In this way, both terminals can end the session.

The communication method described above is implemented in the following manner using the construction shown in FIG. 3. The monitoring means monitors received data so as to determine whether or not there is a session end notification. Upon receiving the session end notification from the monitoring means, the control unit gives an instruction for the circuit disconnection to the circuit connecting/disconnecting means (NCU). After the circuit is disconnected, the control unit notifies the terminal of the disconnection.

In data communication such as a personal computer communication, a transmission/reception of a specific data sequence may mean a termination of a session. Hence, the termination of a session may be implemented by transmission/reception of a specific data sequence as in the communication method as claimed in claim 7. FIG. 7B shows an example of sequence of processes and explains the principle of the communication method. As shown in FIG. 7B, the communication control unit, upon reception or transmission of a specific data sequence, disconnects or releases the circuit and forces the session to end. After the circuit is disconnected, the communication control unit notifies the terminal of the disconnection of the circuit. Referring to FIG. 7B, it is assumed that the host transmits a specific data sequence n, whereupon the host communication control unit on the transmitting side and the user communication control unit on the receiving side which receives the specific data sequence n give an instruction for the disconnection of the circuit to NCU (① and ② of FIG. 7B), and notify the respective terminal of the disconnection of the circuit.

When a predetermined period of time has elapsed after the temporary disconnection of the circuit and no transmission or reception occurs during this period of time (that is, a time-out of a session holding time has occurred), it is assumed that the session has been completed. As shown in FIG. 8, when the session is not resumed after a certain period of time (session holding time) in the communication method (①, ② of FIG. 8), the communication control unit notifies the terminal of the disconnection of the circuit.

This communication procedure is implemented such that, in the construction of FIG. 3, the control unit gives an instruction for a disconnection of the circuit to the circuit connecting/disconnecting means (NCU) when a certain period of time has elapsed after the temporary disconnection of the circuit and no transmission or reception takes place during this period of time (that is, a time-out of the session holding time has occurred), and notifies the terminal of the disconnection of the circuit.

Echo Process

Figure 9:
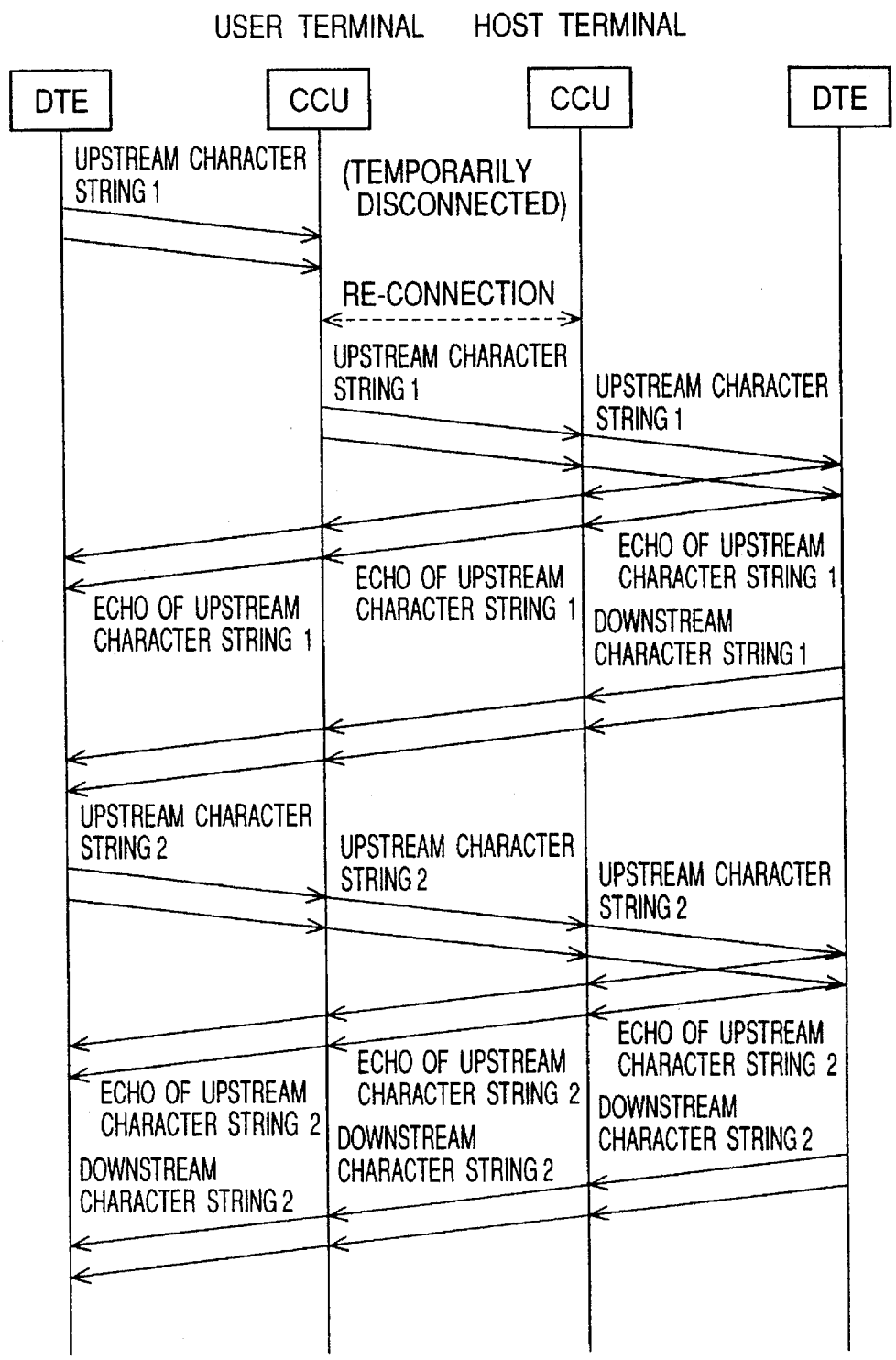
FIG. 9 is a diagram showing a conventional sequence of a procedure wherein echoes are returned.

Conventionally, echoes are returned as shown in FIG. 9. When, in the case in which the communication method of the present invention is applied, the circuit is temporarily disconnected because of an absence of transmitted/received data, and, subsequently, the circuit is reconnected because of an occurrence in the user terminal of data to be transmitted, the user communication control unit re-connects the circuit after the user terminal transfers the data to the user communication control unit. Hence, that data sequence is not echoed back immediately by the host terminal with which the communication had been discontinued by the circuit being temporarily disconnected. It is only after the establishment of the re-connection that the echo is sent by the host terminal. Therefore, if the re-connection takes time (longer than several tens of milliseconds), the call-originating user terminal can not display the data sequence (characters, etc.) to be echoed back during this period of time, giving the user an uncomfortableness.

Figure 10:
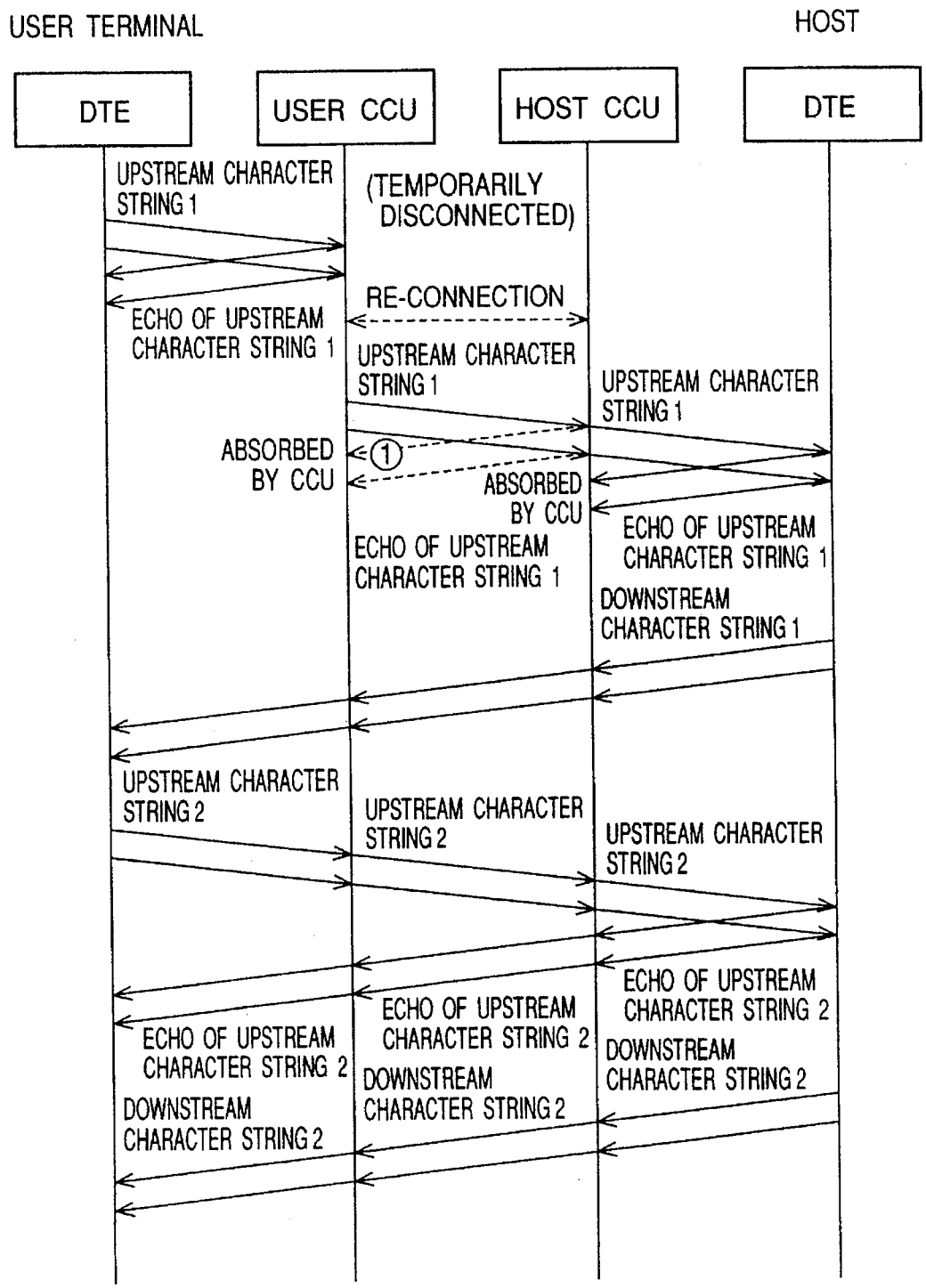
FIG. 10 is a diagram explaining the principle (sequence of a procedure wherein echoes are returned) of the present invention.

The communication method and the communication control unit of yet another embodiment resolve the uncomfortableness suffered by the user during a transit period in which the circuit that had been temporarily disconnected becomes re-connected. FIG. 10 shows an example of communication sequences and explains the principle of the above-mentioned communication method and the communication control unit.

In the example shown in FIG. 10, the user communication control unit of the user terminal echoes character by character a character string 1 corresponding to one upstream line input in the user terminal during a temporary disconnection of the circuit. At the same time as this, the user communication control unit executes a process for re-connecting the circuit. After the re-connection, the user communication control unit sends the upstream character string 1 received from the user terminal to the host terminal.

The host communication control unit of the center host side transfers the upstream character string received from the user side to the host terminal, and receives the corresponding echo (the upstream character string 1) from the host terminal. The host terminal echo of the character string 1 corresponding to the first one line of characters after the re-connection is not sent to the user terminal but is absorbed in the host communication control unit. The subsequent character strings (downstream character string 1, the upstream character string 2...) are literally echoed back by the user side and the host side in a transparent manner.

When the host communication control unit echoes the character string 1 received from the user communication control unit, the user communication control unit may absorb the echo sent from the host communication control unit to the user communication control unit so that the echo will not reach the user terminal ((①) of FIG. 10).

Cancellation of the Temporary Disconnection Procedure in an Automatic Communication Mode If the user terminal is set to an automatic communication mode (a so-called autopilot: a mode in which a predetermined character string is sent or the circuit is connected/disconnected in response to a predetermined character string received in a predetermined sequence), there occurs little non-data state because the process of data transmission/reception is carried out automatically on a constant basis. However, according to the above described invention, a determination as to whether or not the circuit should be disconnected should be made despite the few occurrences of non-data states. Further, if the circuit is temporarily disconnected in the automatic communication mode in spite of the few occurrences of non-data states, there is created a waste of time before the circuit is re-connected and the communication is restarted.

Figure 11:
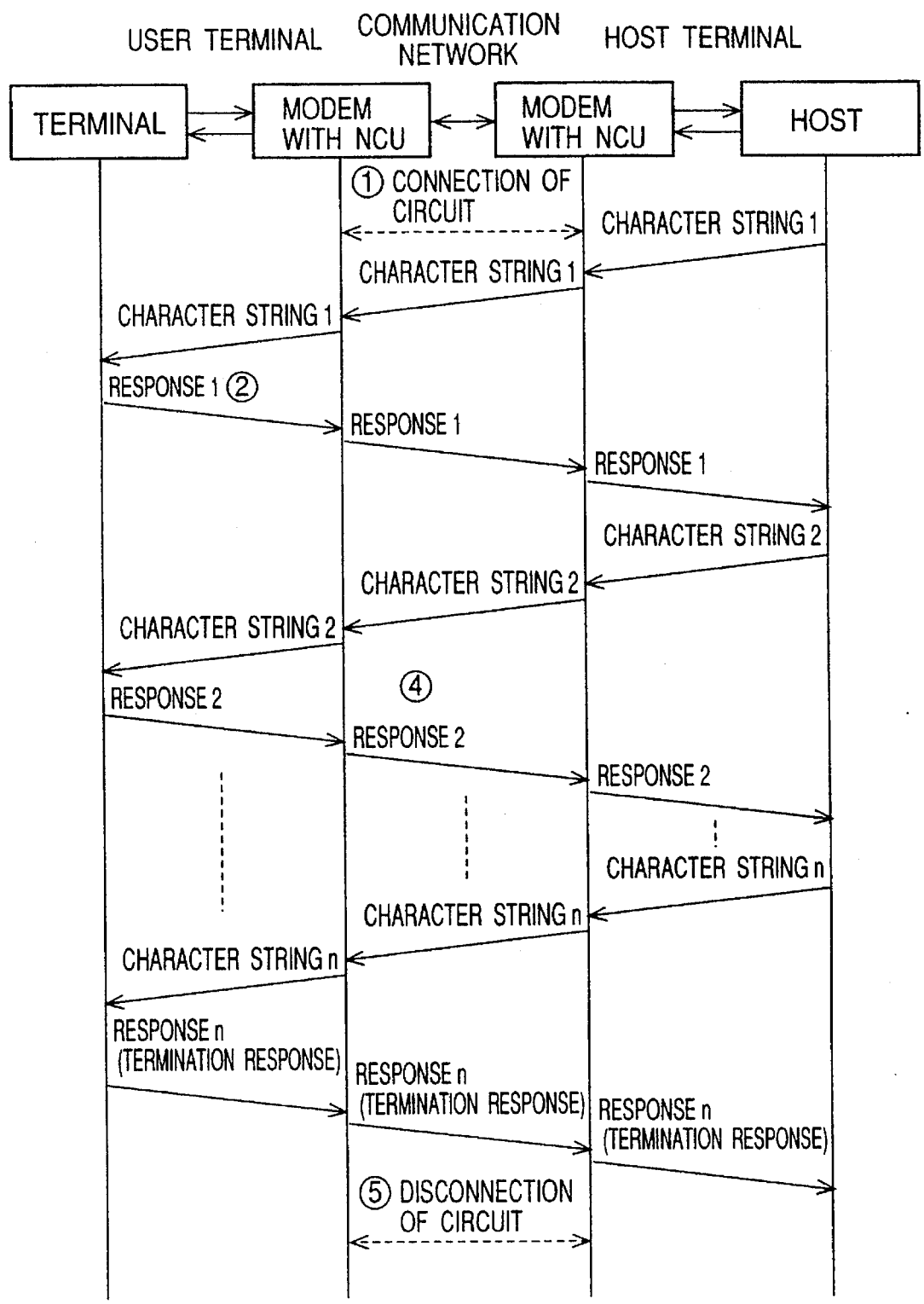
FIG. 11 is a diagram showing a conventional sequence of a procedure wherein an automatic communication is executed.

As shown in FIG. 11, in the automatic communication mode, the host terminal and the user terminal communicates with each other automatically via the communication circuit in the following manner.

1. A manual or automatic communication procedure is utilized so that the terminals establish the circuit between each other.

2. The user terminal sends a response character string 1 in response to a received character string 1 from the host terminal, in accordance with the automatic communication procedure.

3. In response to the response character string 1 from the user terminal, the host terminal sends the next character string 2 in response thereto.

4. The automatic communication is effected by repeating the above steps 2 and 3.

5. When the automatic communication is completed, the circuit is disconnected by the manual communication procedure or the automatic communication procedure.

The automatic communication software is built in the user terminal, and the automatic communication procedure is stored in the user terminal.

The automatic communication is carried out in the form of repetition of responses returned upon the reception of character strings. Hence, even when, for example, the full duplex circuit is being used, it rarely happens that the transmitted data and the received data are exchanged at the same time. Another aspect of the automatic communication mode is that, when a certain period of time is required for the host terminal or the user terminal to respond to received character strings, the communication circuit is occupied by the terminal for that period of time even if there is no transmitted/received data during that period of time.

If the aforementioned method of the present invention, whereby the circuit is temporarily disconnected when there is no data, is applied to the automatic communication mode, the circuit is caused to be disconnected by a relatively short absence of data that occurs in the host terminal or the user terminal between a reception of character string and a response thereto. As a result, a relative large amount of time is wasted for the re-connection, causing the efficiency of the communication to be dropped. Another problem of applying the aforementioned method to the automatic communication mode is that, since the number of times that the circuit is disconnected and re-connected increases, the call processing load of the network increases, thereby imposing a heavy load on the network.

Figure 12:
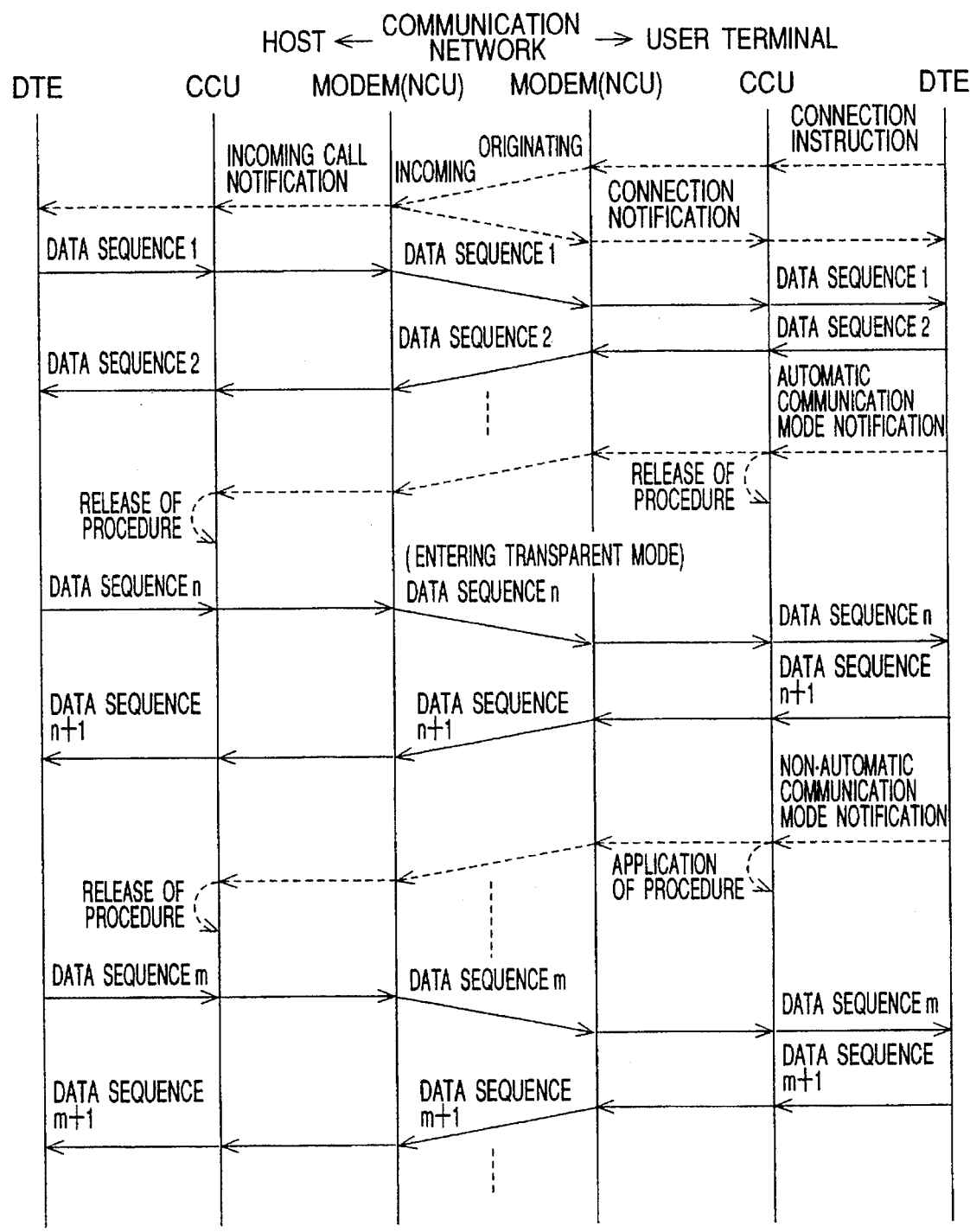
FIG. 12 is a diagram explaining the principle (sequence of a procedure wherein a procedure of the present invention is released in an automatic communication mode) of the present invention.

FIG. 12 shows an example of sequence of processes in this communication method. As shown in FIG. 12, in the automatic communication mode, the user terminal notifies the user communication control unit that the automatic communication mode is effective. In response to this, the user communication control unit cancels the communication procedure, whereby the circuit is temporarily disconnected during the non-data state is canceled, while sending a code indicating the automatic communication mode to the other party (host communication control unit). Upon receiving the code, the host communication control unit cancels the above-mentioned communication procedure. When the user terminal returns to the non-automatic communication mode, the above-mentioned communication procedure is applied again, and the host side is notified of the non-automatic communication mode so that the above-mentioned communication procedure is applied in the host side. In this way, it is possible to prevent the efficiency of communication from being dropped by the circuit being temporarily disconnected in the automatic communication mode.

The invention is configured such that the above-mentioned communication procedure is temporarily canceled in the automatic communication mode so that the normal automatic communication can be executed. The communication method and the communication control unit of the present invention promote the efficient use of the circuit and achieve an economical data communication such that the temporary circuit disconnection procedure is not canceled during the automatic communication, and the circuit connecting time is reduced without any significant increase in the call processing load.

Figure 13:
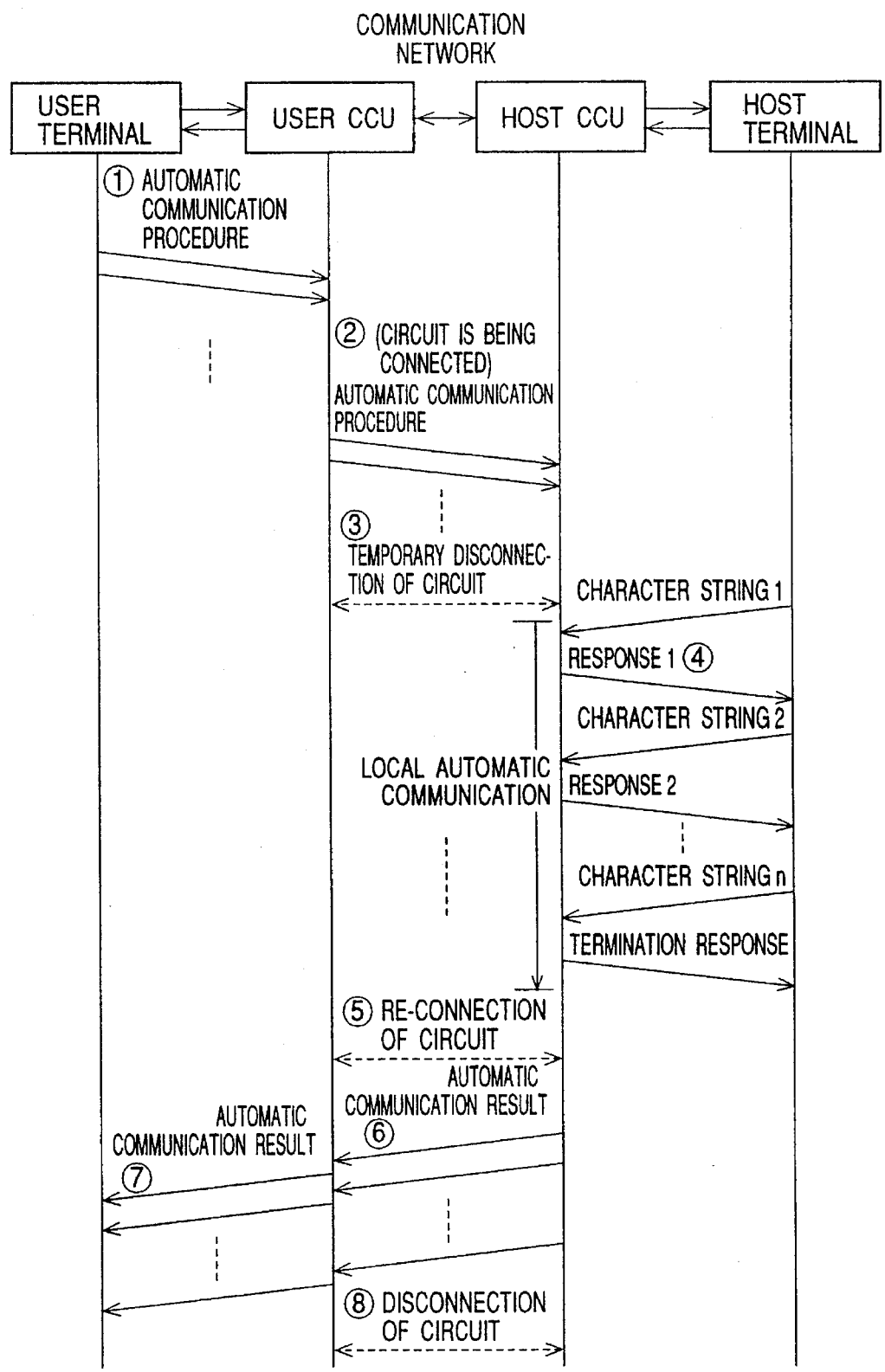
FIG. 13 is a diagram explaining the principle (sequence of a procedure wherein a local automatic communication is executed) of the present invention.
Figure 14A:
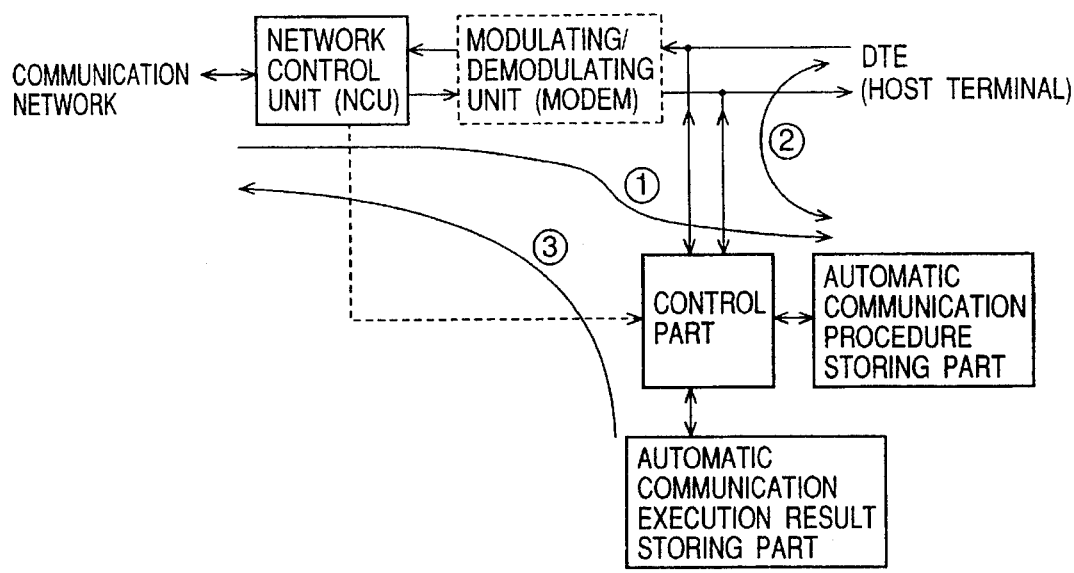
FIGS. 14A and 14B are diagrams explaining the principle (data flows in the local automatic communication) of the present invention.
Figure 14B:
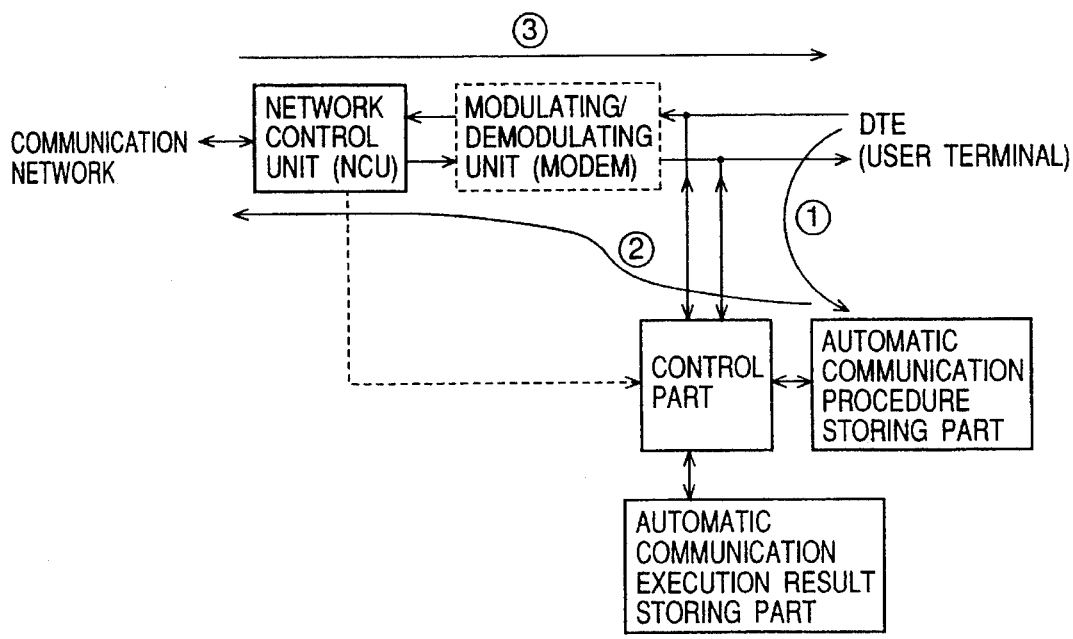

FIG. 13 shows an example of communication sequence and explains the principle of the communication method of a further embodiment. FIGS. 14A and 14B explain the construction of the communication control unit implementing the communication method of claim 11 and the flow of signals therein. Referring to FIGS. 14A and 14B, the modulating/demodulating unit is not necessary when this communication method is applied to a digital network circuit. When applied to the analog circuit, the modulating/demodulating unit may be disposed outside the communication control unit (that is, between the communication control unit and the terminal).

This communication method will now be described with reference to the communication sequence shown in FIG. 13.

1. The user communication control unit connected to the user terminal receives the automatic communication procedure from the user terminal before the communication is started, and stores the communication procedure in the automatic communication procedure storing part.

2. While the circuit is being connected, the user communication control unit sends the automatic communication procedure of the user terminal to the host communication control unit, whereupon the host communication control unit stores the procedure in the automatic communication procedure storing part of the host station.

3. After a transmission according to the automatic communication procedure is completed, one or both of the communication control units disconnects/releases the circuit temporarily.

4. After the disconnection of the circuit, the host communication control unit executes the automatic communication with the host terminal in accordance with the automatic communication procedure received from the user side (hereinafter, this communication is referred to as the local automatic communication). The result of execution of the local automatic communication is stored in the automatic communication execution result storing part.

5. When the automatic communication is completed, one of the communication control units (normally, the host communication control unit) re-connects the circuit that had been disconnected temporarily.

6. The host communication control unit reads the execution result of the automatic communication from the automatic communication execution result storing part and sends the same en bloc to the user communication control unit.

7. The user communication control unit forwards the received automatic communication result to the user terminal as it is.

A description will now be given, with reference to FIG. 14A, of the operation of the host communication control unit which implements the above mentioned communication method.

1. The host communication control unit receives the automatic communication procedure from the user communication control unit connected via the communication network, and stores the procedure in the automatic communication procedure storing part. The control part of the host communication control unit disconnects or releases the circuit by means of the network control unit (the same as the circuit connecting/disconnecting means) after the reception of the communication procedure.

2. The host communication control unit executes the local automatic communication with the host terminal in accordance with the automatic communication procedure received. The result of the execution is stored in the automatic execution result storing part.

3. After the completion of the local automatic communication, the control unit of the host communication control unit re-connects (issues a call or receives a incoming call), reads the automatic communication execution result stored in the automatic communication execution result storing part, and sends this result to the user communication control unit connected via the network.

A description will now be given, with reference to FIG. 14B, of the operation of the user communication control unit which implements the above mentioned communication method.

1. The user communication control unit receives the automatic communication procedure from the user terminal, and stores the same in the automatic communication procedure storing part.

2. The user communication control unit sends the automatic communication procedure stored in the automatic communication procedure storing part to the host communication control unit connected via the communication network. After the completion of the transmission, the control part of the user communication control unit temporarily disconnects or release the circuit by means of the network control unit.

3. The user communication control unit re-connects the circuit that had been temporarily disconnected, receives the automatic communication execution result from the host communication control unit connected via the network, and reads the same to the user terminal.

Figure 15:
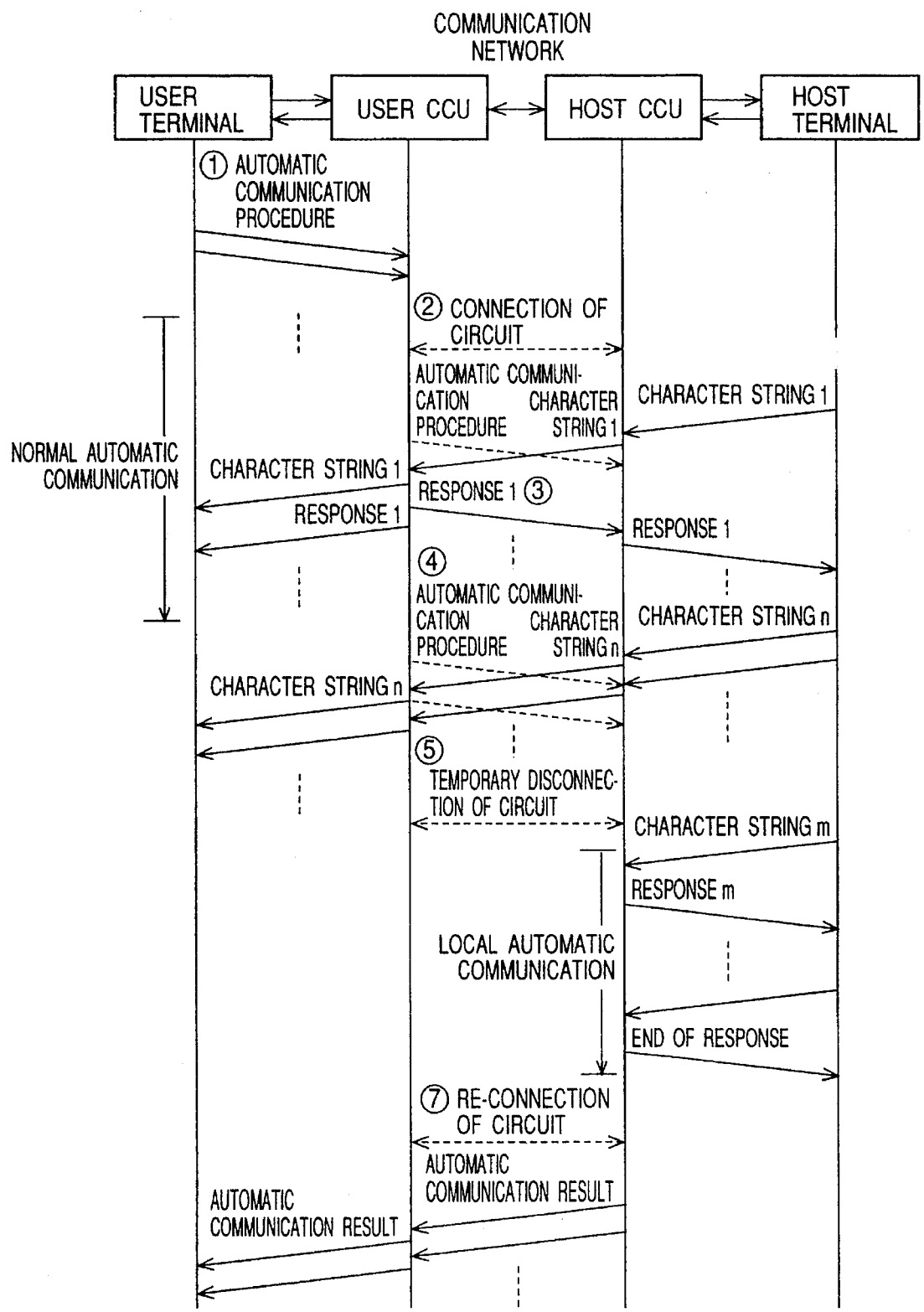
FIG. 15 is a diagram explaining the principle (sequence of a procedure wherein the local automatic communication is executed) of the present invention.
Figure 16A:
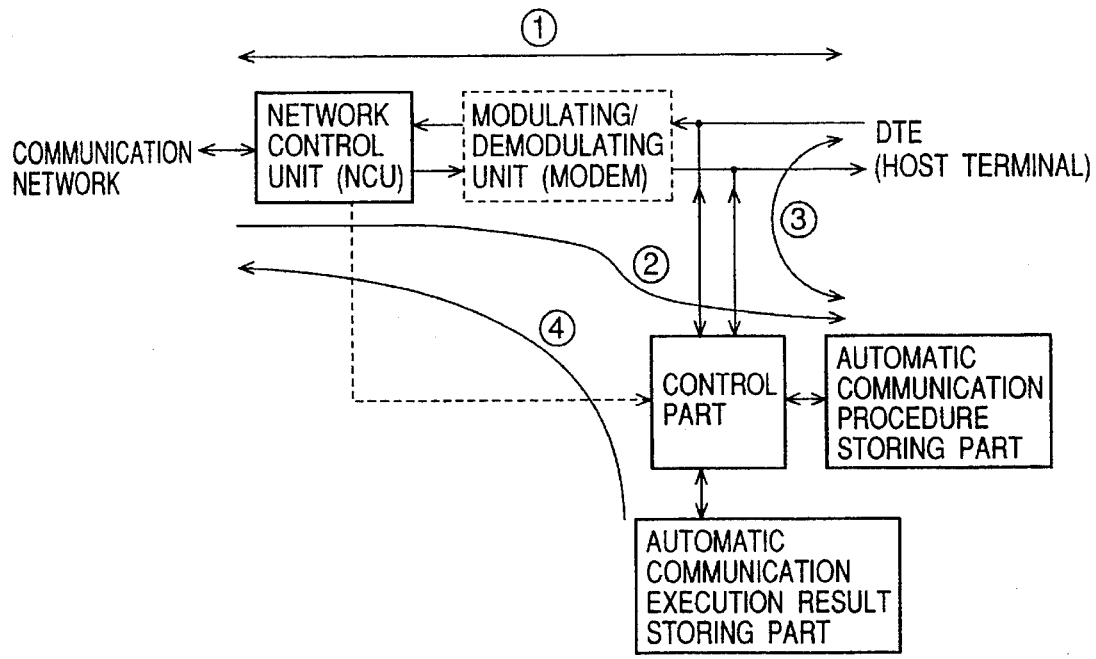
FIGS. 16A and 16B are diagrams explaining the principle (data flows in the local automatic communication) of the present invention.
Figure 16B:
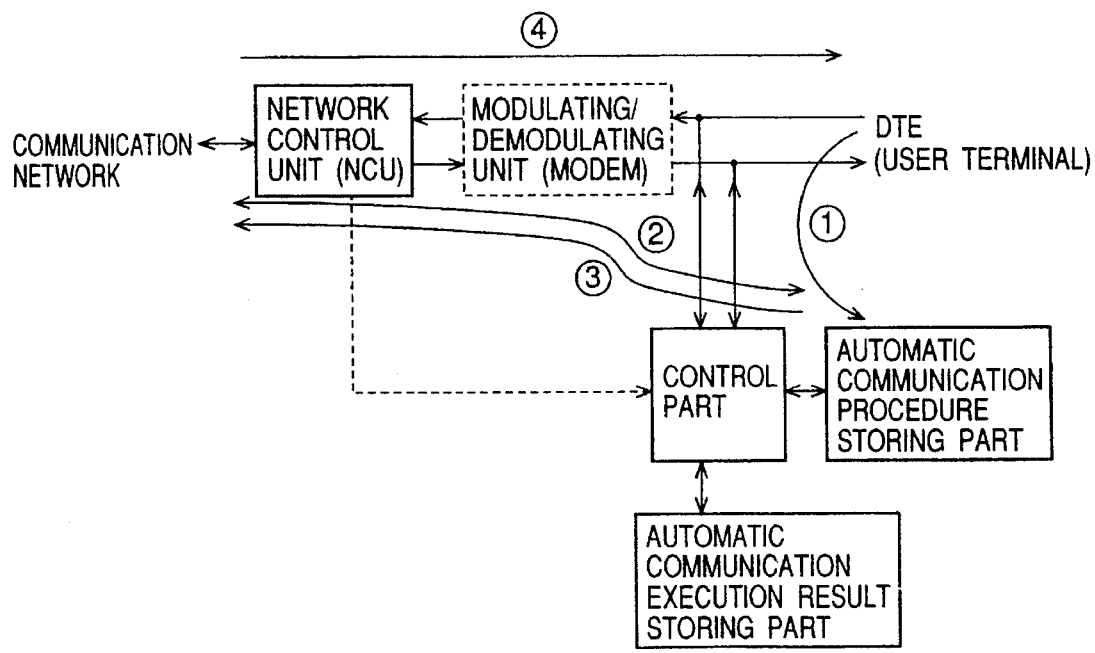

The communication method may have a problem that an extra time is required for sending the automatic communication procedure to the communication control unit of the distant terminal. This problem is resolved as explained below. FIG. 15 shows a communication sequence and explains the principle of this communication method. FIGS. 16A and B are diagrams explaining the construction of the communication control unit which implements this communication method and explaining the flow of signals. Referring to FIGS. 16A and 16B, the modulating/demodulating unit is not necessary when this communication control unit is applied to the digital circuit, as mentioned earlier. When applied to the analog circuit, the modulating/demodulating unit may be disposed outside the communication control unit (that is, between the communication control unit and the terminal).

A description will now be given, with reference to the communication sequence of FIG. 15, of this communication method.

1. Before starting a communication, the user terminal sends the automatic communication procedure to the user communication control unit connected thereto, and allows the procedure to be stored in the automatic communication procedure storing part.

2. The user communication control unit connects the circuit in order to start a communication.

3. When the user terminal is set in the automatic communication mode, the automatic communication is executed between the user terminal and the host terminal via the communication network, in accordance with the automatic communication procedure stored in advance.

4. The user communication control unit sends the stored user terminal automatic communication procedure to the corresponding host communication control unit at the same time as the data is being received from the host terminal in the automatic communication using an upstream full duplex circuit. The host communication control unit stores this automatic communication procedure in the automatic communication procedure storing part.

5. When the transmission, from the user, according to the automatic communication procedure is completed, one or both of the communication control units temporarily disconnects or releases the circuit.

6. The host communication control unit executes, in accordance with the automatic communication procedure received from the user terminal, the local automatic communication with the host terminal starting with the automatic communication procedure step following the automatic communication procedure step that had been completed so far. The host communication control unit stores the execution result in the automatic communication execution result storing part.

7. Subsequently, the same steps as those steps in FIG. 13 are taken.

After the completion of the local automatic communication, either of the communication control unit (normally, the host communication control unit) re-connects the circuit that had been temporarily disconnected.

The execution result of the local automatic communication is sent en bloc from the host communication control unit to the user communication control unit.

The user communication control unit transfers the execution result of the local automatic communication as it is to the user terminal.

A description will now be given, with reference to FIG. 16A, of the operation of the host communication control unit which implements the afore-described communication method.

1. While the circuit is being connected, the data is exchanged between the user communication control unit and the host terminal in a transparent manner.

2. The host communication control unit receives the user terminal automatic communication procedure from the user communication control unit via the full duplex upstream circuit while the data is being transmitted to the user communication control unit, and stores the procedure in the automatic communication procedure storing part. When the entirety of the automatic communication procedure is received, the control part of the host communication control unit temporarily disconnects or releases the circuit by means of the network control unit.

3. The control part of the host communication control unit executes the local automatic communication with the host terminal in accordance with the user terminal automatic communication procedure stored. The local automatic communication is started with the step that follows the automatic communication step executed in 1. The execution result of the local automatic communication is stored in the automatic communication execution result storing part.

4. After the completion of the local automatic communication, the control part of the host communication control unit re-connects the circuit that had been temporarily disconnected (either by issuing a call or by responding to a incoming call), reads the automatic communication execution result stored in the automatic communication execution result storing part, and sends the same en bloc to the user communication control unit.

A description will now be given, with reference to FIG. 16B, of the operation of the user communication control unit which implements the above described communication method.

1. The user communication control unit receives the automatic communication procedure from the user terminal, and stores the same in the automatic communication procedure storing part.

2. When the communication is started and the user terminal is set to the automatic communication mode while the line is being connected, the automatic communication with the host terminal is executed via the communication network in accordance with the automatic communication procedure stored in the automatic communication procedure storing part.

3. The user communication control unit sends, to the host communication control unit, the user terminal automatic communication procedure stored in the automatic communication procedure storing part via the full duplex upstream circuit while the data is being received from the host communication control unit. When the entirety of the automatic communication procedure is sent, the control part of the user communication control unit temporarily disconnects or releases the circuit by means of the network control unit.

4. The user communication control unit re-connects the circuit that had been temporarily disconnected, receives the execution result of the local automatic communication from the host communication control unit, and sends the same en bloc to the user terminal.

In the above described communication method, it is impossible for the host to receive accesses from a plurality of user terminals, and there is a likelihood that, when a connection becomes established with a second user terminal while the communication with a first user terminal is withheld by temporarily disconnecting the circuit, the execution result of the local automatic communication is erroneously returned to the second user terminal.

The communication method and the communication control unit of a further embodiment resolve this problem. FIG. 17 shows the construction of this communication control unit. Referring to FIG. 17, when the host communication control unit receives accesses from a plurality of user terminals simultaneously or sequentially via one or more network control unit(s), users are discriminated from each other by a user discriminating means in the control part so that the automatic communication procedure for each user is stored in the automatic communication procedure storing parts. The execution result of the local automatic communication for each user is stored in the automatic communication execution result storing part. In this way, the local automatic communication for each user can be executed and controlled even when the accesses are made from a plurality of users.

In the communication method and the unit described above, no error correction measures is taken for the data, and no data compression is performed, the error correction and the data compression being performed, if any, outside the unit. Therefore, there is a problem that the transmission quality may be degraded due to an occurrence of data error or data loss, when the circuit having a bad quality such as an automobile circuit or a portable telephone circuit is used.

Moreover, there is a problem that, when the response of the terminal (host) is not so bad, and when the blank time (the period of time in which no data is transmitted or and no data is received) is relatively short, little economical benefit is provided by temporarily disconnecting the circuit so as to reduce the connecting time, and further improvement in the circuit usage efficiency cannot be hoped for.

The communication method and the communication control unit are intended to improve the transmission quality, the economical benefit due to the reduction of the circuit connecting time and the circuit usage efficiency.

Figure 19:
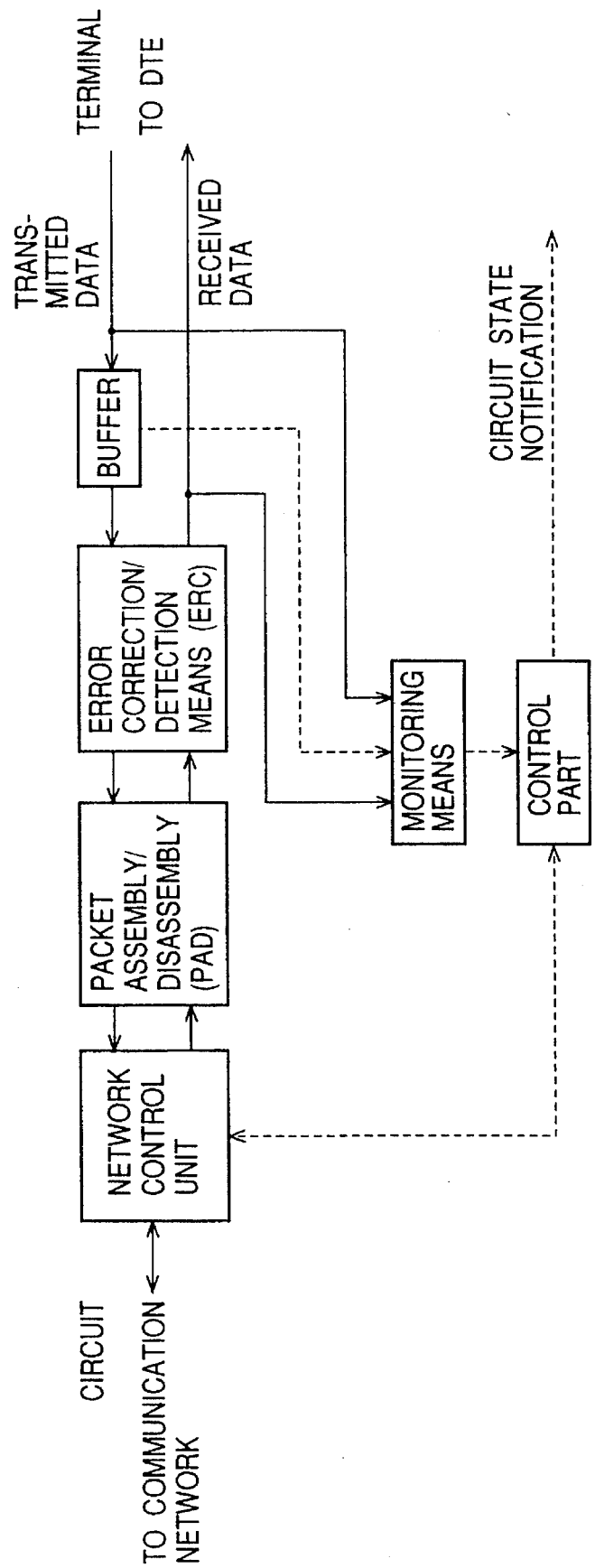
FIG. 19 is a diagram explaining the principle (construction of a unit which implements a basic packet method) of the present invention.

The communication method and the communication control unit are designed to improve the transmission quality by error correction. FIG. 18 is a diagram explaining the operating principle of another communication method as; FIG. 19 is a diagram showing another construction of the communication control unit.

The unit shown in FIG. 19 differs from the unit of FIG. 3 in that there are further provided an error correction or detection means and a packet assembly/disassembly means. The monitoring means monitors the communication state and the content of the communication. The control part determines the communication state, re-connects the circuit, determines an appropriateness of the disconnection and gives an instruction for the disconnection.

FIG. 18 shows a flow of data observed from the user terminal and explains the operation. The packet in the figure includes a header portion, a data body portion and an error correction/detection code portion. The header portion includes a packet number and a data length.

The transmitted data (DTE→CCU in FIG. 18) received by the user communication control unit from the user terminal is subjected to error correction or detection coding by means of the error correction or detection means. Further, the transmitted data is turned into packets by means of the packet assembly/disassembly means, so as to be transmitted to the host terminal via the circuit switching network (CCU→network in FIG. 18).

The packet received from the host terminal (network→CCU in FIG. 18) is subjected to the error correction or detection decoding, and is then transferred to the user terminal (CCU→DTE in FIG. 18) as the decoded data.

When there aren't any transmitted packet and the received packet on the circuit (or when it is determined that there aren't), the circuit is temporarily disconnected (the shaded portion of FIG. 18). Since the user terminal is not normally notified of the disconnection of the circuit (indicated by "the circuit state notification ON" in FIG. 18), the session is not ended. In case the application which is run in the user terminal is configured not to end a session upon a temporary disconnection, the user terminal may be notified of the temporary disconnection. According to the communication method explained in FIG. 18, an improvement in the transmission quality can be achieved.

Figure 20:
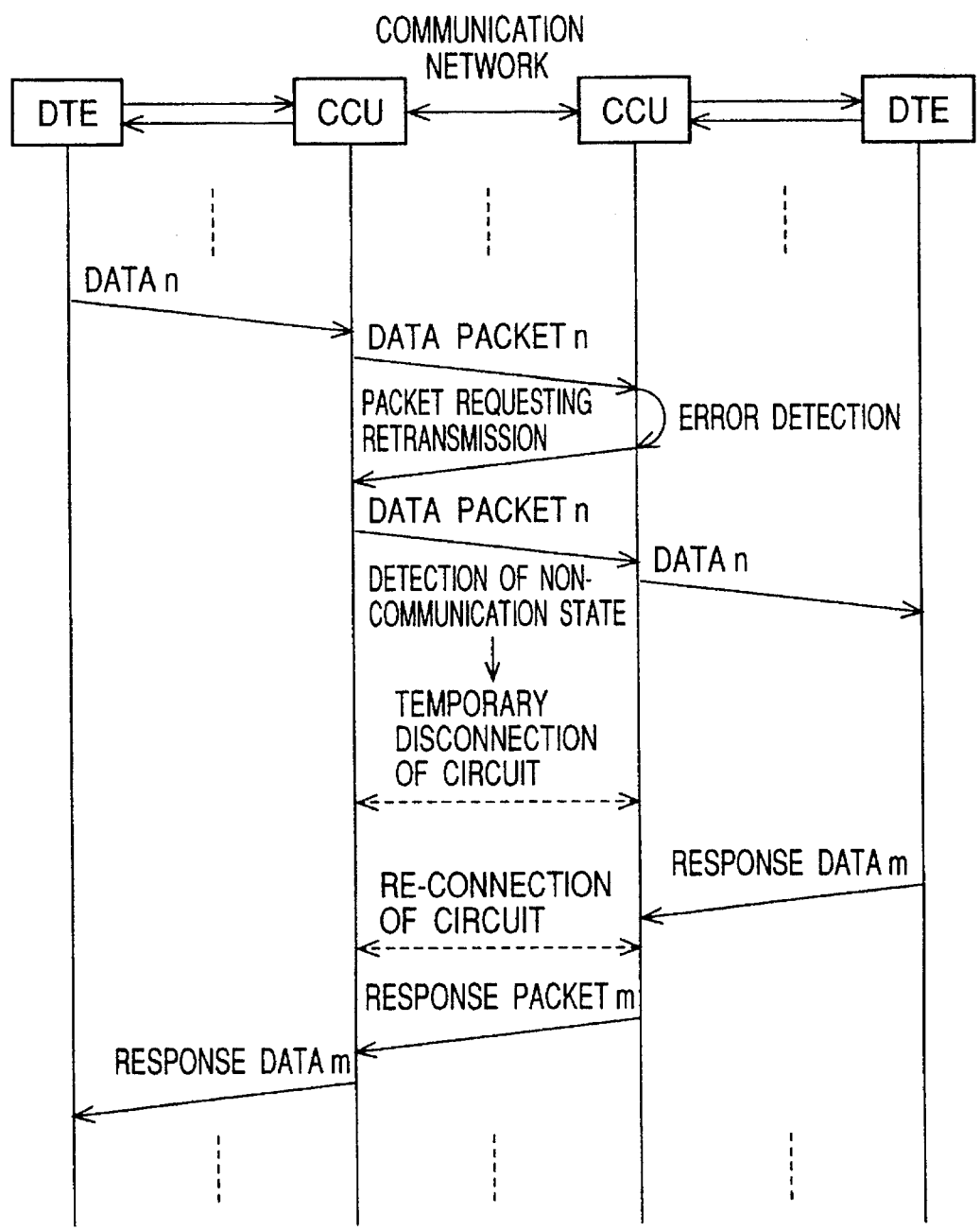
FIG. 20 is a diagram explaining the principle (sequence of the packet method) of the present invention.
Figure 21:
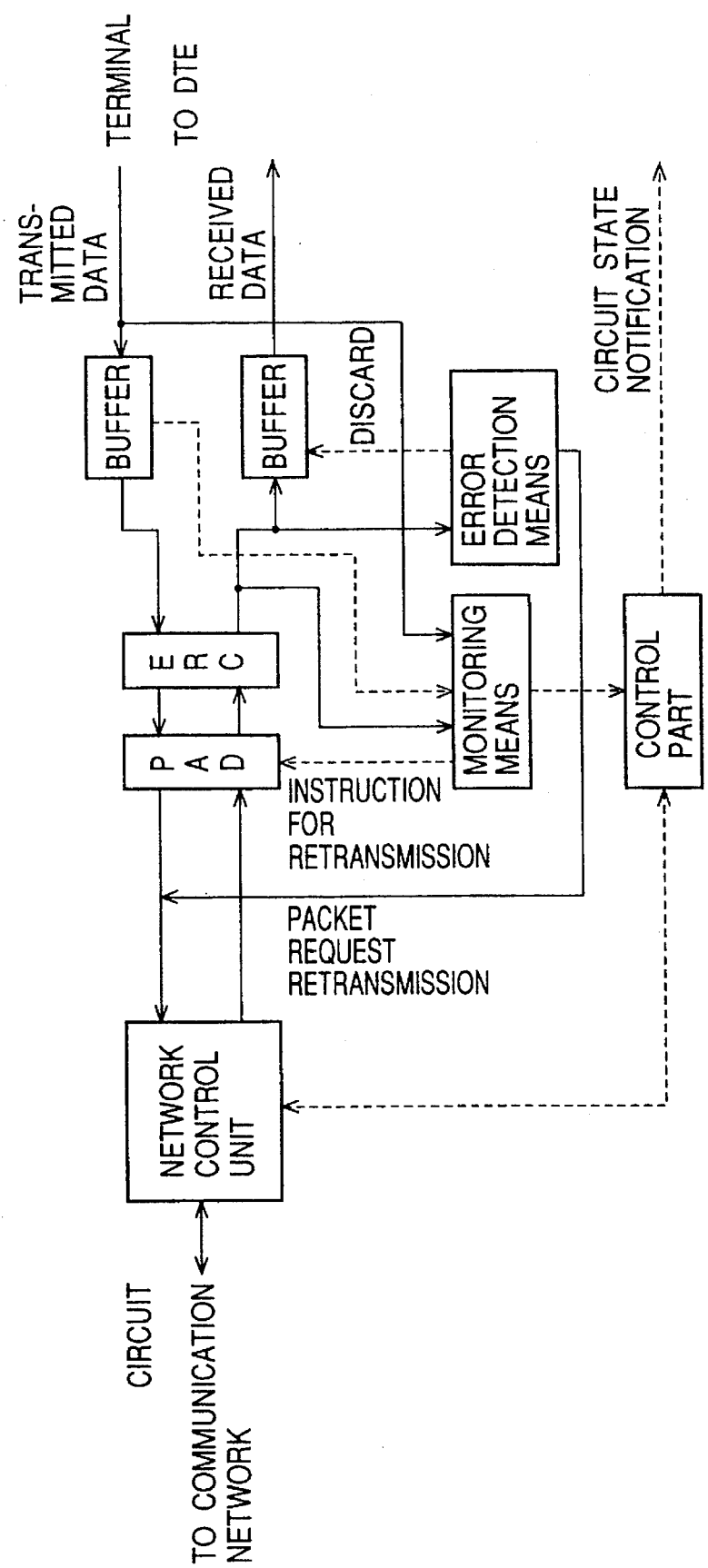
FIG. 21 is a diagram explaining the principle (construction of a unit which implements a method involving packet retransmission control) of the present invention.

In the above described communication method, there is a problem that, when the circuit quality is severely degraded, error correction by means of error correction code becomes impossible. The communication method and the communication control unit may be designed to maintain the data quality by means of retransmission control even when there is an error whose correction is impossible. FIG. 20 shows an example of communication sequence and explains the operating principle of this communication method. FIG. 21 shows the construction of the communication control unit which implements this communication method.

When an error that cannot be corrected is detected in the received data packet n by means of the error detection means of the communication control unit, the data for the relevant packet in the receive buffer is discarded, and the retransmission request packet is returned to the distant terminal (for example, the host terminal). Upon receipt of this retransmission request packet, the distant communication control unit retransmit the requested packet n. When there is no packet to be transmitted or received (detection of an idle state), the circuit is temporarily disconnected. When the data to be transmitted is produced in the terminal (the response data m in the example of FIG. 20), the communication control unit re-connects the circuit and returns the response packet m obtained by turning the response data into a packet to the distant communication control unit. According to this communication method, an improvement in the transmission quality is achieved.

Figure 22:
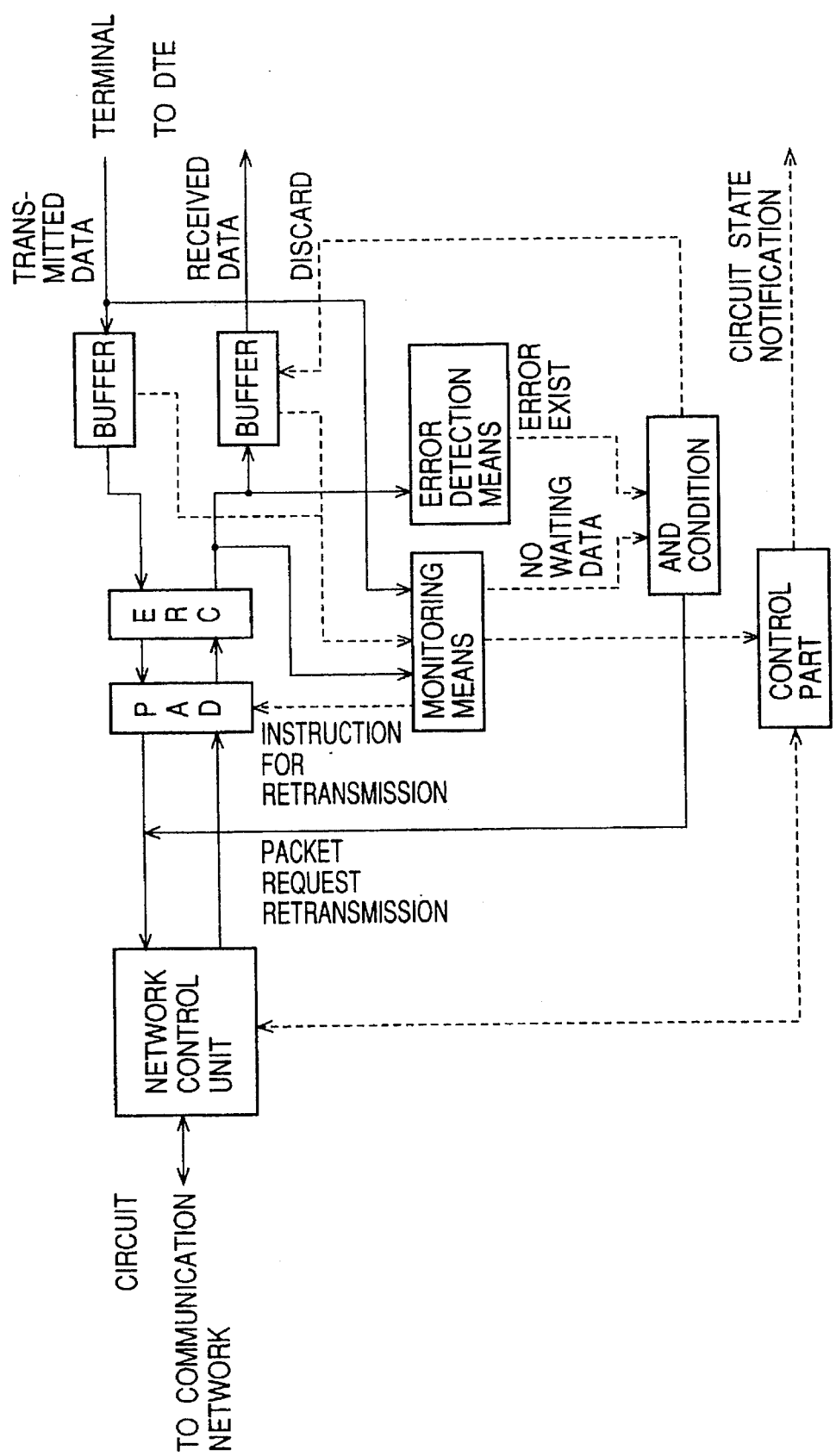
FIG. 22 is a diagram explaining the principle (construction of a unit which implements a method involving packet retransmission control and release thereof) of the present invention.

In the above described communication method, there is a problem that, if the retransmission control is performed when there is a packet to be transmitted or received other than that requested to be retransmitted, the transmission speed is decreased because of a time required for the retransmission. In such a case, a request may arise for improving the response at the risk of the degradation in the transmission quality. The communication method as claimed in claim 16 and the communication control unit as claimed in claim 36 are intended to improve the response to meet such a requirement. FIG. 22 shows the construction of the unit which implements this communication method.

Referring to FIG. 22, it is assumed that an error that cannot be corrected is detected. If an AND condition means determines that there is no data waiting to be transmitted or received, the data for the relevant packet in the receive buffer is discarded, and the retransmission request packet is sent to the distant terminal (for example, the host terminal). Thus, the retransmission control is not performed even if there is an error in the received data on the condition that there is data waiting to be transmitted or received. Upon receipt of the retransmission request packet, the distant terminal retransmits the requested packet. According to this method, the response is improved because the retransmission control is automatically halted when the high response performance is required.

Figure 23A:
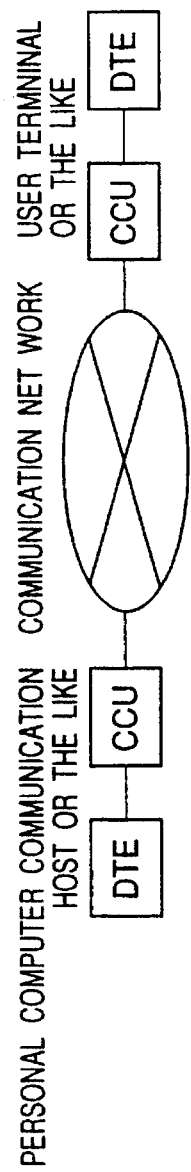
FIG. 23 is a diagram explaining the principle (concept of packet data compression/expansion) of the present invention.
Figure 23B:
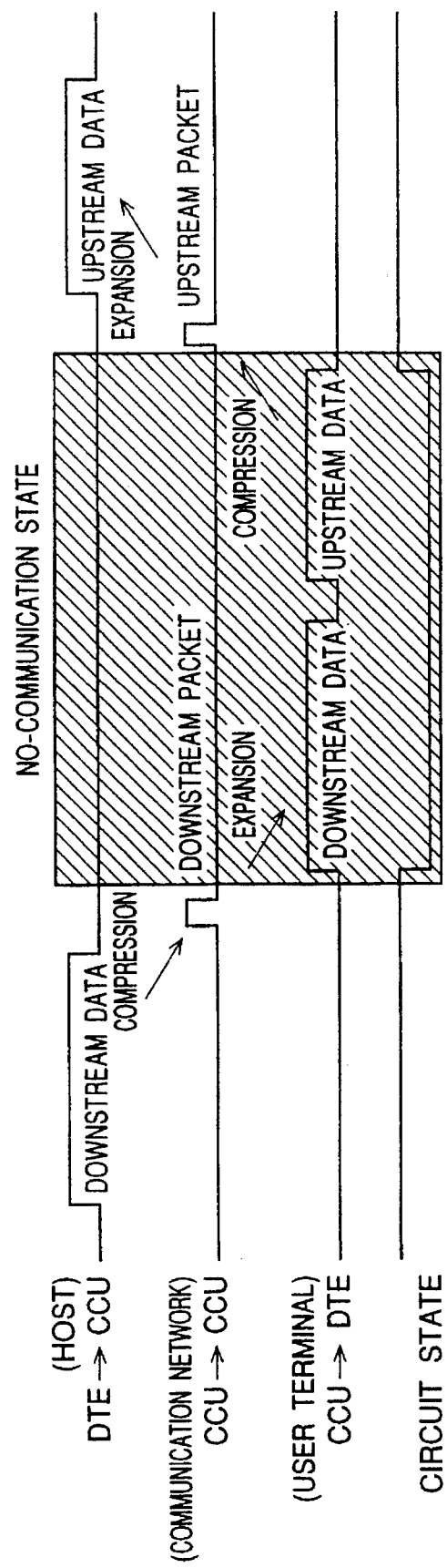
Figure 24:
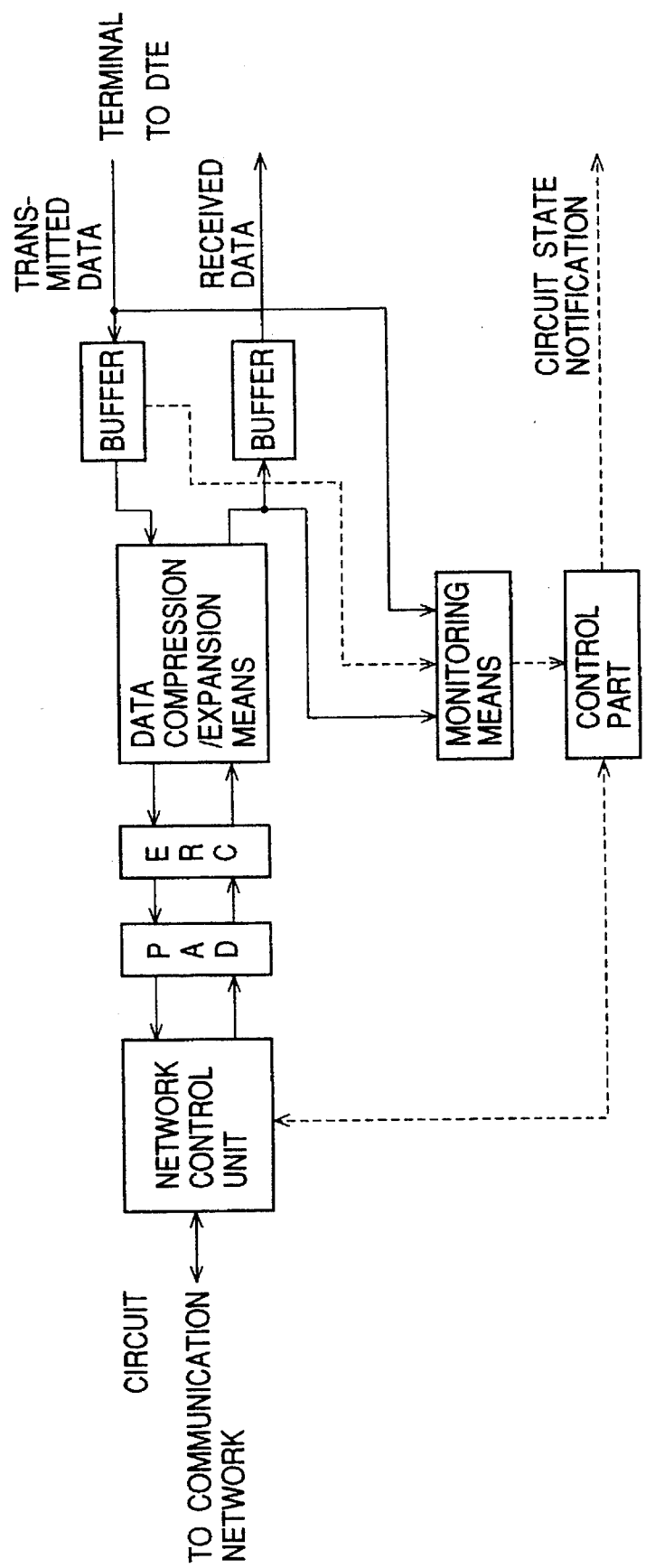
FIG. 24 is a diagram explaining the principle (construction of a unit which implements a method involving packet data compression/expansion) of the present invention.

The above described communication method whereby the data is turned into a packet has a problem that the transmission speed is decreased and the response detected by the terminal is slow because of a time required for assembly and disassembly of the packet. The communication method and the communication control unit may be designed to improve the transmission speed and the response performance by means of data compression. FIG. 23 shows the operating principle of the communication method; and FIG. 24 shows the construction of the communication control unit which implements this communication method.

Referring to FIG. 23, "downstream" means the direction away from the host side toward the user terminal side; and "upstream" means the direction away from the user terminal toward the host side. This definition applies throughout the drawings.

When the data to be transmitted (downstream data) is delivered from the host terminal to the host communication control unit, the downstream data is subjected to data compression in a data compression means of the host communication control unit, and is turned into a packet by means of the packet assembly/disassembly means so as to be transmitted to the distant user communication control unit. The user communication control unit disassemble the packet received from the network (the distant terminal, by means of the packet disassembly means. The disassembled data is then expanded into the original data by the data compression/expansion means, so as to be sent to the user terminal.

The same is true of the case in which the data to be transmitted (upstream data) is produced in the user terminal. The upstream data is subjected to data compression and turned into a packet before being sent to the host terminal. In the host terminal, the data is subjected to the packet disassembly and data expansion processes before being transferred to the host terminal.

The communication method described above improves the transmission efficiency (volume of data that can be transmitted per unit time) by means of the data compression and ensures that a large amount of data can be transmitted in an economical manner.

In the above described communication method whereby the data compression is performed, certain time is required at the receiving end for data expansion and for transmission to the terminal. Accordingly, in an interactive communication, the response to the received data occurs, of course, after the data expansion and the transmission to the terminal. This means that an idle state is bound to be produced in the interim period. The aforementioned idle state monitoring means for monitoring the duration of the idle state has a problem that the disconnection of the circuit has to wait until after a predetermined period of time has passed following the above-mentioned idle state produced in the interim period.

Figure 25:
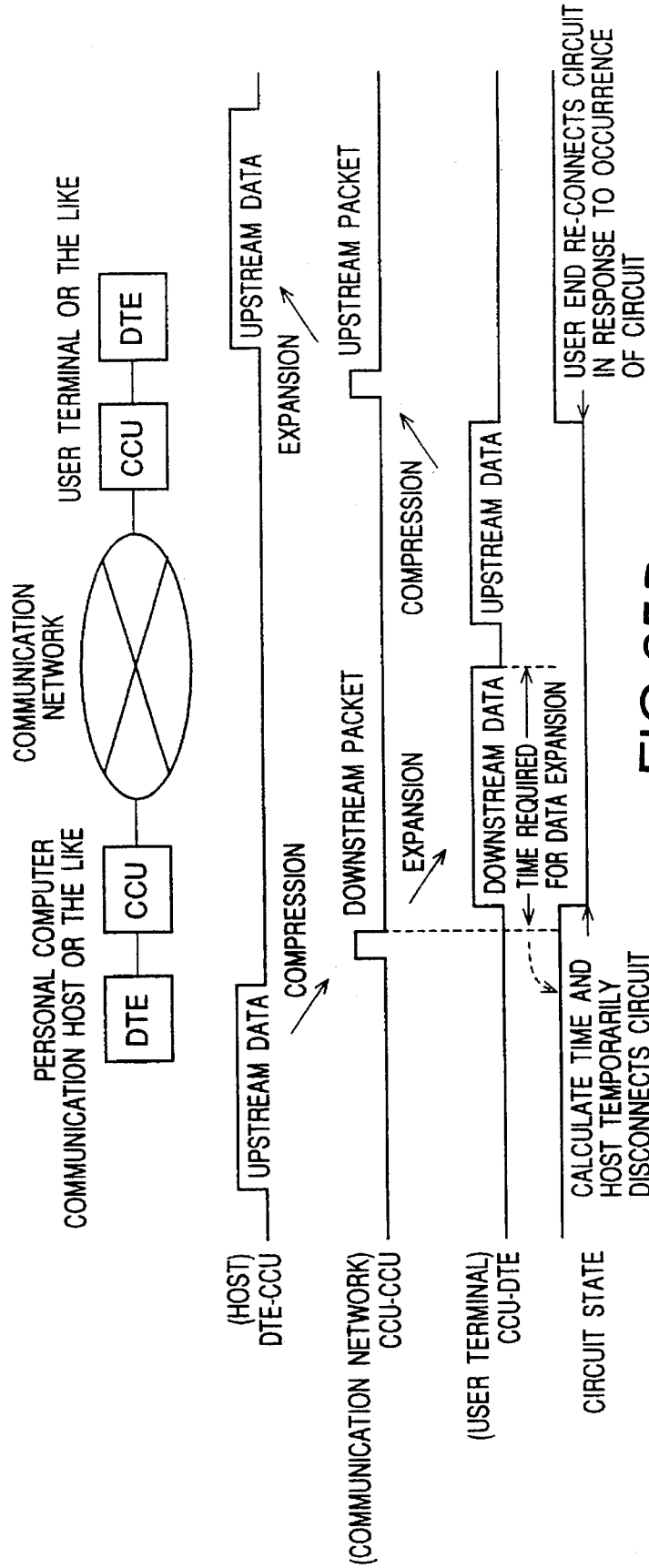
FIG. 25 is a diagram explaining the principle (concept of a temporary disconnection of a circuit on the basis of time required for packet data expansion) of the present invention.
Figure 26:
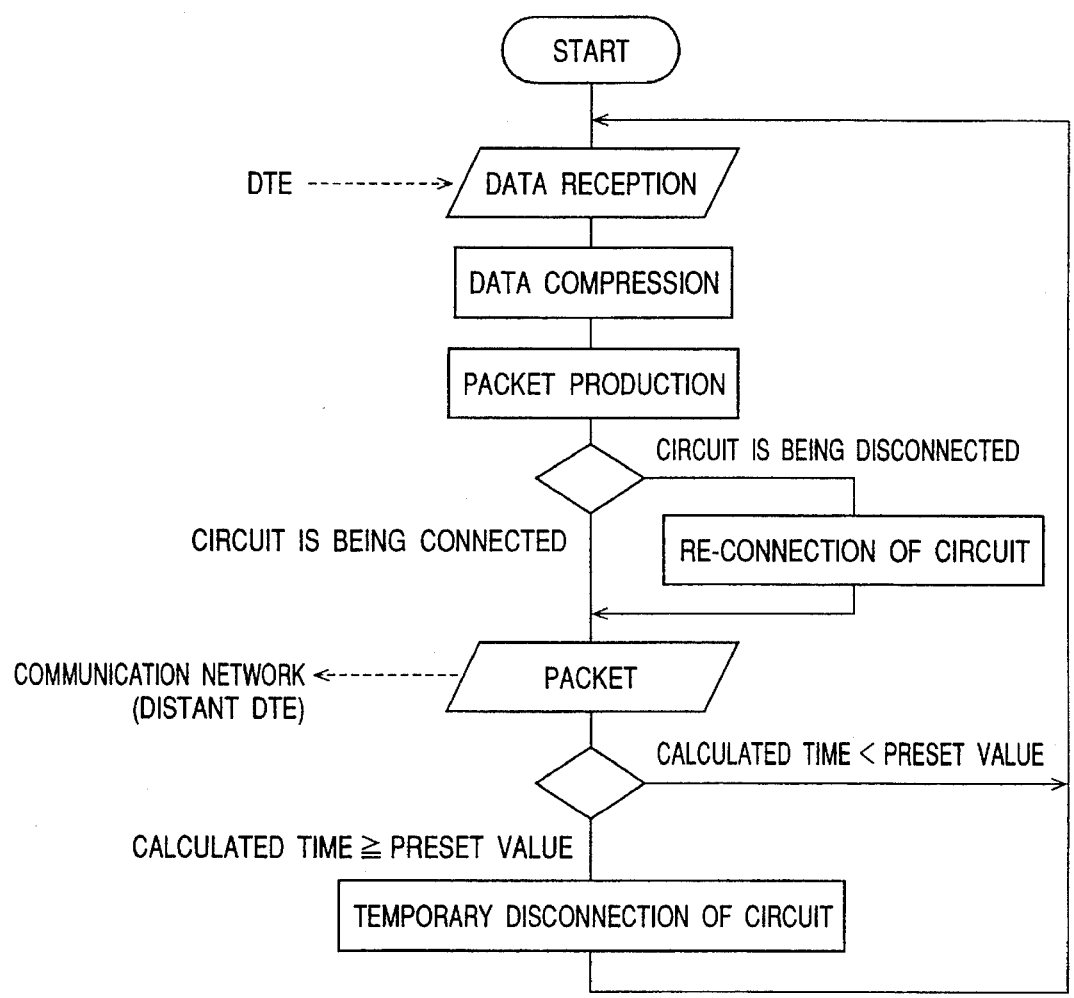
FIG. 26 is a diagram explaining the principle (flow of process wherein a circuit is temporarily disconnected on the basis of time required for packet expansion) of the present invention.

The communication method and the communication control unit may be designed to calculate the duration of the idle state caused by the data expansion and, on the basis of the calculation, disconnects the circuit temporarily and promptly so as to promote the economical use of the circuit and improve the circuit usage efficiency. FIG. 25 is a diagram showing the operating principle of the communication method of another embodiment; and FIG. 26 is a diagram showing an example of flow of processes in the communication control unit the construction of which is the same as that of FIG. 24.

The transmitting communication control unit (in this case, the host communication control unit) sends the packet that had been subjected to data compression to the receiving communication control unit (in this case, the user communication control unit), as well as calculating, on the basis of the compressed data volume, the time required for the receiving communication control unit to subject the packet to the data expansion and to send the expanded data to the terminal. When the calculation tells that the transmitted/expanded packet transmission time required at the receiving terminal (a sum of the time required for the calculation in the data expansion and the time required for transmitting the expanded data to the terminal) is greater than a predetermined time, a determination is made that the idle state lasts longer than the predetermined time. In this case, the circuit is temporarily disconnected after the packet is sent. The receiving terminal speed needed for the calculation of the above-mentioned transmission time is transferred by the communication control unit of the receiving terminal to the transmitting communication control unit in advance.

While the above described method allows the circuit to be temporarily disconnected on the basis of the result of the calculation performed in the packet transmitting side to determine the time required for the transmission, it is of course possible to employ the communication method and the communication control unit wherein the packet receiving side calculates the transmission time required for the data expansion of the packet, and the circuit is temporarily disconnected when the calculated time exceeds a predetermined time.

The above described method wherein the circuit is temporarily disconnected and then re-connected on the basis of the transmission time required for the packet data expansion and the like, greatly contributes to promoting the economical use of the circuit and to improving the circuit usage efficiency.

Figure 27:
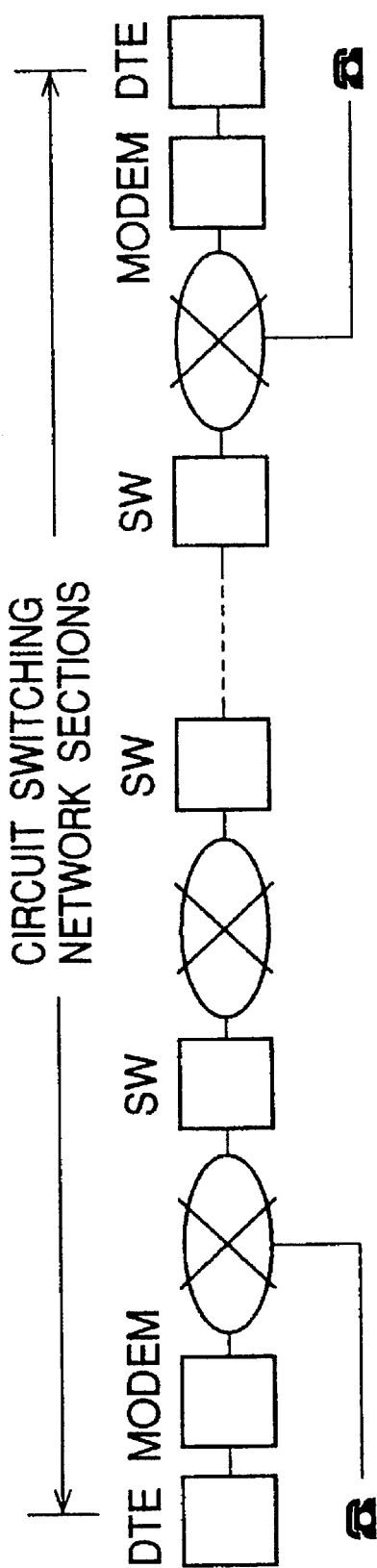
FIG. 27 is a diagram explaining a plurality of circuit switching network sections.

According to the above described method, the circuit is temporarily disconnected over the entire circuit switching network sections as shown in FIG. 27. However, such an arrangement imposes a heavy load on the network and causes the control to become complex. Hence, it is conceived that a temporary disconnection is applied only to the data communication using network sections characterized by an expensive circuit charge, such as an automobile telephone network or a portable telephone network, so that the circuit charge for the corresponding sections can be cut and the improvement in the channel usage efficiency can be achieved. The communication method of further embodiment realizes this arrangement, and FIG. 28 is a diagram showing the principle of this communication method.

Figure 28:
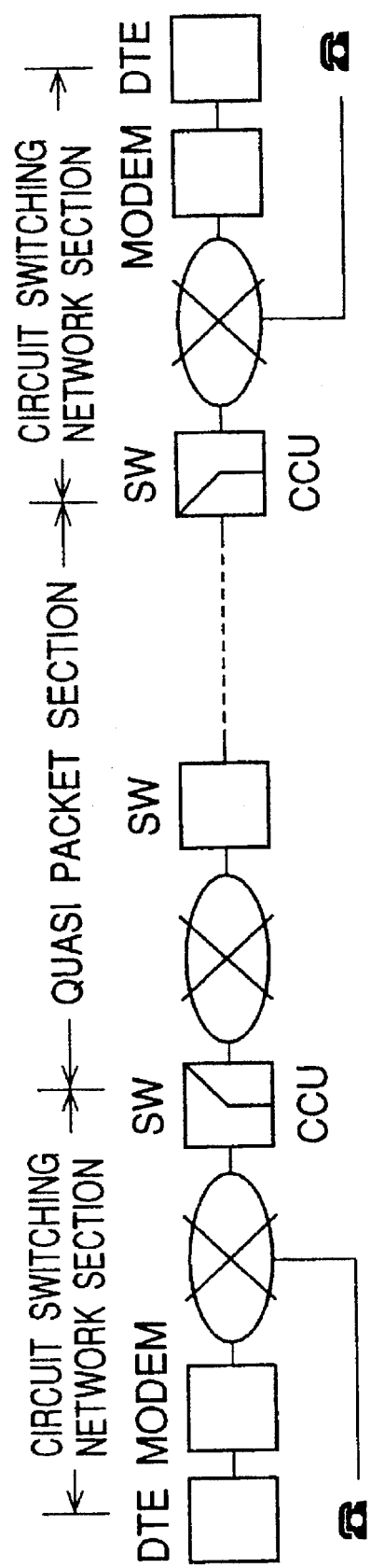
FIG. 28 is a diagram explaining the principle (concept of applying the present invention to certain network sections) of the present invention.

In FIG. 28, the quasi packet section is a section in which the temporary disconnection and re-connection of the circuit is performed. On both ends of the quasi packet section are disposed the communication control units having the function of the above described communication method. The communication control units may be built into the exchange. If the section including a terminal is a quasi packet section, the modem connected to the terminal serves as the communication control unit.

This communication method is configured such that the communication control units disposed at both ends of the quasi packet section temporarily disconnects and re-connects the circuit of the quasi packet section in accordance with the absence and presence of data. In circuit switching network sections other than the quasi packet section, the circuit remains held in use.

A description will now be given of specific embodiments of the present invention. In the drawings, those circuits and signals that have the same function are designated by the same reference numerals from figure to figure.

Figure 29:
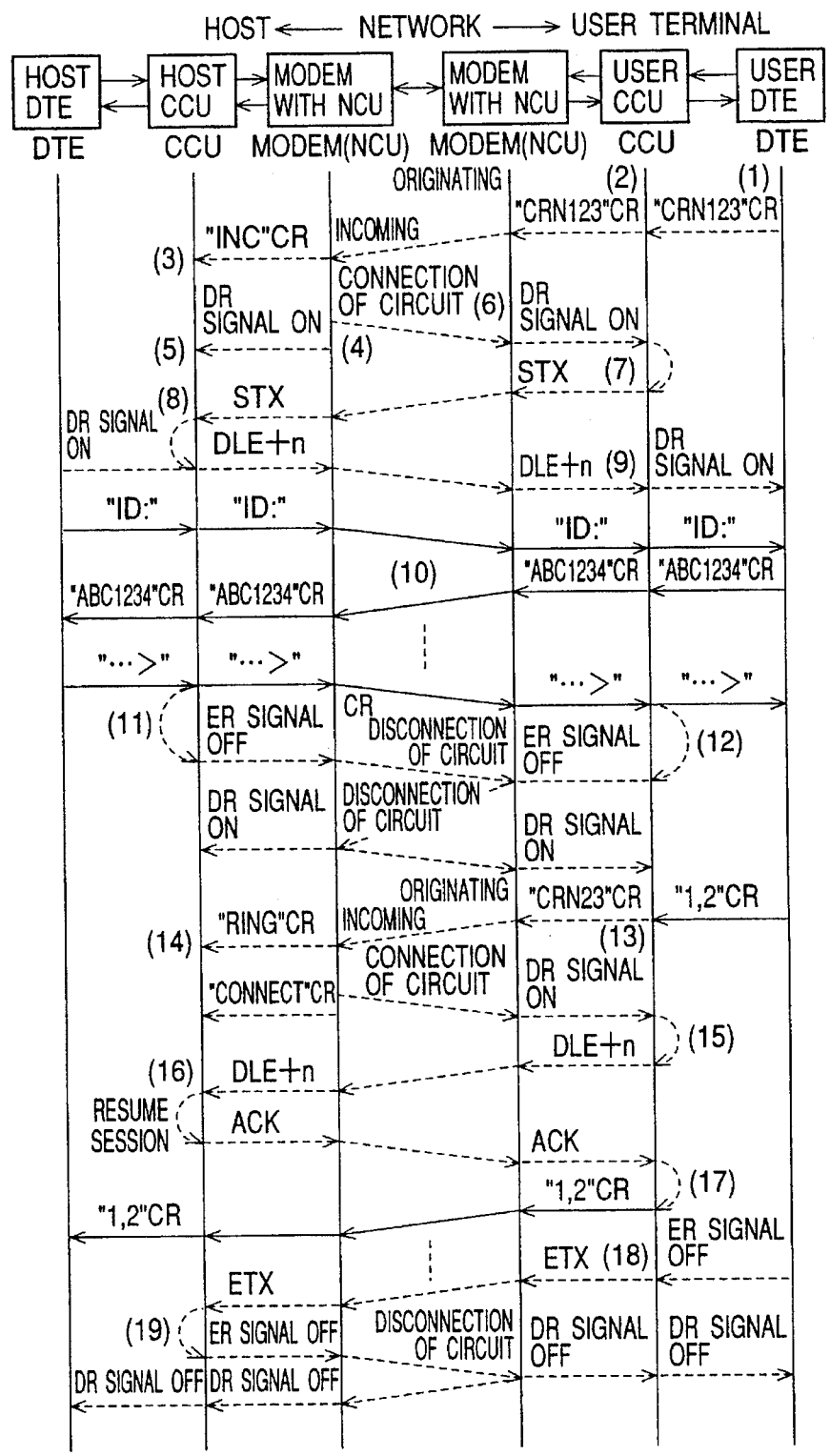
FIG. 29 is a diagram showing an embodiment of the present invention (sequence of a basic procedure for disconnecting/re-connecting a circuit) of the present invention.

FIG. 29 shows an example of sequence of communication processes. In FIG. 29, the personal computer communication is assumed. It is assumed that the modem in FIG. 29 operates according to the command indication of the CCITT (ITU-TS) V.25bis Recommendation, and only ASCII characters and the like are exchanged between the host terminal and the user terminal. Those symbols that are marked with the parenthesis denote character codes, and other symbols denote control codes. For the sake of convenience, the modem (with a built-in NCC) and the communication control unit (hereinafter, referred to as the CCU) are assumed to be separate things. However, the modem may be included in the CCU, or, conversely, the CCU may be included in the modem.

Figure 30:
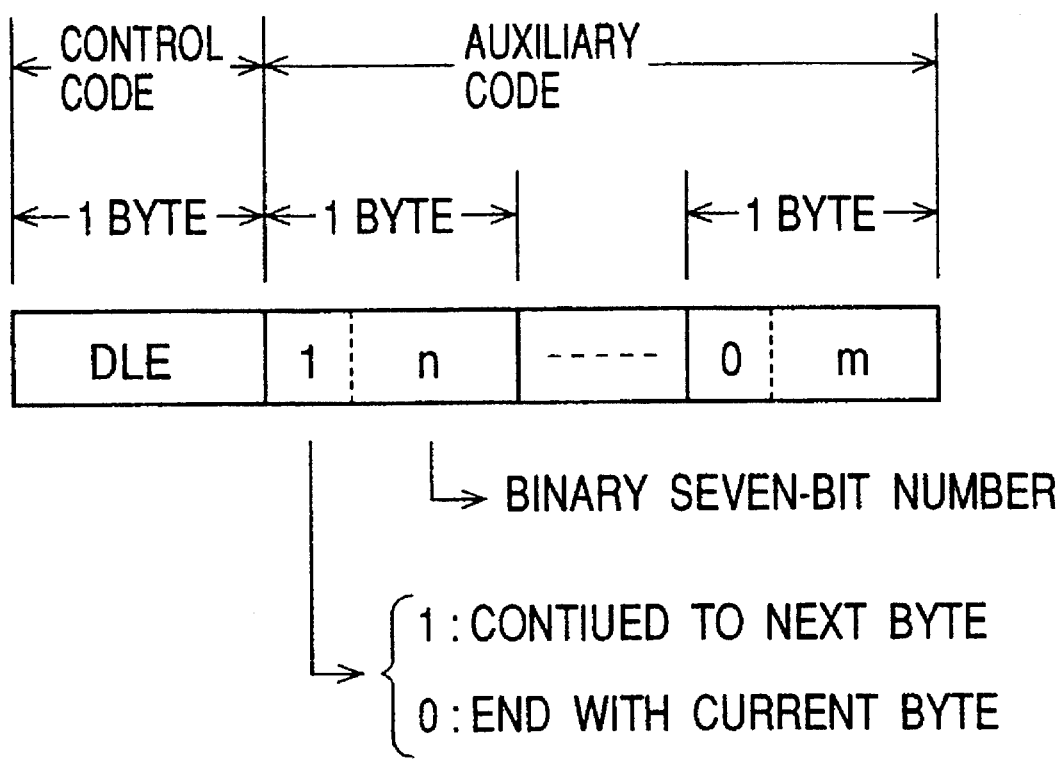
FIG. 30 is a diagram showing an example of a format of a control code.

FIG. 30 shows an example of format of the control code used in this embodiment. The control code and the auxiliary code are included in this format. The control codes such as STX and ETX do not accompany any auxiliary codes. When the auxiliary code includes a plurality of bytes, a number is represented by a combination of bits except the first one bit.

A description will be given below, with reference to FIG. 29, of the procedure of processing a communication.

(1) The user terminal specifies the telephone number of the host terminal and establishes a connection (issues a call) ("CRN123"CR).

(2) When the user CCU is not in a session holding state, it transfers the telephone number to the user modem, and issues an instruction for the origination of the call. In this stage, the telephone number (123) is stored.

(3) The host CCU does not notify the host terminal of the incoming call upon receipt of an incoming call notification ("INC"CR) from the host modem.

(4) When the ringing tone is repeated a predetermined number of times, an automatic response (connection of a circuit) is performed. When a carrier is detected, a connection notification (a DR signal ON and a carrier detection (CD) signal ON) is provided to the host CCU.

(5) The host CCU does not notify the host terminal of anything until the host CCU receives a session start notification (STX) or a session number (DLE+n).

(6) Upon detection of the carrier, the user modem notifies the user CCU of the connection notification (the DR signal ON and the CD signal ON).

(7) Upon receipt of the connection notification, the user CCU sends the session start notification (STX) to a distant host terminal.

(8) Upon receipt of the session start notification (STX), the host CCU returns the session number (DLE+n:n is a binary one-byte number denoting the session) to the user CCU, and provides the connection notification (DR signal ON) to the host terminal 22.

(9) Upon receipt of the session number, the user CCU provides the connection notification (DR signal ON) to the user terminal.

(10) Thereafter, a communication (session) takes place between the host terminal and the user terminal.

(11) The host CCU issues an instruction for a disconnection of the circuit (an ER signal OFF: a forced disconnection of the circuit in use for communication) to the host modem, when:

A. no data is received or transmitted for a predetermined period of time after a specified character string (in this case, characters+">") is transmitted;

B. no data is received or transmitted for a predetermined period of time after a specified character string is received; or C. no data is transmitted or received for a predetermined period of time (for example, 3 seconds).

The host terminal is not notified of the resultant disconnection of the circuit. The internal state of the host CCU with respect to the session n is changed to a session holding state.

(12) Similarly, the user CCU issues an instruction for a disconnection of the circuit (the ER signal OFF) to the user modem, when:

A. no data is received or transmitted for a predetermined period of time (for example, 1 second) after a specified character string is transmitted; or B. no data is transmitted or received for a predetermined period of time (for example, 1 second) after a predetermined character string (in this example, characters+">") is received.

C. no data is transmitted or received for a predetermined period of time (for example 3 seconds).

The user terminal is not notified of the resultant disconnection of the circuit. The internal state of the user CCU is changed to a session holding state.

(13) When the data (in this example, "1, 2"+CR) is received from the user terminal while the circuit is temporarily disconnected (session holding state), the CCU 11 issues a call to the destination whose number had been stored ("CRN123"CR). The data from the user terminal is stored in a transmission buffer.

(14) When the connection of the circuit is restored after the temporary disconnection, and the host CCU receives a call, the host CCU does not notify the host terminal of the incoming call. The host modem re-connects the circuit.

(15) When the user modem provides the notification of the connection of the circuit to the user CCU, the user CCU notifies the host CCU of the session number (DLE+n) that had been stored (DLE+n).

(16) Upon receipt of the session number (DLE+n), the host CCU checks the sessions being held, and returns a session restart enable notification (ACK) to the user CCU if the session can be restarted. If the session cannot be restarted, the host CCU returns a NAK or a session end notification.

(17) Upon receipt of the ACK, the user CCU sends the data ("1, 2"CR) in the transmission buffer to the host. Thereafter, a normal session is continued.

(18) When the user terminal ends a session, it sends a circuit disconnection instruction (the ER signal OFF) to the user CCU. When the circuit disconnection instruction is received, the user CCU sends a session end notification (ETX) to the host CCU. When the user CCU receives the circuit disconnection notification from the user modem, the user CCU transfers the notification to the user terminal, and changes the internal state of the user CCU to a session end (initial) state.

(19) Upon receipt of the session end notification (ETX), the host CCU issues a circuit disconnection instruction (the DR signal OFF) to the host modem 10. Upon receipt of the circuit disconnection notification from the host modem, the host CCU notifies the host terminal of the disconnection of the circuit. The host CCU also changes the internal state to a session end (initial) state.

In the example shown in FIG. 29, the host is not notified of the number of the user so that the host cannot issue a call to the user. When the data to be transmitted is produced in the host while the session is being held following a temporary disconnection of the circuit, the data is stored in the transmission buffer in the host CCU. The data is transmitted to the user when the session is resumed (when the user re-connects the circuit).

While it is assumed that the user terminal issues a call for re-connection in order to resume a session, the host may issue a call for re-connection when the data to be transmitted is produced therein. Such an arrangement is possible in the case that the host is informed of the number or the like of the user through the call originator number notification service in the ISDN.

When the data is produced in the user terminal, thus requiring a restart of the session, the user CCU withholds that data until a carriage return code (CR) is provided. Upon receipt of the CR, the user CCU allows the session to be restarted. This arrangement is effective in that it prevents the circuit from being connected during a blank time between data sets (in this example, an interval between "1" and "2" and an interval between "," and "2") that occurs in advance of the CR.

It will be noted that, in the communication procedure of FIG. 29, the circuit is disconnected temporarily immediately after any of session holding conditions A, B and C is met. Alternatively, a session holding notification (for example, ETB) is sent to the distant CCU before the circuit is actually disconnected, whereupon the CCU that has sent the session holding notification temporarily disconnects the circuit.

While it is assumed that the user terminal ends the session in the communication procedure of FIG. 29, the host may end the session. Moreover, the user CCU may disconnect/release the circuit immediately after sending the session end notification ETX instead of sending ETX and then waiting for the circuit disconnection by the host, before disconnecting/releasing the circuit.

While it is assumed that the host terminal and the user terminal handle only ASCII characters, binary data can also be handled with the following arrangement. That is, on the transmitting end, the DLE is appended before the control code such as the STX, ETX and DLE, and before the code which occurs in the data and which is identical to the DLE. On the receiving end, two DLEs are interpreted as one DLE, which is handled as data, while the DLE+control data is handled as the control data. This arrangement is the same as the transparent mode of the BSC procedure.

Figure 31:
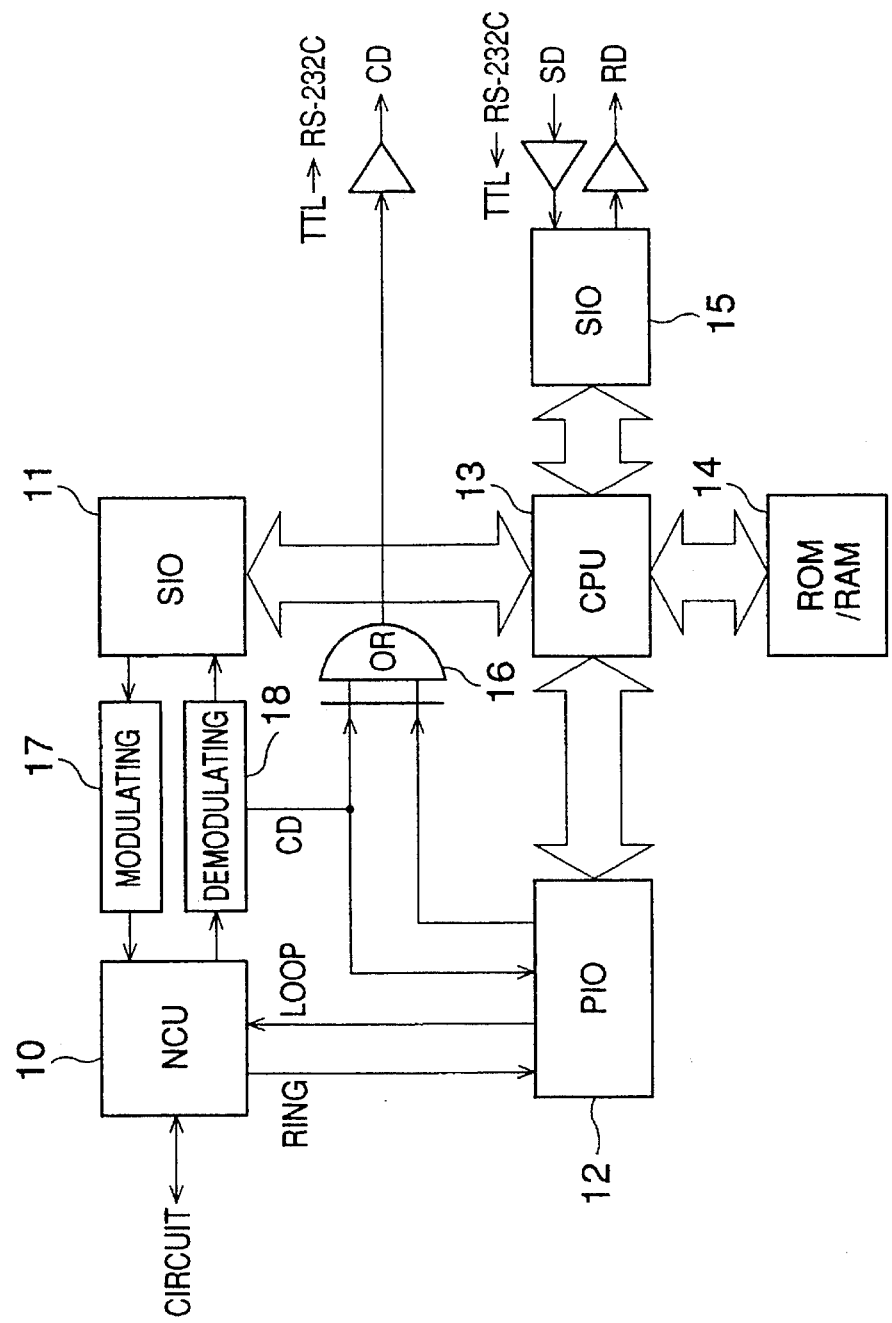
FIG. 31 is a diagram showing the construction of a basic unit for use in an analog wire telephone system.

FIG. 31 shows an embodiment of the communication control unit which implements the above described communication method. FIG. 31 shows a communication control unit (including a network control unit and a modem) for an analog telephone system, and realizes processes such as the temporary disconnection of the circuit and the re-connection thereof by software means under the control of a CPU.

Referring to FIG. 31, RING indicates a incoming call detection signal; LOOP a current loop (call originating/selection) signal; CD a carrier detection signal; SD transmitted data; and RD received data. 10 indicates a network control unit (NCU); 11 a serial input/output unit (SIO); 12 a parallel input/output unit (PIO); 13 a central processing unit (CPU); 14 a read-only memory/write enable memory (RAM); 15 a serial input/output unit; 16 an OR gate; 17 a modulating unit; and 18 a demodulating unit.

Figure 32:
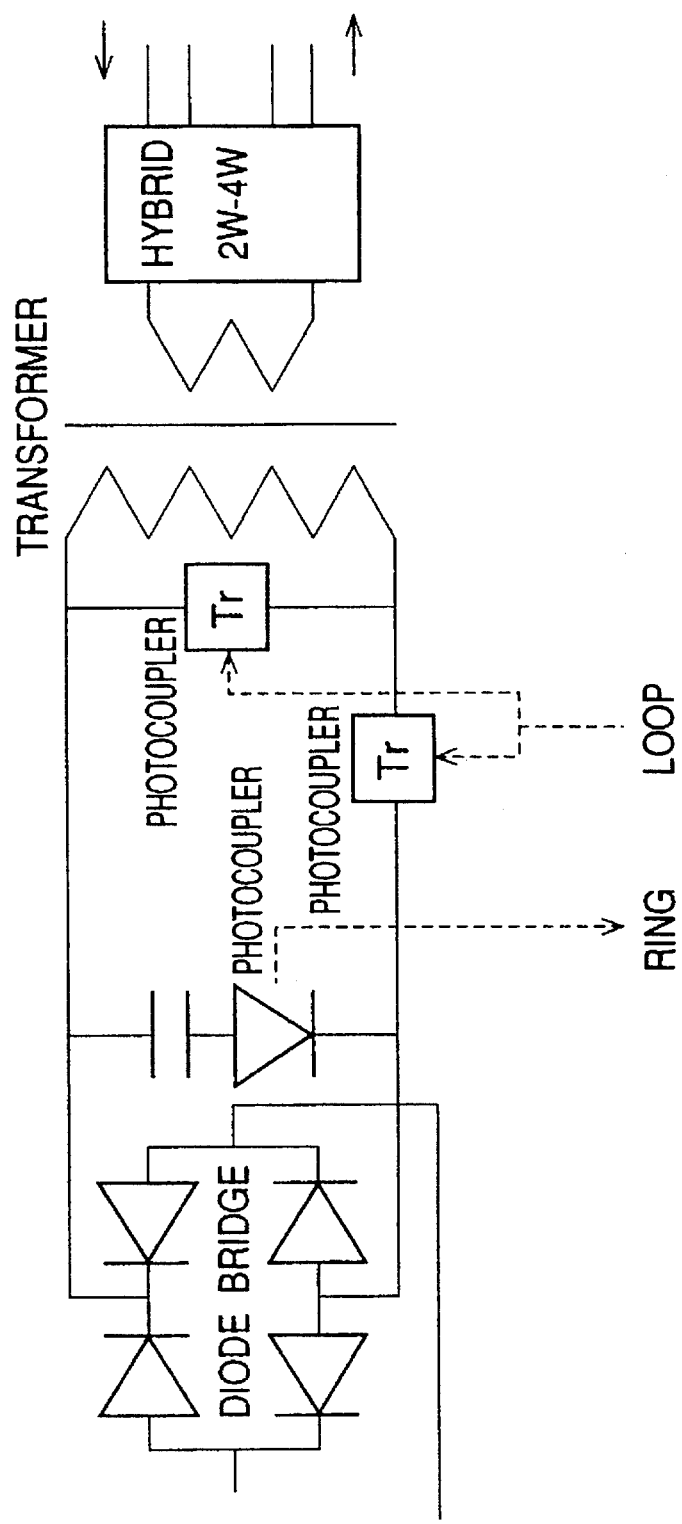
FIG. 32 is a circuit diagram of a network control unit (NCU)

FIG. 32 shows an example of the circuit construction of the network control unit 10 of FIG. 31. As shown in the figure, the network control unit 10 includes a diode bridge, a photocoupler, a transformer, a hybrid 2W-4W circuit and the like. When the network control unit 10 receives an incoming call, it outputs a RING signal. In response to the input of a LOOP signal, the network control unit is capable of issuing or selecting a call.

In this communication control unit, the CPU 13 determines the session holding condition such as the presence or absence of the transmitted/received data by software means. The CPU 13 gives an instruction for a temporary disconnection of the circuit to the network control unit 10 via the parallel input/output unit 12.

Figure 33:
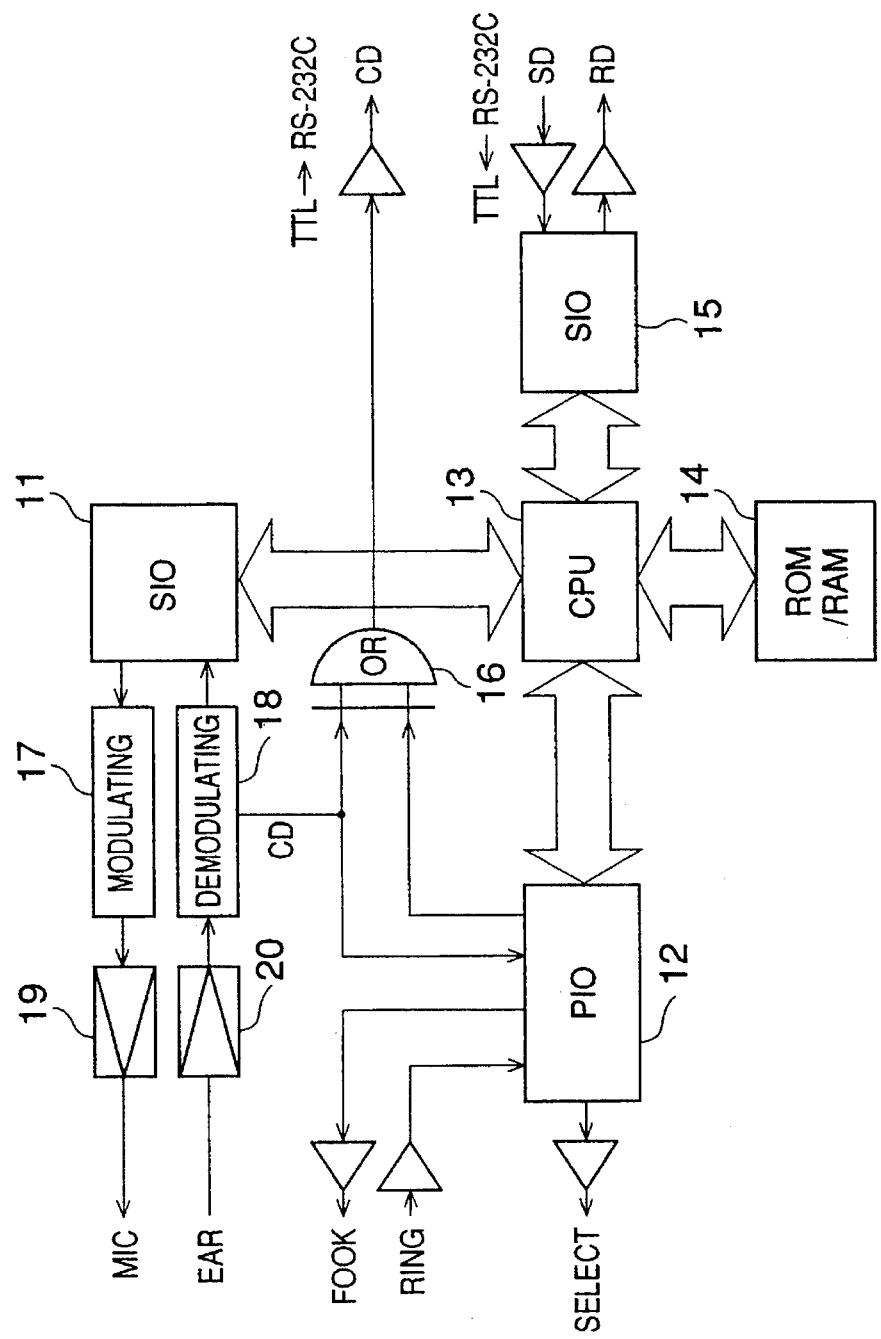
FIG. 33 is a diagram showing the construction of a basic unit for use in an analog automobile/portable telephone system.

FIG. 33 shows another example of the communication control unit which implements the above described communication method. FIG. 33 shows a communication control unit (including a network control unit and a modem) for an analog automobile/portable telephone system. Like the communication control unit of FIG. 31, the communication control unit of FIG. 33 realizes processes like the temporary disconnection of the circuit or the re-connection thereof by software processes. It will be noted that, in addition to the components already listed, the communication control unit of FIG. 33 also includes a microphone terminal MIC and an earphone terminal EAR. FOOk denotes a response/originating signal; SELECT a selection signal 19 and 20 indicate audio amplifier units. The basic operation of this communication control unit is the same as that of the unit of FIG. 31.

While the unit of FIG. 33 is for use in the analog automobile/portable telephone system, the same unit can be used in the digital automobile/portable telephone system if the audio amplifier units 19 and 20, the modulating unit 17 and the demodulating unit 18 are eliminated, and if the serial input/output unit 11 is directly connected to the external input/output.

Figure 34:
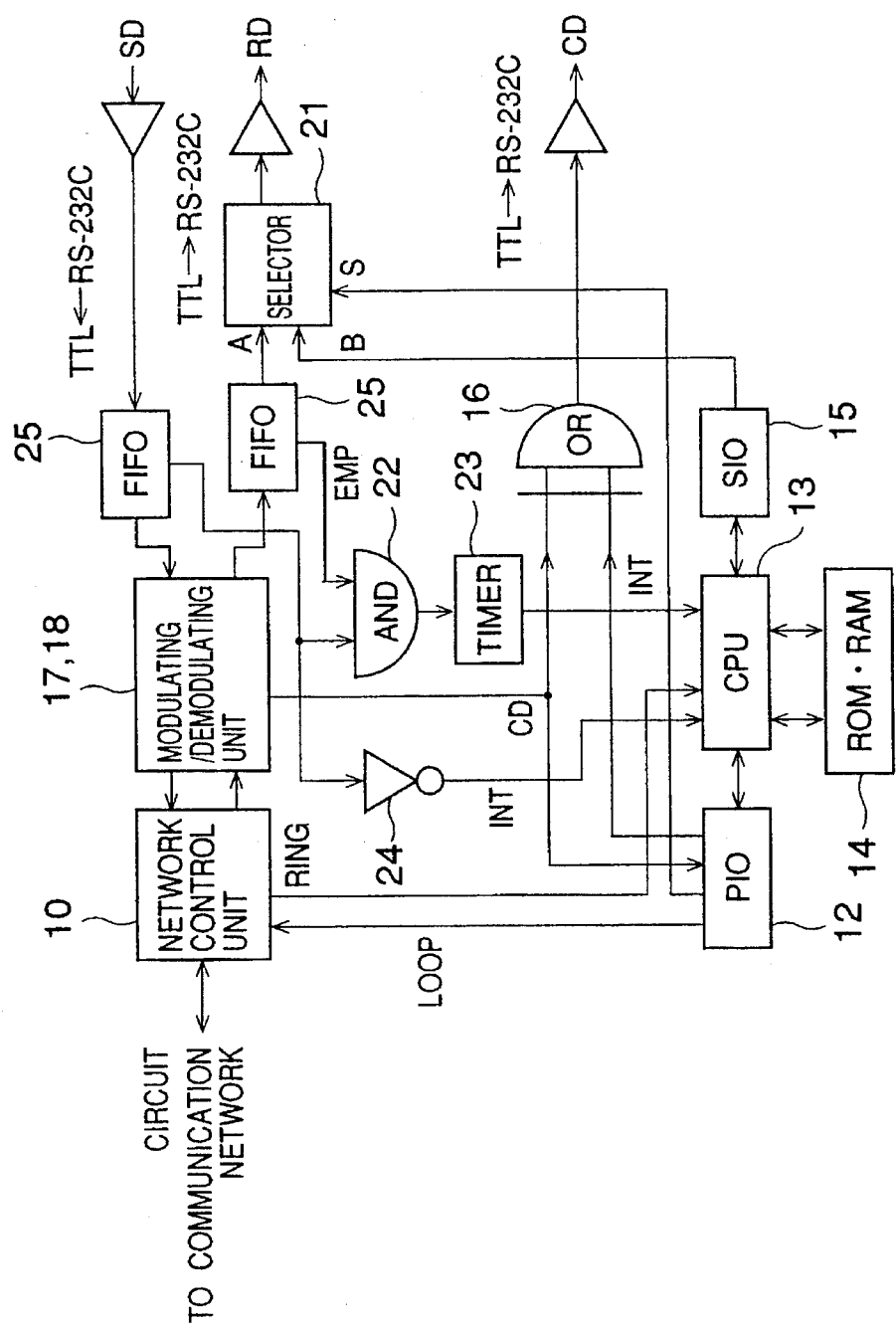
FIG. 34 is a diagram showing the construction of another basic unit for use in an analog wire telephone system.

FIG. 34 shows another example of communication control unit of the present invention. This communication control unit is obtained as a result of applying the present invention to the communication control unit (including a network control unit and a modem) of an analog telephone system. In this unit, a determination that a predetermined period of time has elapsed without any occurrence of transmitted or received data is made by hardware means.

Referring to FIG. 34, the communication control unit includes, in addition to the components already described, a selector 21, an AND gate 22, a timer 23, an inverting circuit 24, and FIFO buffers 25 and 26. Selector inputs A and B are fed to the selector 21, one of the inputs A and B being selected by a selector control input S. An EMP, which is output from the FIFO buffers 25 and 26 is a buffer empty signal. An interrupt signal INT is input to the CPU 13 from the timer 23.

Figure 35:
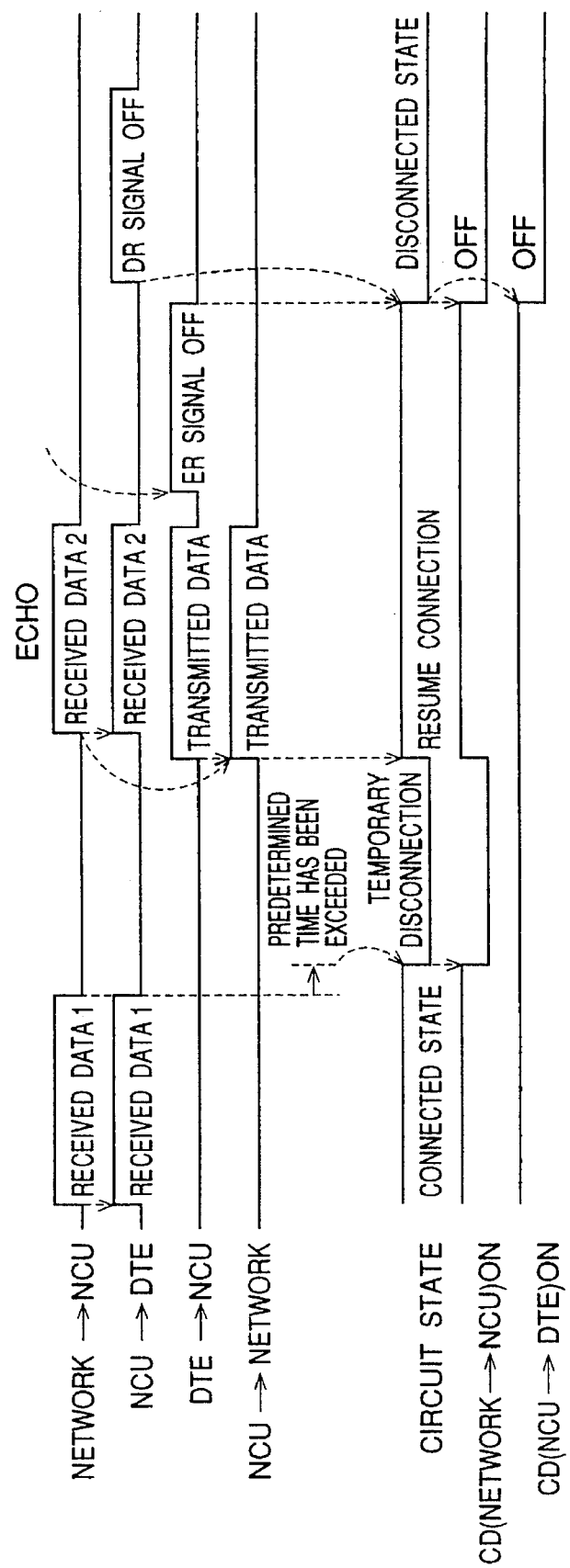
FIG. 35 is a diagram explaining the operation of the unit of FIG. 34.

FIG. 35 explains the operation of the communication control unit of FIG. 34. When it is determined, by means of the AND gate 22, that the transmission/reception FIFO buffers 25 and 26 are empty on the basis of the buffer empty signal EMP, the timer 23 is activated. After a predetermined period of time has elapsed, the timer 23 causes an interruption to the CPU 13 by using the interrupt signal INT. The CPU 13 turns off the LOOP signal to the network control unit 19 via the parallel input/output unit 12 so as to temporarily disconnect the circuit. When it is found that the transmission FIFO buffer 25 is not empty, an interruption in the CPU 13 is caused by the interrupt signal INT from the inverting circuit 24 so that the circuit is re-connected. As shown in FIG. 35, the CD (NCU→DTE) to the terminal (DTE) is masked appropriately by the output from the parallel input output unit 12 so that the CD is not turned off while the circuit disconnection or re-connection process is being executed.

Figure 36:
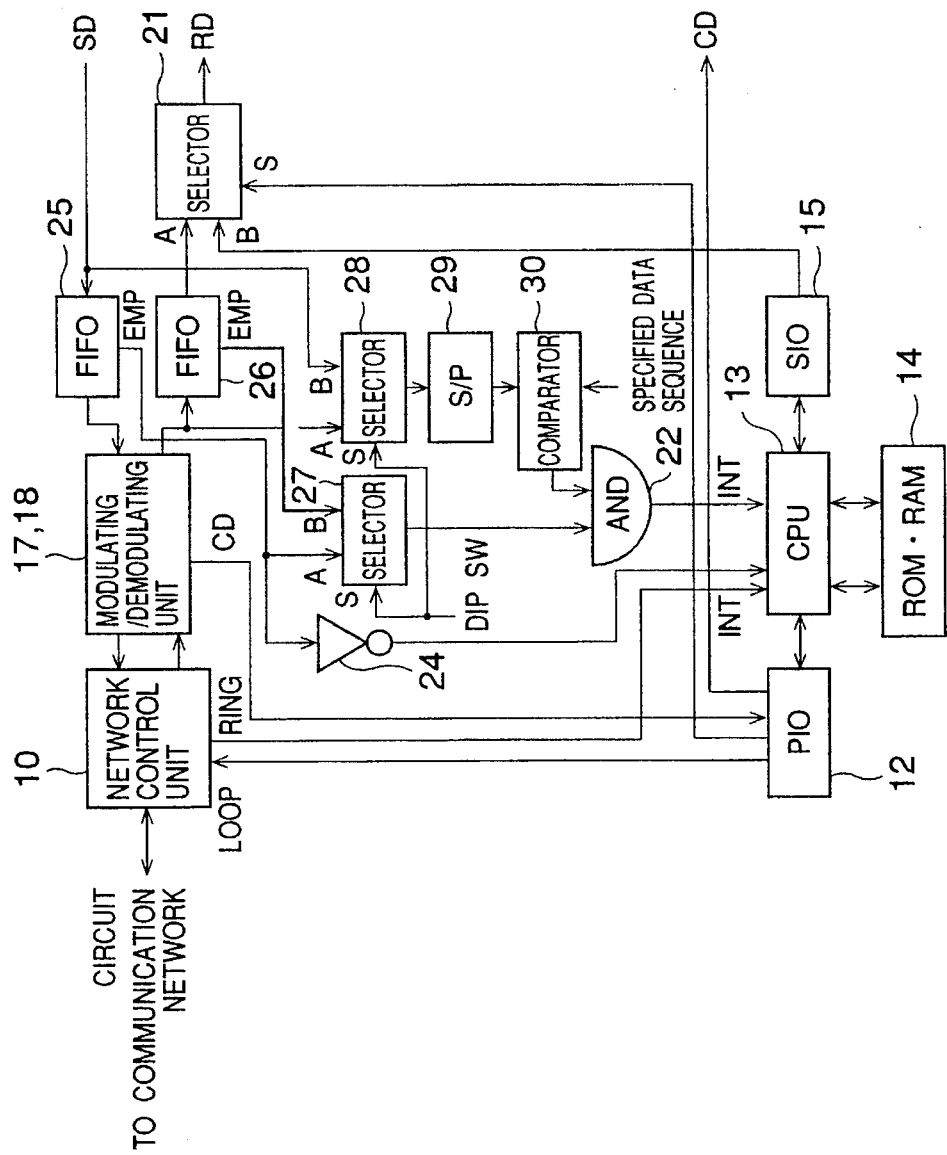
FIG. 36 is a diagram showing the construction of still another basic unit for use in an wire telephone system.

FIG. 36 shows another example of the communication control unit. This unit is obtained as a result of applying the present invention to a communication control unit (including a network control unit and a modem) of an analog telephone system. The communication control unit of FIG. 36 realizes the detection of the transmitted/received data state and the detection of a specified data sequence, which detections are session holding conditions initiating a temporary disconnection of the circuit.

Referring to FIGS. 36, 27 and 28 indicates selectors; 29 a serial/parallel converting unit; and 30 a comparator. A pattern of a specified data sequence is input to the comparator 30. In this unit, the transmitted data or the received data is input to the comparator 30 via the selector 28 and the serial/parallel converting unit 29. In the comparator 30, the input data is compared with the preset specified data sequence. When it is found that the input and the preset sequence agree (that is, when the specified data sequence has been transmitted or received), and when no data is transmitted or received, the interrupt signal INT is issued to the CPU 13 via the AND gate 22 so that the circuit is temporarily disconnected by the network control unit 10.

The communication control unit (communication set control unit) is provided, wherein a discrimination between sessions of the terminals is achieved by using session discrimination numbers, can be configured such that the as many number of components except the CPU 13 and the ROM/RAM 14 as the number of circuits are provided in the construction of FIG. 31. The CPU 13 and the ROM/RAM 14 are configured to be shared by all of the circuits, and the CPU 13 is configured to control all of the circuits.

Figure 37:
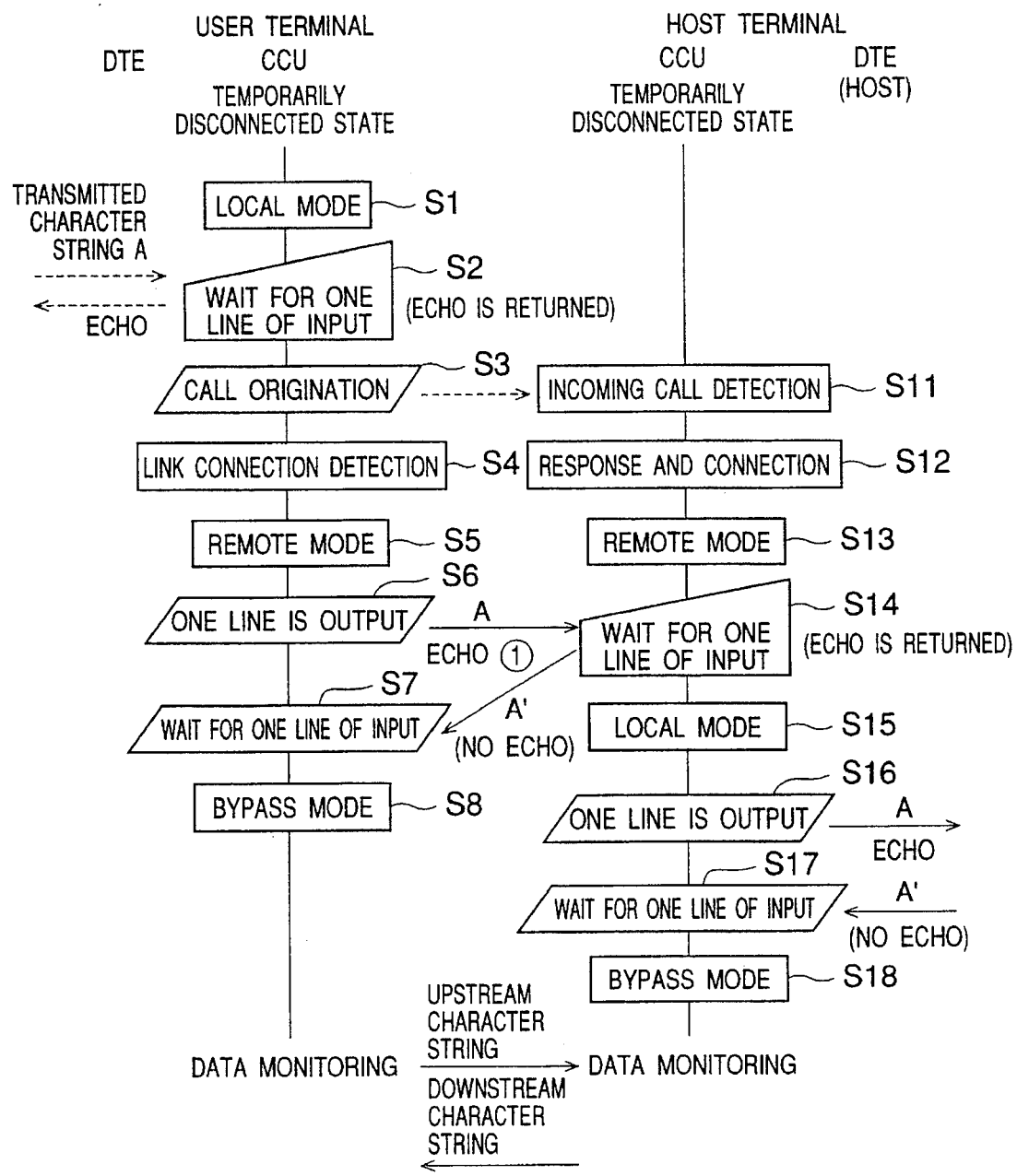
FIG. 37 is a diagram showing a flow of processes involving echoes.

FIG. 37 shows another example of flow of processes. This flow of process is designed to eliminate unnaturalness encountered by the user when no echo corresponding to the first one line of character strings or the like is returned from the distant unit when the circuit becomes re-connected after it has been temporarily disconnected. The hardware configuration required for this elimination may be the same as that of the communication control unit described above. The CPU 13 performs the processes of FIG. 37.

The outline of this communication control unit is the same as that explained with reference to FIG. 10. Upon receipt of the transmitted character string A from the user terminal, the user CCU echoes this to the user terminal (step S2). Thereafter, the user CCU issues a call to the host so that the circuit that had been temporarily disconnected is re-connected (step S3-S5, S11-S13). After the re-connection of the circuit, the user CCU transfers this character string A that had been held to the host CCU (step S6). The host CCU transfers this character string A to the host terminal (step S16). When the host CCU receives an echo from the host terminal, the host CCU disregards the echo and does not forwards the echo to the user terminal (step S17). That is, the echo for the first one line of received character string is absorbed by the host CCU.

Alternatively, the first one line of character string A received from the user end may be immediately echoed to the user CCU (echo ① of step S14 in FIG. 37), and the user CCU absorbs the arriving echo without forwarding it to the user terminal (step S7).

According to this method, it is possible to eliminate the unnaturalness encountered by the user when the circuit is shifted from a temporary disconnection to a re-connection.

As has been explained with reference to FIG. 11, the application of the present invention, whereby the circuit is disconnected in the absence of the data, to the automatic communication results in the decrease in circuit usage efficiency in that brief blank time created between the received (either by the host or by the user) character string and the response thereto causes a re-connection of the circuit, which takes time. The application of the concept whereby the circuit is disconnected in response to the absence of the data has a problem in that the number of times that the circuit is disconnected or re-connected increases so that the call processing load of the network is increased, thus imposing a heavy load on the network.

It will be effective if the above described communication units are configured such that the procedure characteristic of the concept of the present invention is canceled during the automatic communication. It will be more effective if the local automatic communication is performed in the following manner. In this way, it is possible to achieve an economical data communication wherein the circuit connecting time is reduced, and the circuit usage efficiency is increased, without a significant increase in the call processing load, while the procedure of the present invention is successfully applied.

Figure 38:
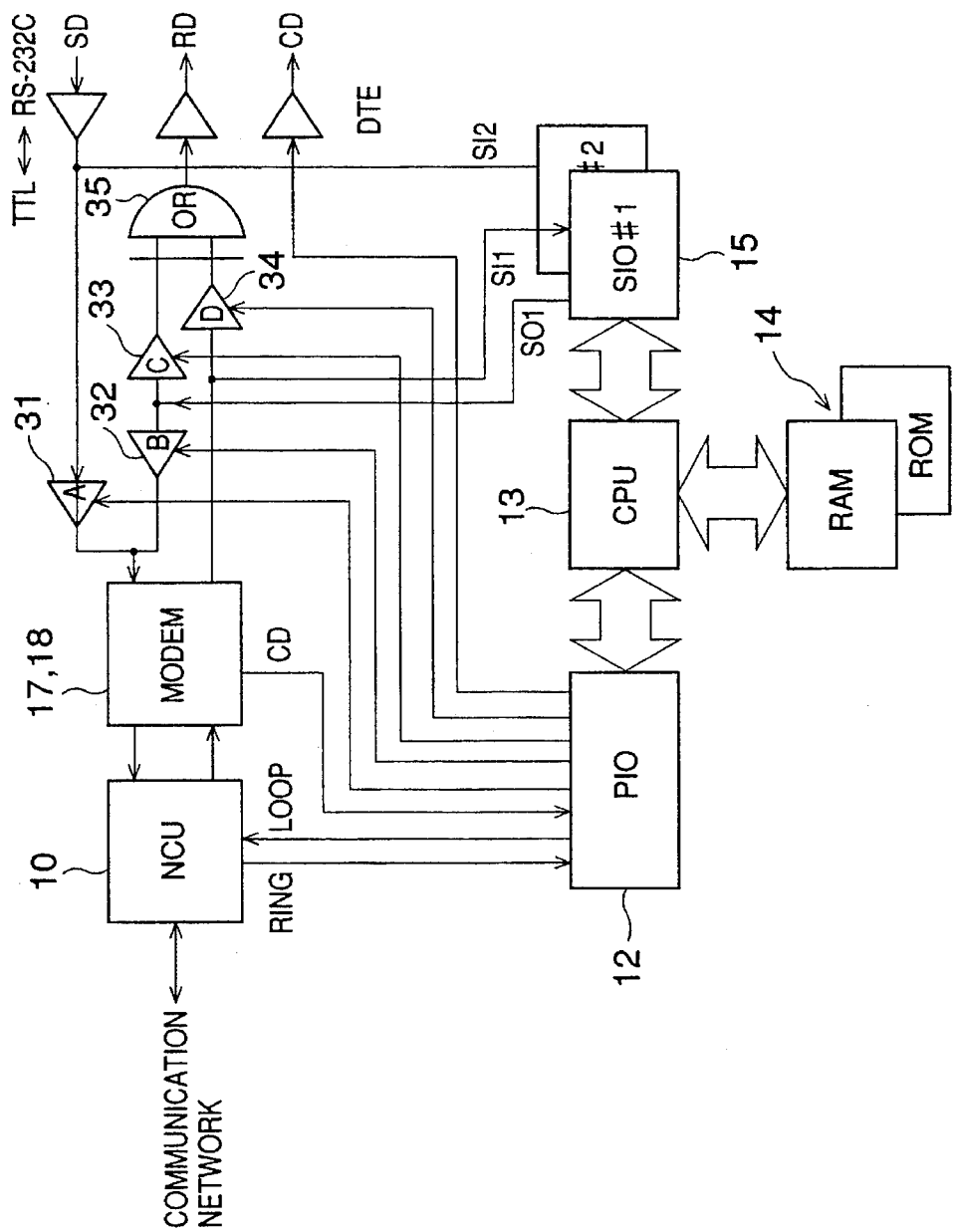
FIG. 38 is a diagram showing the construction of a unit for use in an analog wire telephone system adapted to a local automatic communication.

FIG. 38 shows an example of the communication control unit which implements the local automatic communication. While this unit is obtained as a result of applying the present invention to a communication control unit for use in the subscriber (analog) telephone system, this unit can be used in the ISDN if the modem is eliminated, and the network control unit (NCU) is adapted to the ISDN. While it is assumed that, in the unit shown in the figure, the automatic communication procedure and the result of execution of the automatic communication are stored in the RAM, the automatic communication procedure may be stored in the ROM if there is no chance of modification. The communication control unit of yet another embodiment will be obtained if as many number of NCUs, MODEMs, SIOs and PIOs are provided as the number of circuits involved.

In the figure, RING indicates an incoming call detection signal; LOOP a current loop (call originating/selecting); CD a carrier detection signal; SD transmitted data; RD received data; SI1 a serial input 1; SI2 a serial input 2; SO1 a serial output 1. Control signals such as a DR (data set ready), an ER (data terminal ready), a CS (modem transmission ready) and an RS (request for transmission) of the signals occurring at the DTE end are omitted, these signals not being absolutely necessary.

The data direction control in the network, the terminal and the control part is effected by means of buffer gates 31–34. The direction control using the buffer gates 31–34 is executed by the CPU 13 via the parallel input/output unit 12, the execution depending on whether the host end uses the buffer or the user end uses the buffer, as well as on other conditions. FIG. 39 lists the ON/OFF settings of the buffer gates 31–34 in correspondence with different modes, the settings being necessitated when the CPU 13 effects the direction control. Referring to FIG. 39, "1" indicates a buffer ON (through) and "0" indicates a buffer OFF. "H" at the beginning of a mode description indicates a mode in which the buffer gate is used coupled with the host end, and "T" indicates a mode in which the buffer gate is used coupled with the user end. Numerals indicate modes corresponding to circled figures of FIGS. 16A and 16B (diagrams explaining the invention of claim 12).

Figure 40:
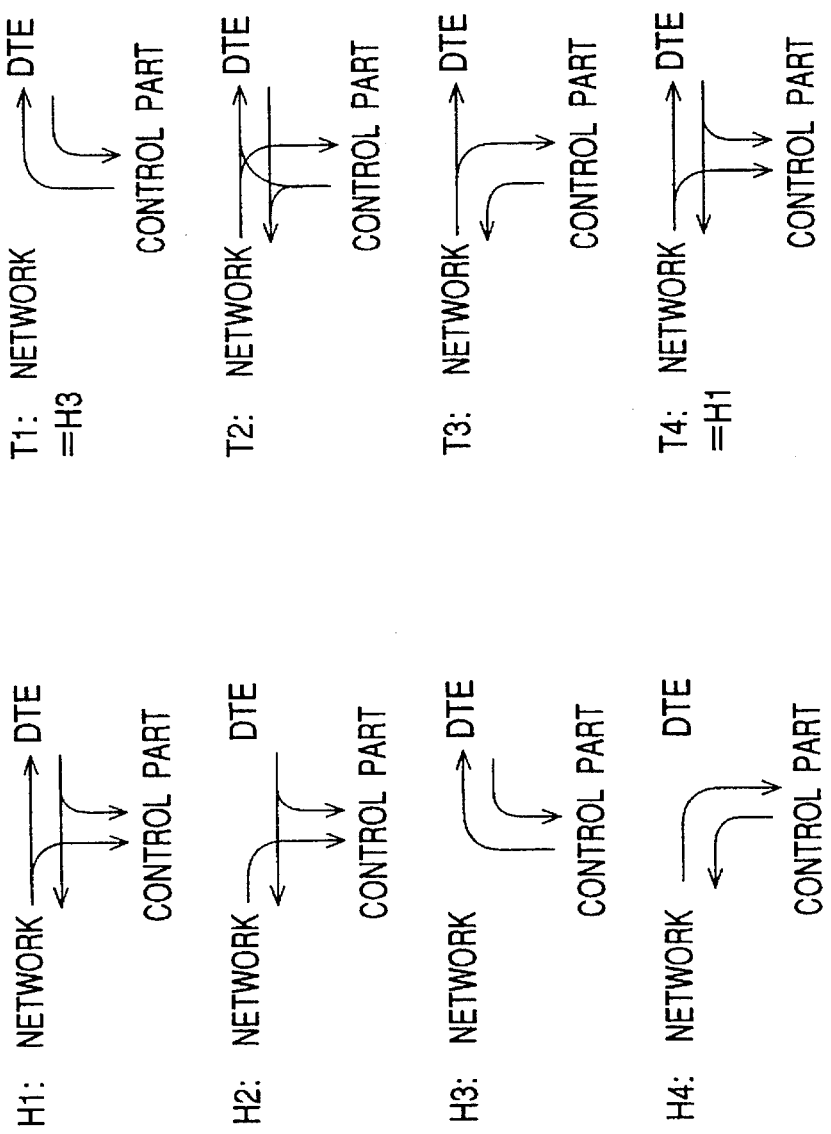
FIG. 40 is a diagram explaining different modes implemented by the buffer gates of the unit of FIG. 38.

FIG. 40 explains different modes.

Figure 41:
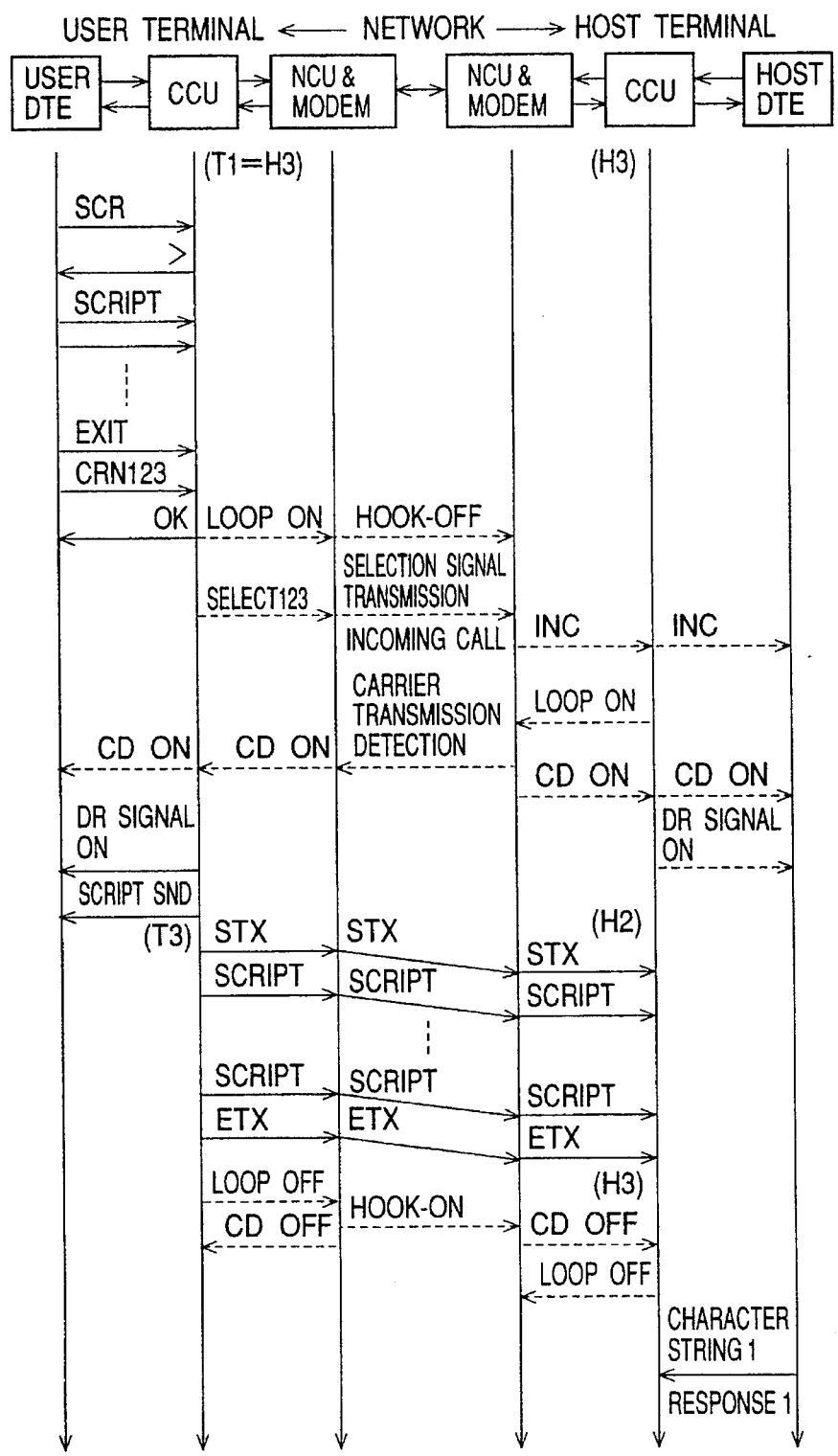
FIGS. 41 and 42 show a sequence of a procedure in which the local automatic communication is performed.

Specifically, FIG. 41 show data flows among the network, the DTE (the terminal or the host) and the control part, the data flows being exhibited in different modes realized by switching the buffer gates 31–34 to the settings listed in FIG. 39. As has been described above, H indicates a mode in which the buffer gate is used coupled with the host, T indicates a mode in which the buffer is used coupled with the terminal, and numerals indicate modes corresponding to circled figures of FIGS. 16A and 16B.

When the invention as claimed in claim 11 and illustrated in FIGS. 14A and 14B is realized by the corresponding setting of the buffer gates, ①, ② and ③) of FIG. 14A correspond to ②, ③ and ④ of FIG. 16A, and ①, ② and ③ of FIGS. 14A and 14B correspond to ①, ③ and 4 of FIG. 16B.

Figure 42:
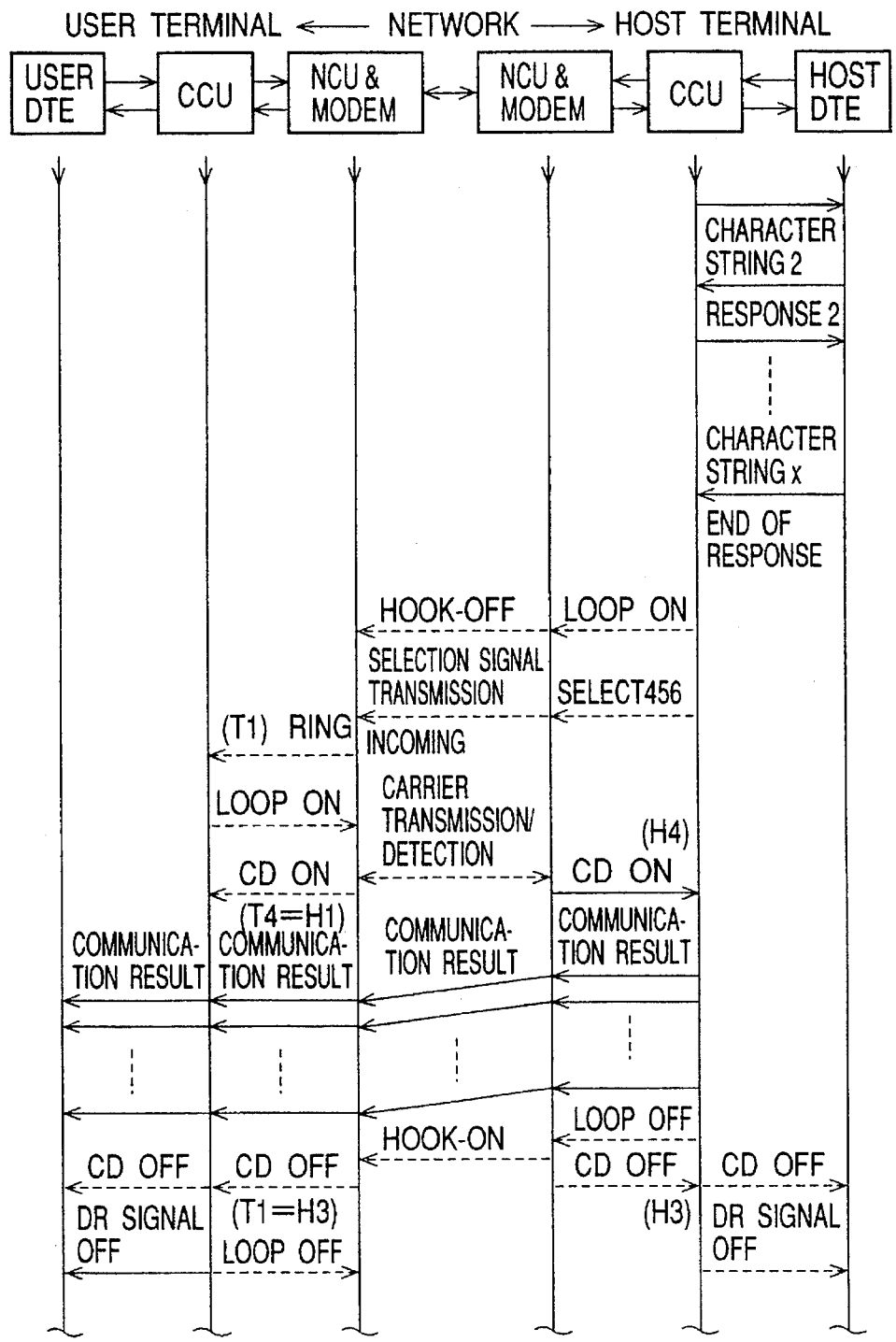

A description will now be given, with reference to FIGS. 41 and 42, of the embodiment of local automatic communication according to the unit described above. FIGS. 41 and 42 illustrates sequences corresponding to the communication method wherein the automatic communication procedure is sent to the distant CCU so that the local automatic communication is executed.

In the figures, those symbols like LOOP denote the same entity as the corresponding symbols in FIG. 38. SELECT indicates the transmission of a selection signal in response to an interruption of the LOOP of FIG. 38 or a DTMF tone; and RING corresponds to the symbol INC. H1, H2 and the like denote modes and correspond to the same symbols of FIGS. 39 and 40. While it is assumed in this example that the V.25bis command set is supported by the unit and English words are used as indication codes, numeric values may be returned.

While the automatic communication procedure is loaded, before the communication, into the control part of the user CCU in the form of a script, the automatic communication script may be transferred in response to an SCR instruction after activating the V.25bis command mode by entering an escape sequence (for example, the turning off of the ER signal) during a communication.

A description will now be give, with reference to the sequence diagram of FIGS. 41 and 42, of the local automatic communication procedure implemented by the unit of the present invention.

The user terminal sends, before the communication is started, the script indicating the automatic communication procedure to the user CCU in response to an SCR that instructs a transition to a script mode. When a call issuing command "CRN123" is received by the user CCU from the user terminal, the user CCU issues an instruction for the connection of the circuit to the user modem. The user modem issues a call to the host.

Upon reception of the incoming call, the host modem issues an incoming call notification "INC" to the host CCU. The host CCU then issues the incoming call notification "INC" to the host terminal. When the circuit is connected, the host CCU issues a circuit connection notification to the terminal (DR signal ON).

When the circuit is connected, the user CCU sends a script indicating the user terminal automatic communication procedure to the host CCU. The host CCU stores the received automatic communication procedure in the automatic communication procedure storing part provided in the RAM. When all the automatic communication procedure has been sent, the user CCU temporarily disconnects the circuit (LOOP OFF).

After the circuit is disconnected, the host CCU executes the local automatic communication with the host terminal, on the basis of the received user terminal automatic communication procedure (character string 1, response 1, character string 2, response 2 ... character string x, a termination response). The result of the execution is stored in the automatic communication execution result storing part provided in the RAM.

When the local automatic communication is completed between the host CCU and the host terminal, the host CCU re-connects the circuit which is coupled to the user end, and which had been temporarily disconnected. The host terminal and the user terminal are not notified of the re-connection of the circuit. When the circuit is re-connected, the host CCU sends, to the user end, all the local automatic communication execution result to the user end. Upon receipt of the execution result, the user CCU transfers the same as it is to the user terminal.

A session is ended by the host such that, as shown in FIG. 42, the host issues an instruction for the disconnection of the circuit, and, when the circuit is disconnected, the host CCU issues a circuit disconnection notification (DR signal OFF) to the host terminal, and the user CCU issues a circuit disconnection notification (DR signal OFF) to the user terminal.

In the embodiment of FIGS. 41 and 42, user terminal is configured to display a message "SCRIPT SND (SENDING)" immediately before the script is sent to the host CCU. The display of this message may be omitted.

Figure 43:
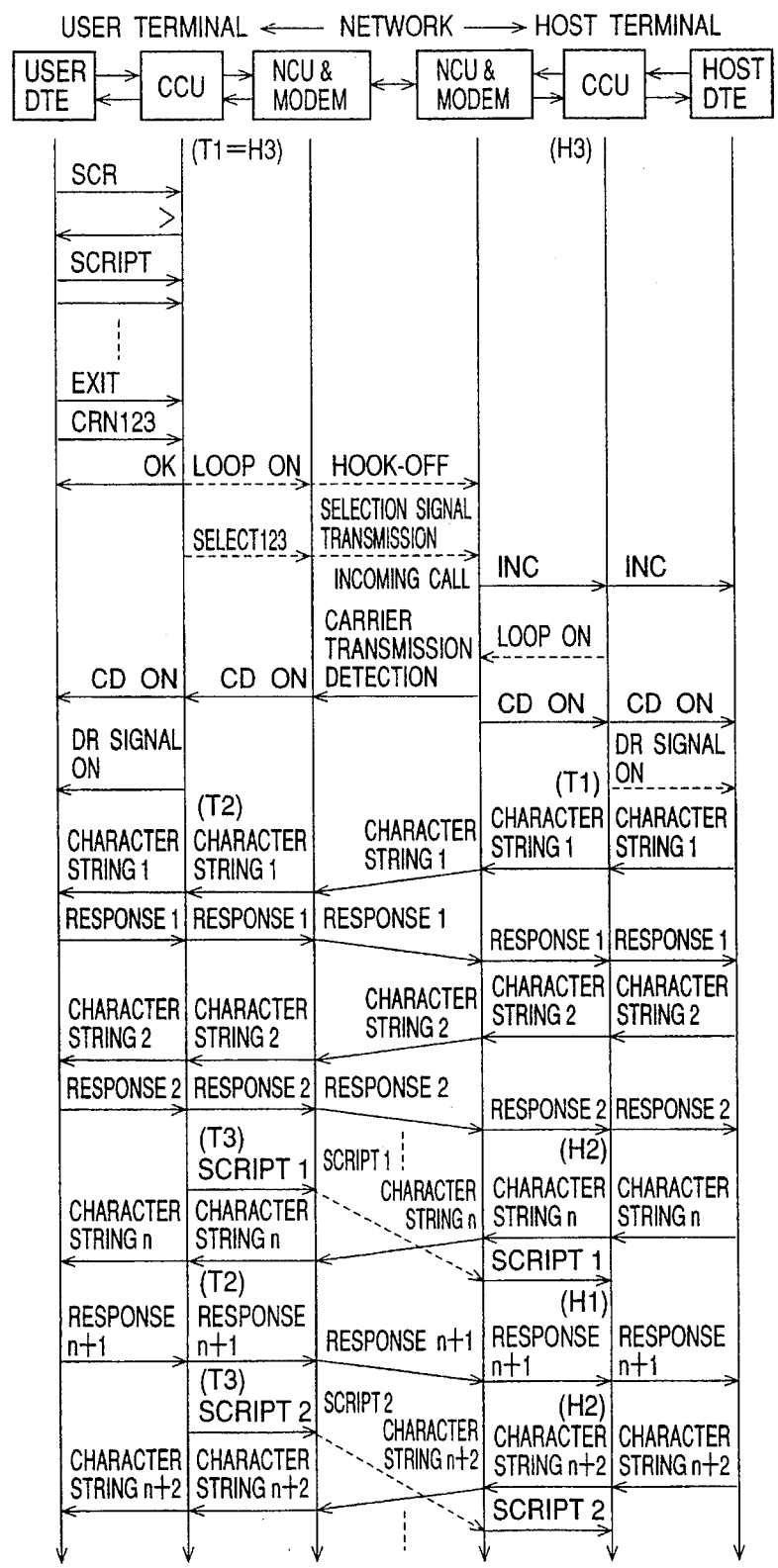
FIGS. 43 and 44 show a sequence of another procedure in which the local automatic communication is performed.
Figure 44:
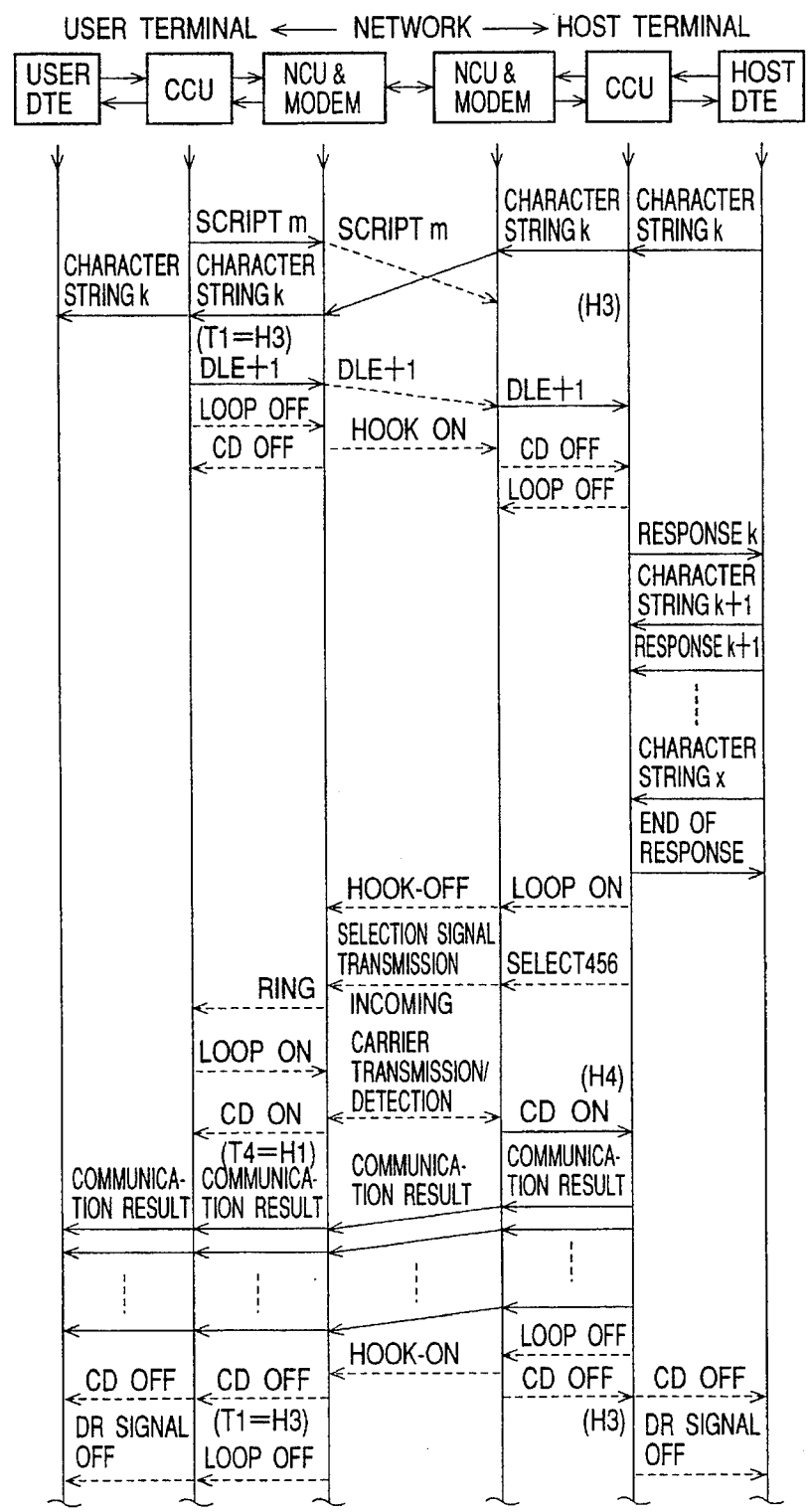

A description will now be given, with reference to FIGS. 43 and 44, of another example of the local automatic communication implemented by the unit of FIG. 38. FIGS. 43 and 44 show a sequence corresponding to the communication method, in which the automatic communication procedure is sent, via the full-duplex circuit, to the distant CCU during the automatic communication, whereupon the circuit is temporarily disconnected, and the rest of the automatic communication is executed in the form of the local automatic communication.

The meaning of the symbols in the figures are the same as those of the previous figures. In this embodiment, too, the V.25bis command set is supported. Like the previous embodiment, the automatic communication procedure is loaded, before the communication is started, in the control part of the user CCU from the user terminal in the form of a script. The automatic communication script may also be transferred in response to the SCR instruction by activating the V.25bis command mode during the communication by entering an escape sequence (for example, the ER signal OFF).

A description will now be given, with reference to the sequence diagrams of FIGS. 43 and 44, of the local automatic communication procedure.

The user terminal sends a script indicating the automatic communication to the user CCU by means of the command "SCR" indicating a transition to the script mode. When the call issuing command "CRN123" from the user is received by the user CCU, the user CCU issues instruction for a circuit connection "LOOP ON" to the user modem. The user modem issues a call to the host end in response to this flow.

When there is an incoming call, the host modem issues the incoming call notification (INC) to the host CCU. The host CCU issues the incoming call notification (INC) to the host terminal. When the circuit is connected, the host CCU issues the circuit connection notification (DR signal ON) to the host terminal.

After the circuit is connected, the normal automatic communication is executed. In this automatic communication, the user CCU sends, to the host CCU, the script, stored in the RAM, indicating the user automatic communication procedure via a full-duplex upstream circuit, while the host end is transmitting character strings via the same downstream full-duplex circuit (character strings n, n+2, ... k, scripts 1, 2 ... m). The host CCU stores the received automatic communication procedure in the automatic communication procedure storing part provided in the RAM. When all the automatic communication procedures has been sent, the user CCU issues an instruction for the temporary disconnection of the circuit ("LOOP OFF").

After the circuit is disconnected, the host CCU executes the rest of the automatic communication in the form of the local automatic communication with the host terminal, on the basis of the user terminal automatic communication procedure received from the user end (response k, character string k+1, response k+1 . . . character string x, termination response). The execution result is stored in the automatic communication execution result storing part provided in the RAM.

When the local automatic communication between the host CCU and the host terminal has been completed, the host CCU re-connects the circuit coupled to the user end. The host terminal and the user terminal are not notified of the re-connection of the circuit. After the circuit is re-connected, the host CCU sends en bloc the local automatic communication execution result that had been stored to the user end. Upon receipt of the execution result, the user CCU transfers the execution result as it is to the user terminal.

A session is terminated (for example, in the case of FIG. 42, the host initiates the termination) such that the host CCU issues an instruction for circuit disconnection. When the circuit is disconnected, the host CCU notifies the host terminal of the disconnection of the circuit (DR signal OFF), and the user CCU notifies the user terminal of the disconnection of the circuit (DR signal OFF).

In the above described two embodiments of the local automatic communication, the script indicating the automatic communication is sent from the user terminal to the user CCU before the communication is started. This transfer of the automatic communication procedure from the user terminal to the user CCU should not necessarily be carried out every time the communication is to be started unless there is a modification made to the automatic communication procedure. The transfer can be omitted by configuring user CCU to retain the script whether the communication is being carried out or not.

In the above described two embodiments of the local automatic communication, the script indicating the automatic communication is sent from the user CCU to the host CCU after the communication is started. This transfer of the automatic communication procedure should not necessarily be carried out every time the communication is carried out unless there is a modification made to the automatic communication procedure. The transfer can be omitted by configuring the host CCU to retain the script that had been stored before.

In the above described two embodiments of the local automatic communication, the call origination for transferring the local automatic communication execution result to the user end is executed by the host CCU. However, the user end may issue the call. In that case, after the first call origination signifying the activation of the automatic communication has been completed, the user end originates a call so as to establish a connection with the host end at a timing when it is determined that the local automatic communication at the host end has been completed. A code or the like indicating whether the connection is for the activation of the automatic communication or for the reading of the execution result may be sent from the user CCU to the host end immediately after the connection is established. The host CCU stores the code until the execution result of the local automatic communication is read (transmitted).

If, as in the above described two embodiments of the local automatic communication, the host end issues a call, the user telephone number must be available. In the case of the ISDN or the digital automobile/portable telephone system, the host CCU is automatically notified of the originator number. In the case of the general subscriber telephone network, a telephone number indicating the destination to which the result of the automatic communication is to be returned may be added to the script. Alternatively, the code such as a user ID for discriminating between users may be provided with a corresponding telephone number.

When the local automatic communication is applied to the communication method using a control unit of FIG. 17, the host monitors the communication and discriminates between sessions according to the user ID. Alternatively, session discrimination control may be performed according to the session identification number, as described with reference to FIG. 29.

In the above described two embodiments of the local communication, the execution result of the local automatic communication may be subjected to data compression and transferred en block. For example, if the data compression ratio is 1:4, the circuit connecting time is reduced to one fourth. This is an added improvement over the reduction in time achieved by the present invention.

Figure 45:
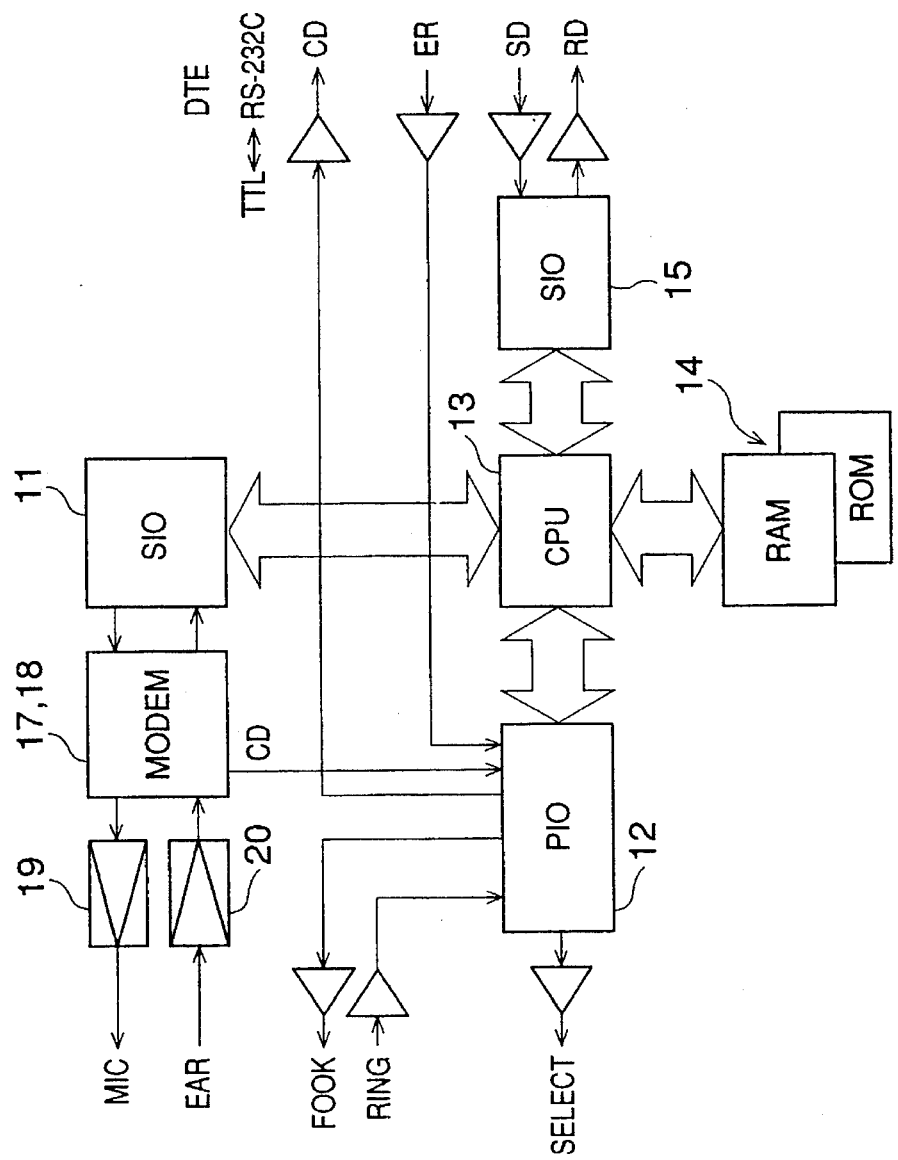
FIG. 45 is a diagram showing the construction of a unit for use in an analog automobile/portable telephone system adapted to the local automatic communication.

FIG. 45 shows another unit which implements the local automatic communication described above. Like the unit of FIG. 33, the unit of FIG. 45 is obtained by applying the present invention to a communication control unit of the automobile/portable telephone system. However, the same unit may be used as a communication control unit in the digital portable telephone system, by removing therefrom the modem parts 17 and 18, and the audio amplifier units 19 and 20, and by feeding the SIO (serial input/output) signals to and extracting the same from the portable telephone set.

Referring to FIG. 45, MIC indicates a microphone terminal; EAR a earphone terminal; FOOk a response/call originating signal; RING an incoming call detection signal; SELECT a selection signal; CD a carrier detection signal; SD transmitted data; RD received data; and ER a terminal ready signal. Control signals such as the CS (modem transmission ready) or RS (request for transmission) of the terminal (DT) signals are omitted, these signals not being absolutely necessary.

While the communication control unit of FIG. 38 which unit implements the local automatic communication realizes the data direction control partly by hardware means by employing the buffer gates 31–34, the unit of FIG. 45 realizes the same entirely by software means by connecting the signal from the network to the serial input/output unit 11 and connecting the signal from the terminal (DTE) to the other serial input/output unit 15.

In the unit of FIG. 38 which implements the local automatic communication method, the gates 31–34 may be replaced by crossbar switches, so that the switching control may be realized by software means using the CPU 13. Similarly, the unit of FIG. 45 may be modified such that the gates are replaced by crossbar switches.

The sequence of the local automatic communication in the unit of FIG. 45 is the same as that of the two embodiments already described (FIGS. 41–44). LOOP in FIG. 38 corresponds to FOOk of FIG. 45.

In the above described embodiments, no measure such as data correction is taken with respect to the data, and no data compression is performed. This may result in a problem in that, if the circuit such as the automobile or portable telephone circuit characterized by poor circuit (or channel) quality is used, data errors or data drops may occur, resulting in a poor transmission quality. Further, in the case in which the terminal (host) response is not so bad, and the blank time (when no data is transmitted or received) is relatively short, there is a problem in that little economical benefit can be derived from reducing the connecting time by temporary disconnections of the circuit, and in that the further improvement of the circuit usage efficiency can not be hoped for.

A description will now be given of the packet method which can resolve the above problems. According to the embodiments described below, the improvement in the transmission quality of the communication control units already described, and the improvement in the economical benefit as well as in the circuit usage efficiency by the reduction of the circuit connecting time result.

Figure 46:
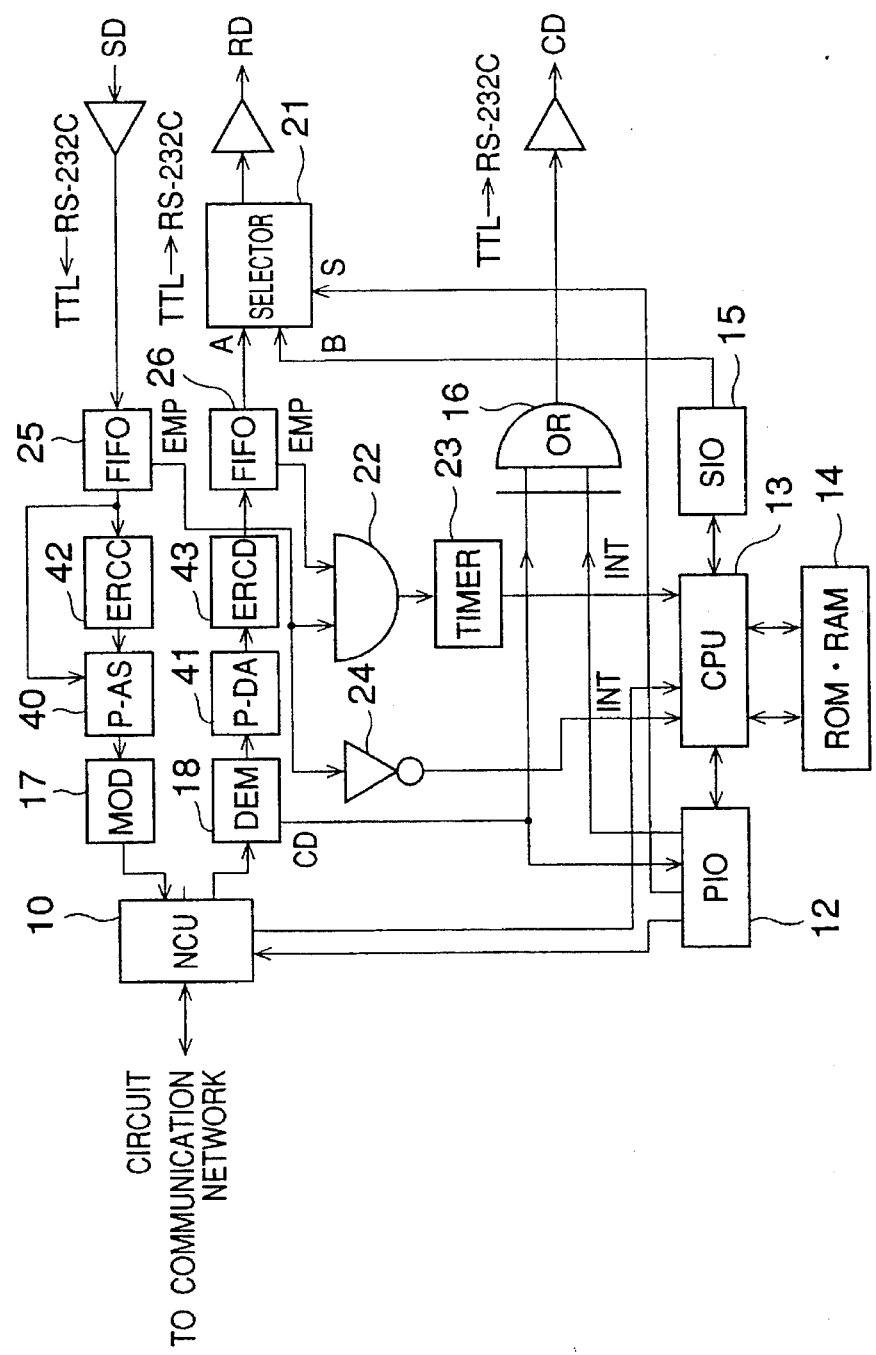
FIG. 46 is a diagram showing the construction of a unit for use in an analog wire telephone system adapted to a packet method.

FIG. 46 shows a communication control unit which implements the packet method of the present invention. This unit is obtained by applying the concept of the present invention to a communication control unit for use in the analog telephone system.

The description of the unit of FIG. 46 will be given by comparing it with the unit of FIG. 34. The unit of FIG. 46 comprises an error correction coding unit 42 and a packet assembly circuit 40 in the transmitter part, and comprises an error correction decoding unit 43 and a packet disassembly circuit 41 in the receiver part. With this arrangement, the transmitted data is subjected to error correction coding and turned into a packet before transmission, while the received data is subjected to packet disassembly and error correction decoding.

In the unit of FIG. 46, there is employed a method whereby a non-communication state is identified such that a period of time in which no communication takes place is measured, and a determination of a non-communication state is made when that period of time exceeds a preset value. The AND gate 22 ANDs the empty signals EMP (positive logic) from the transmission buffer 25 and the reception buffer 26, the output signal from the AND gate 22 activating the timer 23 so that an interruption is issued to the CPU 13 after a predetermined period of time has elapsed.

A packet is assembled every time a CR code is detected. The error correction coding unit is configured to perform error correction only, and to output the data unmodified when an error that can not be corrected is detected.

Figure 47:
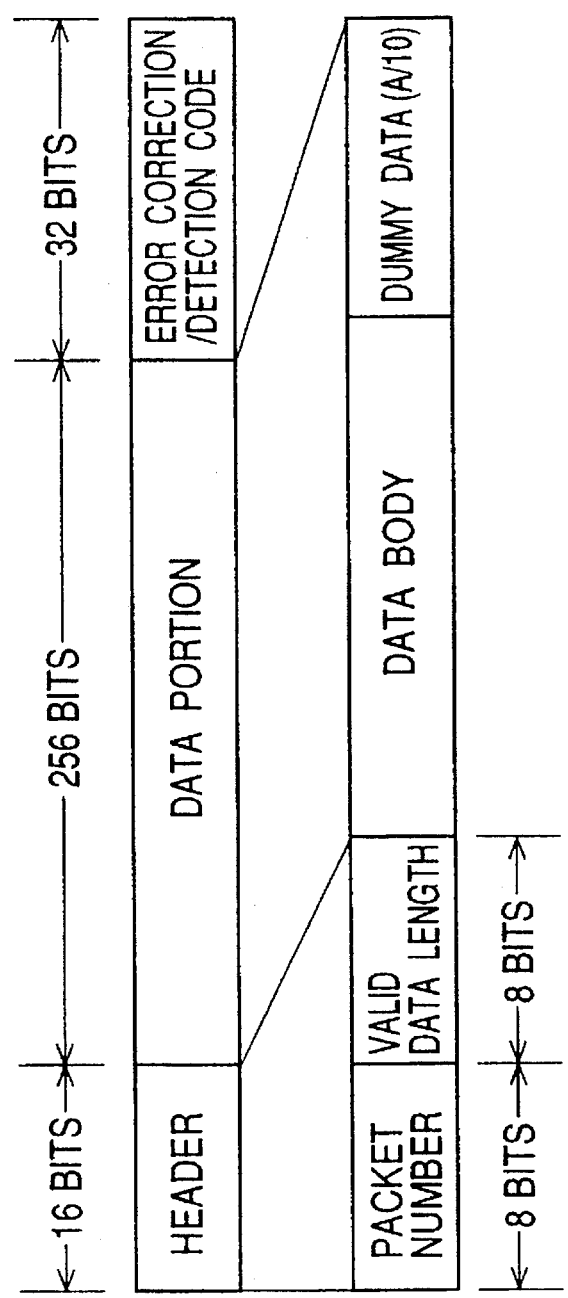
FIG. 47 is a diagram showing an example of a format of a packet.

FIG. 47 shows an example of the packet format. As shown in the figure, the packet comprises a header portion, a data portion and an error correction code portion. The header portion contains a packet number and a valid data length. While it is assumed in this example that the packet length is fixed, it may also have a variable length.

According to the communication control unit of this embodiment, data is subjected to error correction coding/decoding. Hence, a data error occurring during the transmission can be corrected, thus improving the transmission quality. It is also to be noted that, since the data are transmitted in the form of packets, it is possible to increase the circuit usage efficiency. The temporary disconnection and subsequent re-connection procedure of the present invention can be applied to the blank time (non-communication interval) which are produced as a result of the packet method.

While the unit of FIG. 46 realizes the packet assembly/disassembly and the error correction/detection coding/decoding by hardware means (the packt assembly circuit 40 and the packet disassembly circuit 41; and the error correction coding unit 42 and the error correction decoding unit 43), the same functions may be realized entirely by software means under the control of the CPU 13.

Figure 48:
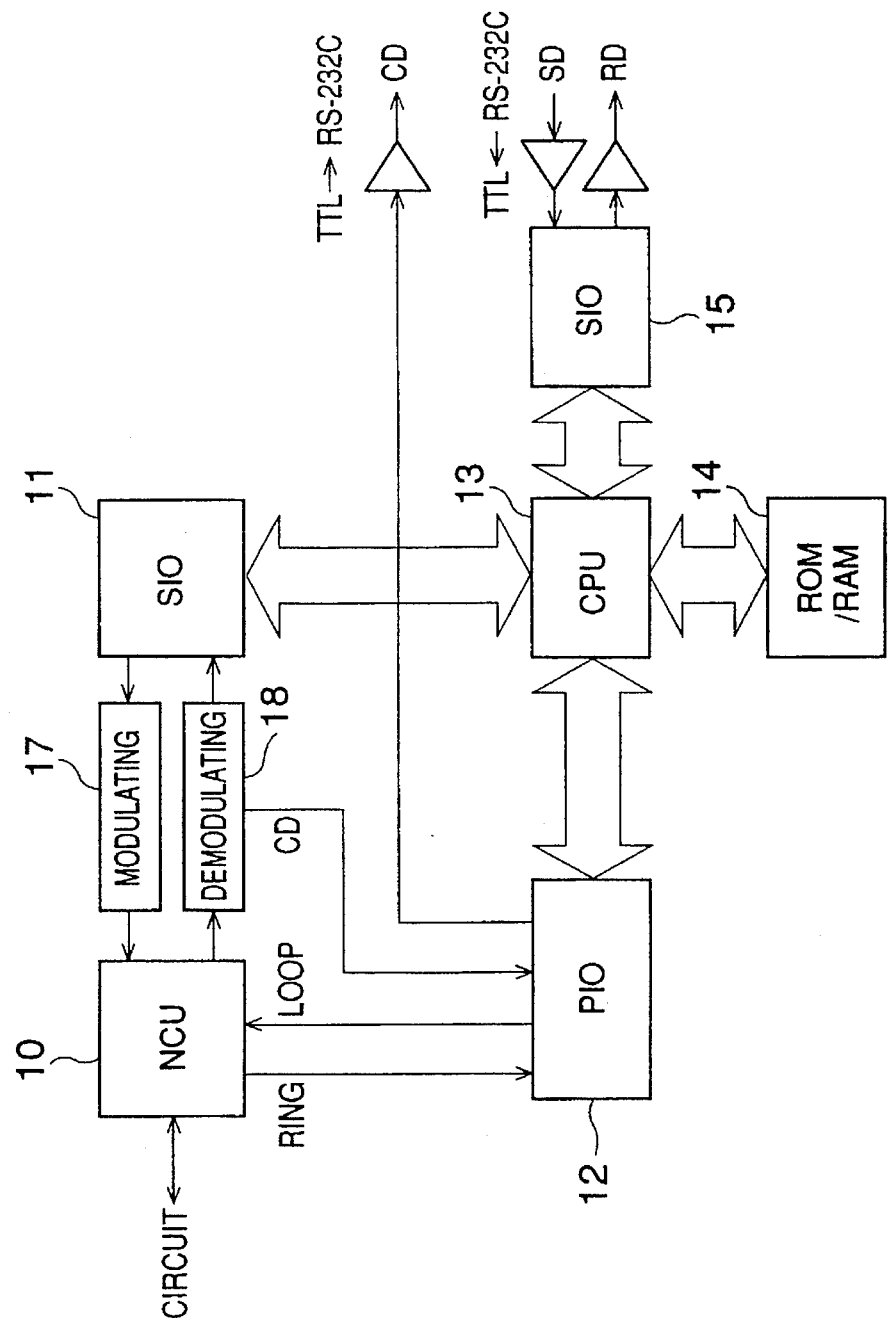
FIG. 48 is a diagram showing the construction of another unit for use in an analog wire telephone system adapted to the packet method.
Figure 49:
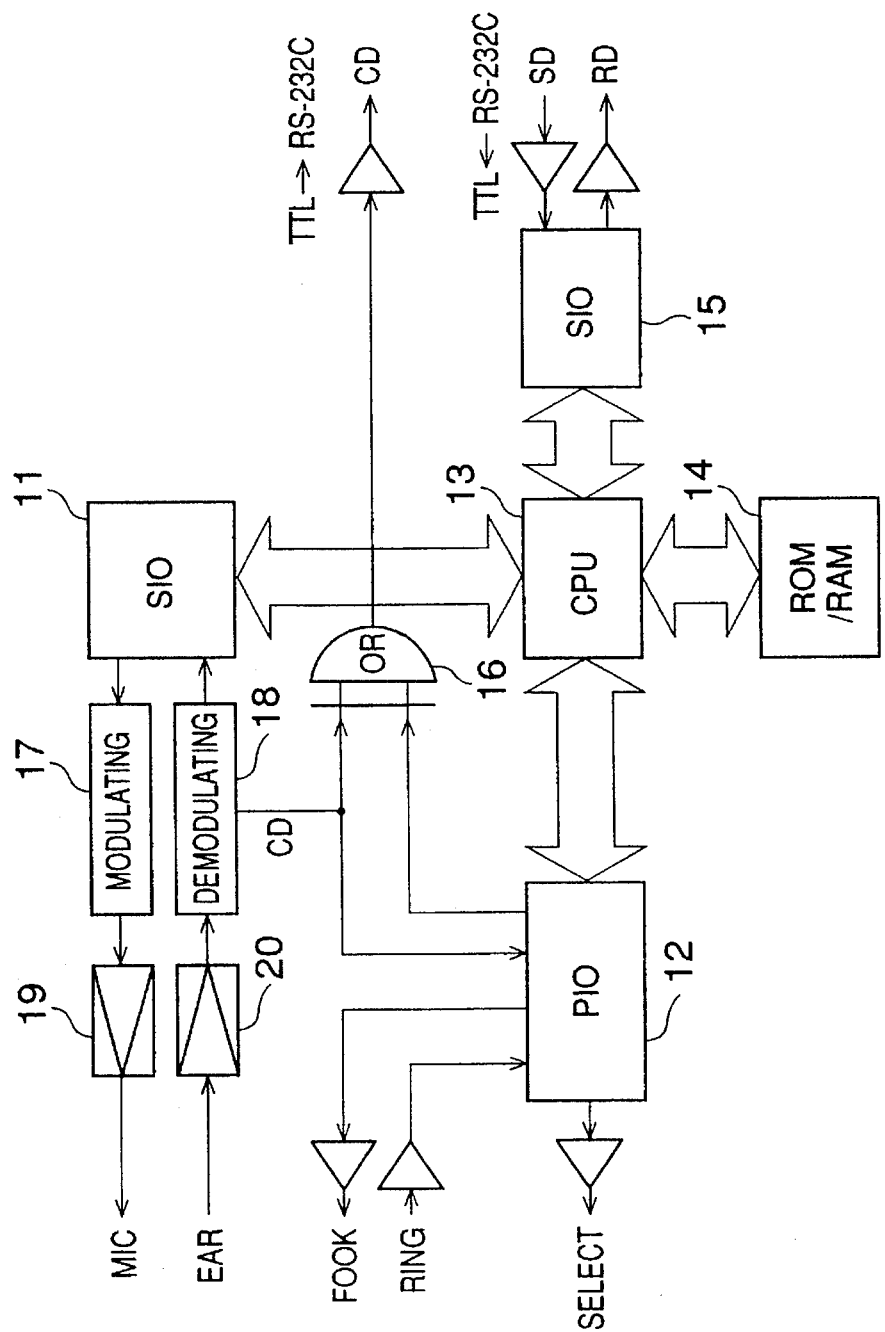
FIG. 49 is a diagram showing the construction of a unit for use in an analog automobile/portable telephone system adapted to the packet method.

FIGS. 48 and 49 show the construction of other embodiments of the packet method. The unit shown in FIG. 48 is obtained as a result of applying the concept of the present invention to a communication control unit for use in the analog wire telephone system, while the unit shown in FIG. 49 is obtained as a result of applying the concept of the present invention to a communication control unit for use in the analog automobile/portable telephone system. As in the case of the other described units based on the unit for used in the analog automobile/portable telephone system, the unit of FIG. 49 can be used in the digital automobile/portable telephone system by removing the audio amplifier units 19 and 20, the modulating unit 17 and the demodulating unit 18, and by connecting the serial input/output unit 11 and the external input/output.

In the units of FIGS. 48 and 49, the packet assembly/disassembly and the error correction/detection coding/decoding are realized by software means under the control of the CPU 13. Moreover, compression/expansion of the transmitted/received data is also achieved by software means. Also, detection of a packet that cannot be corrected, request for transmission of a packet and control of retransmission can be realized by software means under the control of the CPU 13.

A description will now be given of the operation of the units of FIGS. 48 and 49.

When CPU 13 detects it is impossible to correct an error in a received packet, that packet is removed from the reception buffer, and a packet for requesting a retransmission of that packet is sent to the distant CCU. In this way, it is possible to receive the packet that cannot be corrected, resulting in an improvement in the data quality.

When there are other packets to be transmitted or received, the above described retransmission control degrades the data transmission efficiency. In such a case, the retransmission control is halted.

As has been described with reference to FIG. 23, the transmission efficiency and the response can be improved by performing comression/expansion of the data.

Figure 50A:
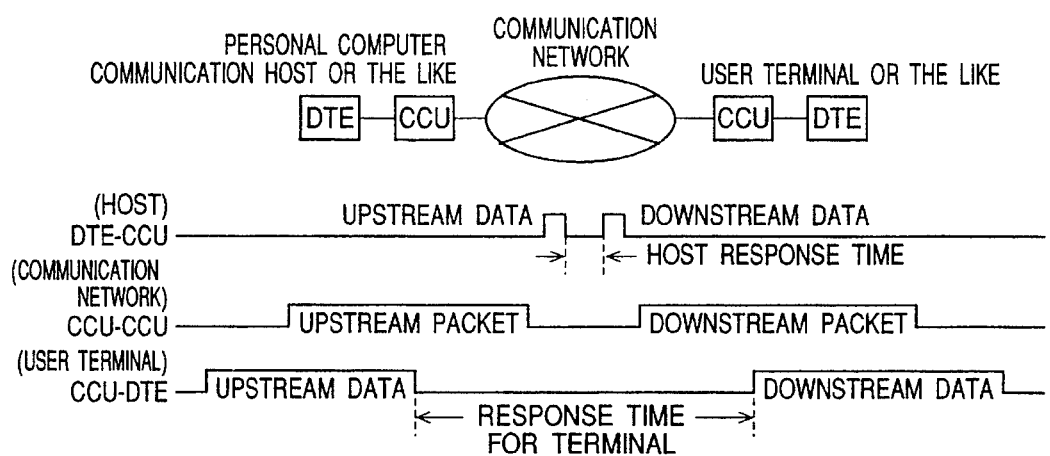
FIGS. 50A and 50B are diagrams explaining the response time in the packet method.
Figure 50B:
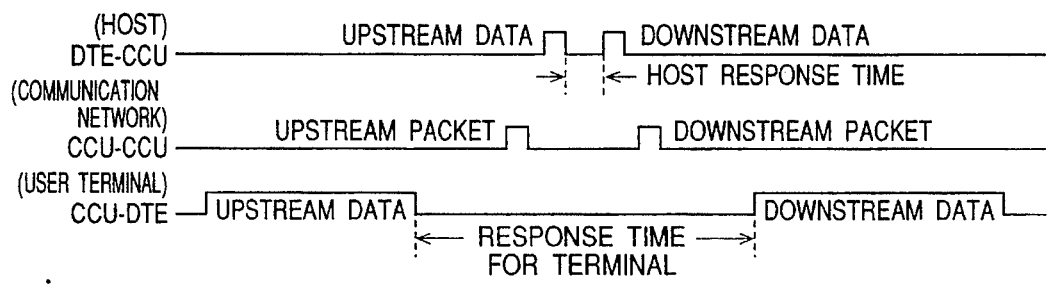

In the above described embodiments, the terminal speed (DTE—CCU speed) need not be the same as the circuit speed. However, the faster the terminal speed, the better the response. FIGS. 50A and 50B explain the response time.

FIGS. 50A and 50B show the temporal relationship between the data transmitted from the user terminal to the host, and the response data. FIGS. 50A and 50B show a case in which the DTE—CCU transmission speed in the user terminal is the same as the circuit speed (between CCU—CCU), and the DTE—CCU transmission speed in the host is greater than the circuit speed.

FIG. 50A shows a case in which no data compression is performed; and FIG. 50B shows a case in which data compression is performed. By compressing data exchanged between two CCUs, the response time measured from the terminal side can be reduced. By combining the measure for increasing the speed of the terminal speed and the data compression, an improvement in the response can be achieved.

Figure 51A:
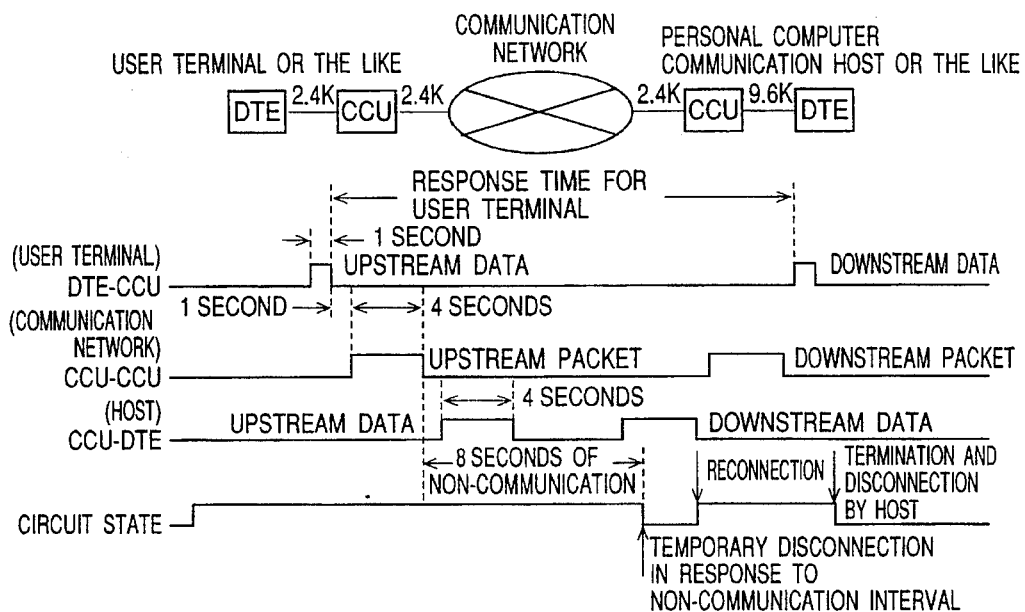
FIGS. 51A and 51B are diagrams explaining the operation of the units adapted to the packet method.
Figure 51B:
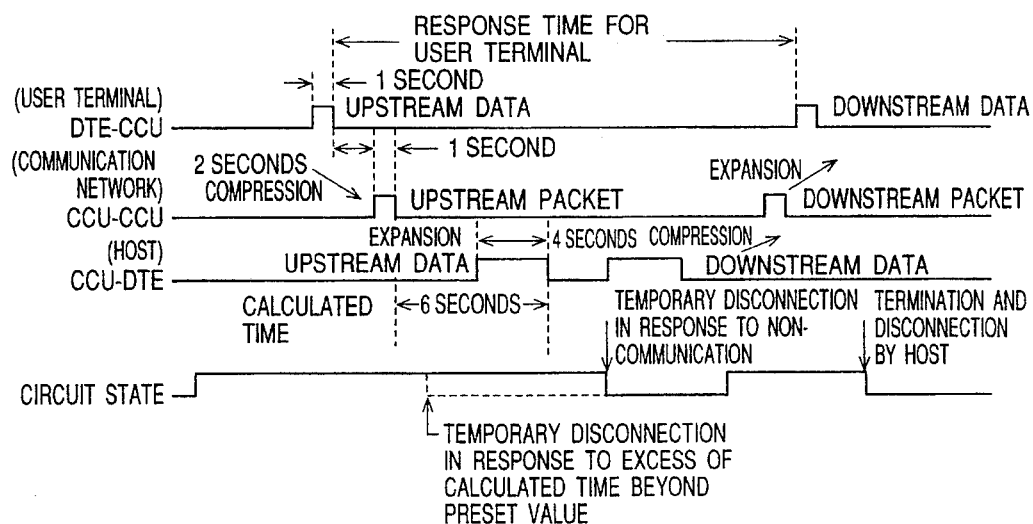

The circuit connection time can further be reduced by allowing the packet transmitting end to calculate the time required for the receiving end which has received the packet obtained as a result of data compression to expand the data, and by causing the circuit temporarily disconnected when it is found that the calculated time exceeds the preset value. FIGS. 51A and 51B explain the operation of this embodiment. FIGS. 51A and 51B show data occurring at different timings along a time line.

FIG. 51A shows a case in which data compression is not performed; and FIG. 51B shows a case in which data compression is performed. The circuit state indicated by a broken line in FIG. 51B represent a case where the circuit is temporarily disconnected because the transmission time required for the data expansion to be performed has exceeded a preset value.

As a specific example, the user terminal speed and the circuit speed of 2.4 kbps, the host terminal speed of 9.6 kbps, and the data compression ratio of 1:4 are assumed. It is further assumed that the data volume is 960 bytes, and 10 bits are required to transfer one byte of data according to the start-stop synchronization scheme. It is also assumed that the packet assembly and disassembly takes 1 second, and the data compression and expansion takes 1 second.

It is assumed that the circuit is temporarily disconnected when no communication is carried out on the circuit for 8 seconds. It is assumed that, if the determination of the disconnection of the circuit is to be based on the magnitude of the transmission time required by the data expansion etc., the transmitter CCU temporarily disconnects circuit when the transmission time exceeds 6 seconds (actually 8 seconds, considering the response time).

As can be seen in FIGS. 51A and 51B, the temporary disconnection of the circuit reduces the circuit connecting time as well as the response time to a larger degree when the transmitted data is subjected to compression/expansion and when the calculated time required for data expansion at the receiving end exceeds a predetermined value (FIG. 51B) than when the data is not subjected to compression/expansion (FIG. 51A).

An instruction for a temporary disconnection of the circuit in response to an excess of the transmission time required for data expansion etc. is built into a packet (header, etc.) to be sent to the distant CCU. Upon reception and decoding of the packet, the receiving CCU immediately disconnects the circuit.

In the above described embodiments of the packet method, the timing of the temporary disconnection of the circuit is determined on the basis of the measurement of the non-communication time. However, the timing may be determined on the basis of the reception of a transmission or reception of a specified character string. Moreover, while it is assumed in the above description that the disassembly of the packet is conducted after the reception of the packet, it is also possible to disassemble the packet during the reception if possible. The assembly of the packet may also be conducted while the data is being input at the terminal.

While it is assumed in the above described embodiments of the packet method that the empty signals of the transmission buffer and the reception buffer is monitored, the input signal of the demodulating unit may be monitored as the signal received via the network. By monitoring the input signal of the demodulating unit, the delay caused by the transfer from the demodulating unit to the reception buffer need not be considered, and it is possible to prevent an erroneous determination that no packet is received while actually there is on the circuit.

While it is assumed in the above described embodiments of the packet method that the packet assembly is triggerd by the reception of the CR code, it may also be triggered by the occurrence of the excess of the amount of data received from the terminal beyond a preset value. The packet assembly may also be triggered by the occurrence of the excess of the time period in which no data is input from the terminal beyond the preset time. Alternatively, the packet assembly may be based on a combination of the above two factors.

While it is assumed in the above described embodiments of the packet method that the error correction/detection coding/decoding and the data compression/expansion are executed by dedicated hardware or by software means under the control of the CPU 13, these processes may be effected by a DSP.

In the above described embodiment, it is assumed that all of the circuit switching newtork sections are subjected to disconnection when there are a plurality of circuit switching newtorks in which different modes of inter-terminal management are applied. However, such an arragement imposes a heavy load on the network and causes the control to be complex. In consideration of this, it is possible to subject only the data communication using the automobile/portable telephone network, which are characterized by high circuit charge, to a temporary disconnection, so as to reduce the circuit charge and to improve the circuit usage efficiency. FIG. 52 shows an embodiment of this arrangement.

The embodiment of FIG. 52 is obtained as a result of applying the concept of the present invention to the data communication involving the use of digital automobile/portable telephone network. Referring to FIG. 52, 58 indicates a host communication center and 53 a mobile station (user terminal). The mobile station 53 includes a personal digital cellular terminal (PDC) 54, an MNP adaptor 55 and a terminal 56. The host communication center 58 and the mobile station 53 are connected to each other via the general public communication network 57 and the automobile/portable telephone network. 50 indicates a automobile/portable telephone base station (MBS); 51 a automobile/portable telephone exchange (MCC); and 52 a data service control unit (the DSCC, which is a part of a unit built in the MCC).

The quasi packet protocol shown in the figure is the protocol for implementing the communication control method of the present invention. The function of the aforementioned communication control unit of the present invention is built into the data service control unit 52 of the automobile/portable telephone network and the MNP apaptor 55 of the mobile station.

In this embodiment, only the automobile/portable telephone network sections, characterized by high circuit charge, are subjected temporary disconnection and the subsequent re-connection in response to the absence/presence of the transmitted data, while the remaining fixed (wire) network, which is characterized by a low circuit charge, is held in use.

According to this embodiment, the following merits are obtained:

(1) The circuit charge for the mobile mobile communications network becomes in proportion to the data amount, reuslting in a large reduction in the circuit charge in the entire system.

(2) The channel efficiency of the radio network sections is improved, and the effective use of frequencies is possible.

(3) The quasi packet is used only in the mobile communications network and does not affect the fixed network. Thereby, individual handling of the network sections becomes possible.

To summarize the present invention, the data communication using the circuit switching newtork is performed such that the circuit is automatically disconnected when no data is transmitted or received. In a manner similar to the packet switching system, the user is not charged for the use of the disconnected network section. Hence, an economical data communication is possible.

It will also be appreciated that, even in a manual communication, the communication control unit automatically disconnects the circuit temporarily, without the intervention of the user. The user is required to be less attentive during the communication, and thus can benefit from a larger degree of convenience.

When the communication method is applied to the radio communications network sections such as the automobile/ portable telephone network sections, the circuit is released while the data is absent. While this increase the call processing load of the network because the temporary disconnection and the re-connection are performed a number of times, the efficient use of the radio frequency becomes possible.

The present invention is configured such that the terminal (for example, a user terminal engaged in a personal computer communication or a host terminal of the personal computer communication) is not notified of the disconnection and re-connection of the circuit and are maintained in a recognition that the circuit is being connected, the communication method and the communication control unit of the present invention can be applied to the terminals without any modifications to the user terminal software and the host terminal software, thus increasing the convenience for the user and improving the efficiency in the communication.

It is true, however, that, in those types of communication, such as the commercial personal computer communication, in which the user is charged in accordance with the communication time, the user continues to be charged for the use of the circuit even during the temporary disconnection. However, this type of charge based on the communicating time is relatively inexpensive as compared with the charge of the automobile/portable telephone network. For example, the commercial personal communication carries a charge of 10 yen/minute, while the automobile/portable telephone network carries a charge of 10 yen/7 seconds.

The communication procedure of the present invention may be released from use during the automatic communication. Accordingly, the circuit is not temporarily disconnected while the user terminal is engaged with the automatic communication, so that no time is wasted for the determination and learning for the disconnection of the circuit, and no communicating time is wasted for the re-connection of the circuit.

An arrangement whereby it is possible to discriminate between a plurality of terminals in accordance with session numbers makes it possible to discriminate between sessions in the 1:n communication like the personal computer communication. It is thus possible to resume the session after the circuit is temporarily disconnected.

The communication method of the present invention whereby the session is terminated in response to the session end notification resolves a problem that the session can be terminated only by the terminal and the network or the distant terminal cannot terminate the session. Moreover, the terminal can end a session so as to release the circuit in response to an occurrence of a time-out, when it is found that the session cannot be maintained because of a failure in the distant terminal (host), a failure in the network or the like occurring during the temporary disconnection of the circuit.

Figure 54:
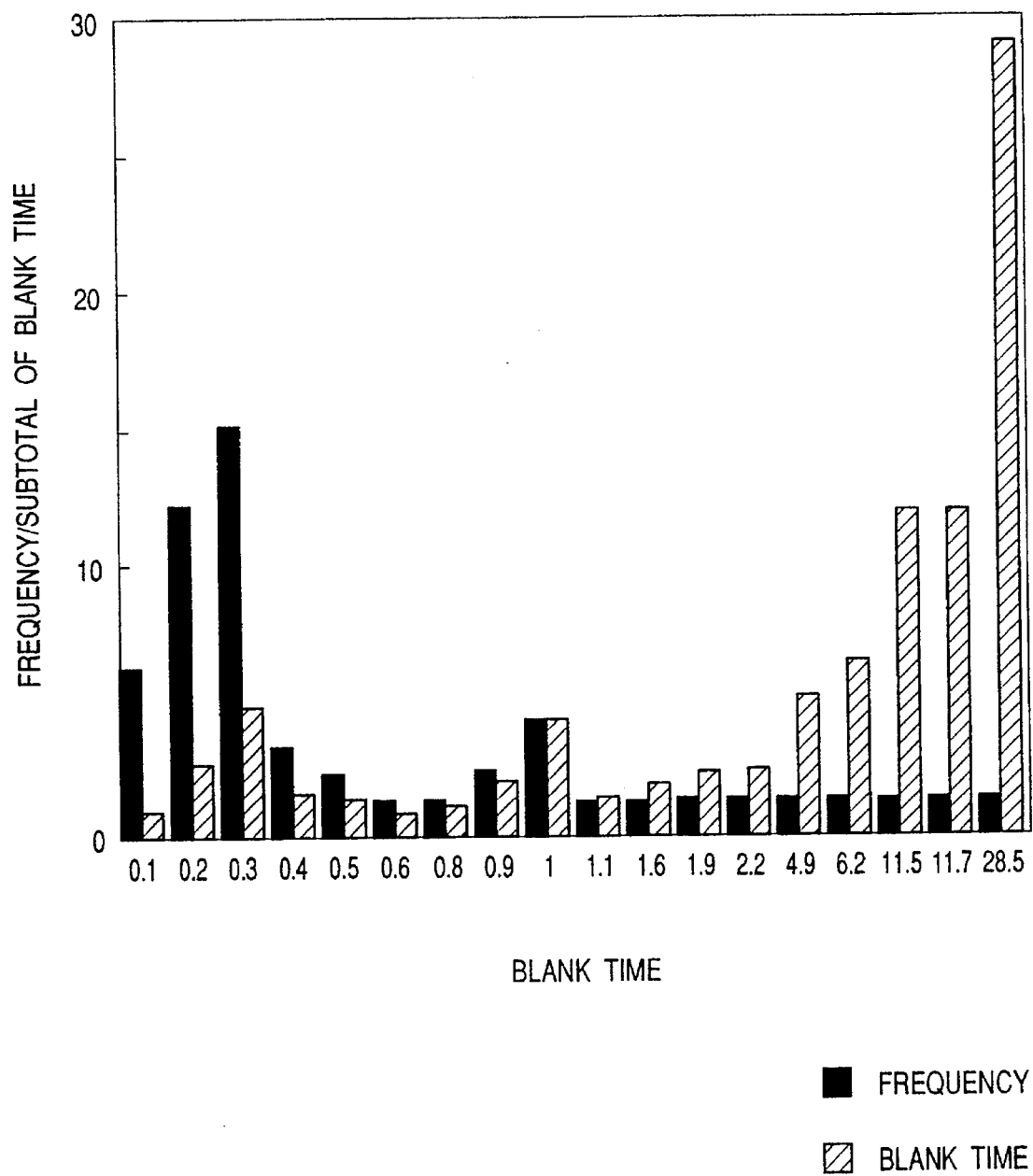
FIG. 54 is a graph showing the distribution of the blank time in a normal communication.
Figure 55:
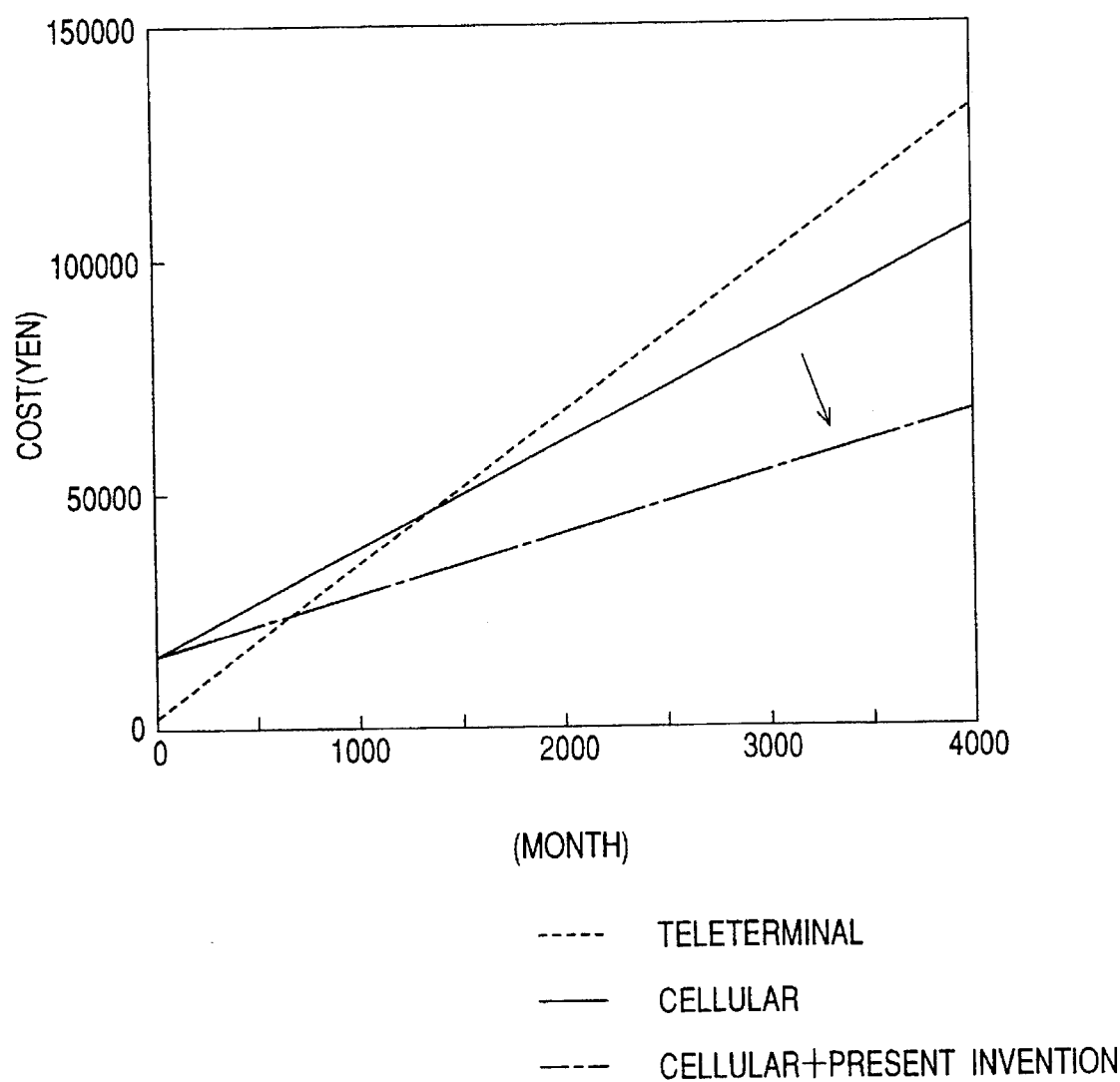
FIG. 55 is a graph showing the relationship, based on the current analog automobile/portable telephone system, between the communication cost and the monthly communication volume.

A description will be given of the economical benefit derived from the present invention. The measurement result obtained when the analog wire telephone system is utilized to perform a manual personal computer communication is shown below.

modem communication speed 2400 bps
   total communicating time 140.2 sec
   sum of blank time 87.0 sec
   amount of data received by the user terminal 8948 bytes
   amount of data transmitted by the user terminal 468 bytes
   Therefore, the substantial communication speed is
   8948/140.2=63.8 bytes/sec FIG. 54 shows the duration and frequency of the blank time (time period in which the data is absent). FIG. 55 shows a graph based on FIG. 54. It will be noted that the blank time having a duration longer than a certain value tends to exceed that value by a great margin. This is why the present invention is configured to detect the non-data state on the basis of the duration thereof. In this case, the circuit is temporarily disconnected when the blank time has exceeded 3 seconds. Too short a time set for the purpose of this determination results in a wastefulness, considering the time required for the re-connection of the circuit.

It will be learned from FIG. 53 that the blank time having a duration longer than 3 seconds totals 63.3 seconds. Accordingly, the substantial communication speed disregarding the blank time having a duration longer than 3 seconds is 8948/(140.2−63.8)=116.4 bytes/second.

If we don not consider the overhead for the re-connection, the above is the substantial communication speed achieved when the communication procedure of the present invention is applied. Accordingly, a 45% reduction in the communication fee charged for the use of the circuit results.

For reference, FIG. 55 shows the communication fee charged for the current analog automobile/portable telephone system, the communication fee being contrasted with the volume of communication per month. Normally, the volume of communication per month is around 1–2 Mbytes. For comparison, the same cost-volume relationship in the teleterminal (Japanese radio packet switching system) is also shown. The access charge of the VAN is not included. The basic communication charge of the automobile/portable telephone is 16000 yen/month, and the usage fee is 10 yen/7 seconds, while the teleterminal carries the basic charge of 2400 yen and the usage fee of 1.2 yen/32 bytes (15% discount for the communication volume exceeding 128 bytes/month).

The communication procedure of the present invention including the control of an echo eliminates the unnaturalness for the user when the circuit that had been temporarily disconnected is re-connected.

The communication procedure of the present invention allowing the local automatic communication to be performed in the automatic communication mode prevents an increase in the call processing load of the network coming from frequent temporary disconnection and re-connection.

According to the communication procedure of the present invention whereby the local automatic communication is performed such that the automatic communication procedure is sent while the data is being received from the distant terminal via the full-duplex circuit, no extra time frame is necessary to send the automatic communication procedure. Thus, the circuit occupying time is shortened, and the economical benefit is increased.

According to the communication procedure of the present invention which makes possible a discrimination between a plurality of terminals and the local automatic communication therein, it is possible for the host to be accessed by a plurality of user terminals while the benefit of the present invention remains effective for the accesses from the plurality of terminals.

Figure 57:
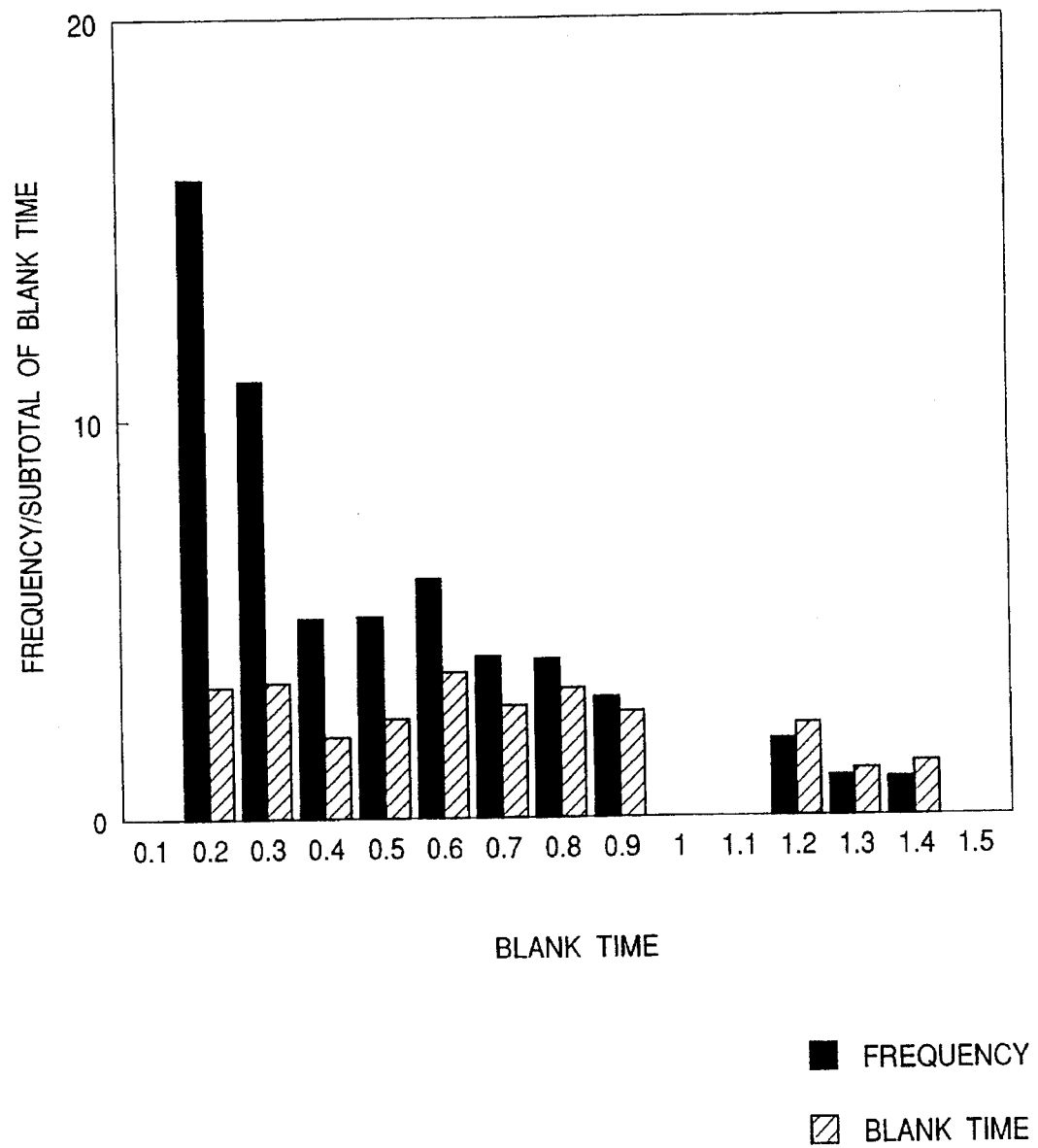
FIG. 57 is a graph showing the distribution of the blank time in the automatic communication.

A description will be given of the economical benefit derived from the local automatic communication. The measurement result obtained when the analog extension system is utilized to perform a personal computer communication in the automatic communication mode is shown below:

modem communication speed 2400 bps total communicating time 61.0 sec sum of blank time 28.4 sec amount of data received by the terminal 6675 bytes Therefore, the substantial communication speed is 6675/61.0=109.4 bytes/sec FIG. 56 shows the duration and frequency of the blank time (time period in which the data is absent). FIG. 57 shows a graph based on FIG. 53. It will be noted that the blank time having a duration of shorter than 1 second occurs a large number of times. The occurrence of the blank time lasting as short as 0.2–0.3 seconds is prevalent.

When the local automatic communication procedure is applied to this communication, the circuit occupying time needed to transmit the automatic communication result is shortened by a degree determined by the sum of blank time. As a result, the substantial communication speed is 6675/(61.0−28.4)=204.8 bytes/sec This calculation does not allow for the time required for the transmission of the automatic communication procedure and the overhead required for the circuit disconnection/reconnection.

Theoretically, there is a possibility that the communication speed of 240 bytes/sec (start bit of 1, stop bit of 1 and the start-stop synchronization are assumed). Therefore, the substantial communication speed double that of the normal automatic communication speed can be achieved, the circuit connecting time can be reduced to half, and the communication cost can be reduced to half.

It will be learned from the above mentioned measurement value (63.8 bytes/sec) obtained for the manual communication that the substantial communication speed three to four times higher than that of the manual communication can be achieved. Accordingly, the circuit connecting time and the resultant communication cost can be reduced to ¼–⅓.

The communiation procedure of the present invention, whereby the transmitted data is subjected to error correction coding and turned into a packet, ensures that the transmission quality is improved by the error correction.

The communication procedure of the present invention, whereby the retransmission control of the packet contatining an error is performed, ensures that the transmission quality is further improved. By preventing the transmission control from being performed when there is transmitted/received data, it is possible to improve the response when the response is required.

The communication procedure of the present invention, whereby the transmitted data is subjected to data compression/expansion so that the data is turned into a packet, ensures that the transmission efficiency (amount of data that can be transmitted per a unit time) is improved, thus contributing to the economical transmission of large amount of data, and to the improvement of the response.

By calculating the time required for the receiving end to expand the packet received as the compressed data, and by controlling the temporary disconnection and re-connection of the circuit in accordance with the calculated time, a further reduction in the circuit connecting time can be achieved, thereby contributing greatly to more economical use of the circuit and, thus, to the improvement of the channel usage efficiency.

By applying the present invention only to those network sections characterized by expensive circuit charge, increase in the processing load of the network accompanying the circuit disconnection and re-connection is prevented, while the circuit charge for the expensive network sections can be reduced, thereby improving the channel usage efficicney.

The present invention is not limited to the above described embodiments, and variations and modifications may be made without departing from the scope of the present invention.

What is claimed is:

1. A communication method of a circuit switching network, comprising the steps of temporarily disconnecting a circuit of the network, without ending a session, by a first communication control unit connecting a first terminal locally and a second communication control unit with a network, when no data is received from the network or when no data is to be transmitted to the network, and re-connecting by said first communication control unit the circuit that had been temporarily disconnected so that the session is resumed, when data to be transmitted is produced in the first terminal or when there is a request from a second terminal connected to said second communication control unit for a connection of the circuit.

2. The communication method of a circuit switching network as claimed in claim 1, wherein said first communication control unit disconnects the circuit of the network, when a specific data sequence is received from the network or is sent to the network.

3. The communication method of a circuit switching network as claimed in claim 1, wherein said first communication control unit learns that an absence of received data or transmitted data for a predetermined period of time follows a reception or transmission of a specific data sequence, and temporarily disconnects the circuit when the learned data sequence is received or transmitted.

4. The communication method of a circuit switching network as claimed in claim 1, wherein session identification information is assigned to each session at the start thereof in a plurality of said first terminals by said second communication control unit connected to said second terminal, and wherein said first communication control unit sends said session identification information to said second communication control unit for identification and restart of the session, when the circuit of the network that had been temporarily disconnected is re-connected.

5. The communication method of a circuit switching network as claimed in claim 1, wherein said first communication control unit prohibits a temporary disconnection of the circuit of said network when said first terminal is using an automatic communication mode.

6. The communication method of a circuit switching network as claimed in claim 1, wherein said first communication control unit disconnects or releases the circuit when a session end notification is transmitted or received, and notifies said first terminal and said second terminal of a disconnection of the circuit so that the session can be terminated.

7. The communication method of a circuit switching network as claimed in claim 1, wherein said first communication control unit disconnects or releases the circuit when a specified data sequence is received or transmitted, and notifies said first terminal and said second terminal of a disconnection of the circuit so that the session can be terminated.

8. The communication method of a circuit switching network as claimed in claim 1, wherein said first communication control unit notifies said first terminal and said second terminal of a disconnection of the circuit when the session is not resumed for a predetermined period of time, so that the session is terminated.

9. The communication method of a circuit switching network as claimed in claim 1, wherein during the step of re-connecting the circuit of said network that had been temporarily disconnected, said first communication control unit locally echoes a data sequence input from said first terminal while the circuit is still being temporarily disconnected, and transmits the same data sequence to said second communication control unit once the re-connection of the circuit is completed.

10. The communication method of a circuit switching network as claimed in claim 9, wherein said second communication control unit disregards said data sequence echoed back from said second terminal once a re-connection of said circuit is completed.

11. The communication method of a circuit switching network as claimed in claim 1, wherein when said first terminal is to perform an automatic communication, said first communication control unit connected to said first terminal receives an automatic communication procedure from said first terminal, sends the automatic communication procedure to said second communication control unit and temporarily disconnects the circuit of said network, and said second communication control unit executes a local automatic communication with said second terminal connected thereto, in accordance with the received automatic communication procedure, and re-connects the circuit that had been temporarily disconnected when said local automatic communication is completed, so as to return the result of said local automatic communication en bloc to said first communication control unit, whereupon said first communication control unit transfers the result of the local automatic communication to said first terminal connected to said first communication control unit.

12. The communication method of a circuit switching network as claimed in claim 11, wherein said first communication control unit enters the automatic communication mode so as to start the automatic communication, sends, while the data is being received from said second terminal in the automatic communication mode, the automatic communication procedure of said first terminal to said second communication control unit by using a full-duplex channel, and temporarily disconnects the circuit of said network after sending said automatic communication procedure.

13. The communication method of a circuit switching network as claimed in claim 11 or claim 12, wherein said second communication control unit has means for discriminating between a plurality of said first terminals with which to communicate so as to be able to execute and manage the local automatic communication with respect to each of the plurality of said first terminals.

14. The communication method of a circuit switching network as claimed in claim 1, wherein a data sequence from said first terminal is subjected to an error correction and detection coding so as to turn the data into a packet to be sent to the network, and the packet received from the network is subjected to error correction and detection decoding.

15. The communication method of a circuit switching network as claimed in claim 14, wherein, when it is found that it is impossible to correct an error after subjecting the packet received via the network to the error correction, a receiving end formed by one of said first terminal and said second terminal requests a re-transmission of the packet so that the packet can safely reach the receiving end, and wherein, when an amount of the data waiting to be transmitted or received exceeds a predetermined level, re-transmission control is prohibited.

16. The communication method of a circuit switching network as claimed in claim 14, wherein a sending end formed by one of said first terminal and said second terminal subjects a data sequence to data compression so as to turn the data into a packet before sending the data, while a receiving end formed by another of said first terminal and said second terminal expands the compressed data in a received packet so as to restore the original data, and wherein when a packet obtained as a result of data compression is to be sent, the sending end calculates the processing time required by a distant control unit to expand the data, the calculation being based on the data amount of the transmitted packet, and when the calculated processing time exceeds a predetermined time, the sending end temporarily disconnects the circuit.

17. The communication method of a circuit switching network as claimed in claim 16, wherein, upon receipt of a packet obtained by data compression, the receiving end calculates processing time required for data expansion and the like, on the basis of the data amount of the received packet, and when the calculated processing time exceeds a predetermined time, the receiving end temporarily disconnects the circuit.

18. The communication method of a circuit switching network as claimed in claim 1, said communication method being applied to a circuit switching network in which a plurality of terminals communicate with each other via a plurality of communication networks operated in different manners, wherein only some of the circuits in a route leading from one terminal to another which are in communication with each other are temporarily disconnected and re-connected, the session being maintained inactive in the absence of the data on the circuit and turned active in the presence thereof, and the remaining circuits in the same route are held in use.

19. A communication control unit comprising:

transmitted/received data state monitoring means for monitoring the presence/absence of data received from a network and data transmitted to the network;

circuit connecting and disconnecting means for connecting and disconnecting a circuit in the network; and a control part for temporarily disconnecting a circuit in the network by said circuit connecting and disconnecting means when there is no data to be transmitted or when no data is received, while maintaining a session and keeping the other circuits connected, the temporary disconnection being performed on the basis of a monitoring result of said transmitted/received data state monitoring means, and for re-connecting the circuit that had been disconnected, when the data to be transmitted is produced by a local terminal or when there is a request for a re-connection of the circuit from a distant terminal with which the local terminal communicates via the network.

20. The communication control unit as claimed in claim 19, wherein said control part effects control such that it temporarily disconnects a circuit of said network when a specific data sequence is received from the network or sent to the network.

21. The communication control unit as claimed in claim 19, wherein said control part learns that an absence of received data or transmitted data for a predetermined period of time follows a transmission or reception of a specific data sequence, and temporarily disconnects a circuit when the learned data sequence is received or transmitted.

22. The communication control unit as claimed in claim 19, and further comprising a connecting means for connecting a circuit in the network to the local terminal, wherein communications from a plurality of distant terminals are received at the same time via the network so that the connections between said plurality of distant terminals and a plurality of local terminals connected to the communication control unit are established, and said control part assigns a session identification number to a session when the session is started and sends the session identification number to a distant terminal with which said control part is communicating, discriminates between sessions each corresponding to a specific distant terminal, the discrimination being done on the basis of said session identification number which the distant terminal attaches to the transmitted data, so that said connecting means effects control such that said distant terminal is connected to a corresponding local terminal with which said distant terminal was connected before the temporary disconnection of the circuit.

23. The communication control unit as claimed in claim 19, wherein said control part effects control such that the temporary disconnection of the circuit of the network is prohibited when the local terminal is using an automatic communication mode.

24. The communication control unit as claimed in claim 19, wherein said control part effects control such that the control part disconnects or releases the circuit when the control part transmits or receives a session end notification, notifies the local terminal of the disconnection of the circuit, and ends the session.

25. The communication control unit as claimed in claim 19, wherein said control part effects control such that the control part disconnects or releases the circuit when said control part receives or transmits a specific data sequence, notifies the local terminal of the disconnection of the circuit, and ends the session.

26. The communication control unit as claimed in claim 19, wherein said control part effects control such that the control part notifies the local terminal of the disconnection of the circuit and ends the session when the session is not resumed for a predetermined period of time.

27. The communication control unit as claimed in claim 19, wherein, during re-connecting of the circuit of said network that had been temporarily disconnected, said control part effects control such that the control part locally echoes a data sequence input from the local terminal while the circuit is still being temporarily disconnected, and transmits the same data sequence to the distant terminal once the re-connection of the circuit is completed.

28. The communication control unit as claimed in claim 27, wherein said control part disregards said data sequence echoed back from the local terminal once a re-connection is completed.

29. The communication control unit as claimed in claim 19, and further comprising:

an automatic communication procedure storing part controlled by said control part and operated for storing an automatic communication procedure of the local terminal; and an automatic communication execution result storing part controlled by said control part and operated for storing the result of the automatic communication, wherein when the communication control unit is connected to a network user end, said control part of the communication control unit connected to the network user end receives, before the local terminal begins the automatic communication, the automatic communication procedure from the local terminal, stores the automatic communication procedure in said automatic communication procedure storing part, reads said automatic communication procedure from said automatic communication procedure storing part while the circuit is being connected, sends the automatic communication procedure to a distant communication control unit, temporarily disconnects the circuit of the network by said circuit connecting and disconnecting means, and, upon reception of the result of the automatic communication from the distant communication control unit, transfers the result of the automatic communication to the local terminal, and when said control part of the communication control unit is connected to a host end serving the network user end, said control part receives the automatic communication procedure from the distant communication control unit via the circuit switching network, stores the automatic communication procedure in the automatic communication procedure storing part, temporarily disconnects the circuit of the network by said circuit connecting and disconnecting means after said automatic communication procedure is received, executes, after the temporary disconnection, a local automatic communication with the local terminal in accordance with the automatic communication procedure stored in said automatic communication procedure storing part, stores the result of the local automatic communication in said automatic communication result storing part, and reconnects, by said circuit connecting and disconnecting means, the circuit that had been temporarily disconnected so that the result of the local automatic communication stored in said automatic communication result storing part is sent en bloc to the distant communication control unit.

30. The communication control unit as claimed in claim 29, wherein said control part allows the local terminal to enter the automatic communication mode and to execute the automatic communication, sends the automatic communication procedure of the local terminal to the distant terminal via a full-duplex circuit while the data is being received from the distant terminal in the automatic communication mode, and temporarily disconnects the circuit of the network after said automatic communication procedure is sent.

31. The communication control unit as claimed in claim 29, and further comprising:

discriminating means, controlled by said control part and operated for discriminating between a plurality of distant terminals served by the local terminal; wherein said control part determines, by said discriminating means, the identity of the distant terminal when accessed by said plurality of distant terminals simultaneously or sequentially, and stores the automatic communication procedure in said automatic communication procedure storing part for each of said plurality of distant terminals and stores the automatic communication result in said automatic communication result storing part for each of said plurality of distant terminals, said control part thus executing and managing the local automatic communication for each of said plurality of terminals.

32. The communication control unit as claimed in claim 19, and further comprising:

error correction and detection means; and packet assembly and disassembly means;

wherein a data sequence from said local terminal is subjected to an error correction and detection coding by said error correction and detection means, the data is turned into a packet by said packet assembly and disassembly means so as to be transmitted to the network, and the data obtained as a result of subjecting the packet received from the network to packet disassembly by said packet assembly and disassembly means is then subjected to error correction and detection coding by said error correction and detection means.

33. The communication control unit as claimed in claim 32, further comprising error detection means for detecting a packet in which error correction is impossible; wherein when a reception of a packet in which it is impossible to correct an error is detected by said error detection means, a receiving end formed by one of said terminals issues a request for a re-transmission of the packet to a transmitting end formed by another of said terminals, and wherein said monitoring means detects the presence/absence of the data waiting to be transmitted or received whose amount exceeds a predetermined level, and comprises AND condition means which determines a state in which there is an uncorrectable packet and there is data waiting to be transmitted or received, and when it is determined that the amount of data waiting to be transmitted or received exceeds the predetermined level on the basis of the determination result of said AND condition means, a re-transmission control is not performed.

34. The communication control unit as claimed in claim 32, and further comprising data compression and expansion means for subjecting a transmitted data sequence to data expansion; wherein a sending end formed by one of said terminals uses said data compression and expansion means to compress the data into a packet before sending the same, and a receiving end formed by another of said terminals expands the compressed data in the received packet so as to restore the original data; wherein said control part calculates the processing time required by the communication control unit connected to the distant terminal to expand the data before sending the packet obtained as a result of data compression, the calculation being based on the data amount of the transmitted packet, and when the calculated processing time exceeds a predetermined time, said control part temporarily disconnects the circuit.

35. The communication control unit as claimed in claim 32, and further comprising data compression and expansion means for subjecting a transmitted data sequence to data compression and for subjecting the received data to data expansion; wherein a sending end formed by one of said terminals uses said data compression and expansion means to compress the data into a packet before sending the same, and a receiving end formed by another of said terminals expands the compressed data in the received packet so as to restore the original data, and wherein, upon receipt of a packet obtained by data compression, said control part calculates processing time required for data expansion, on the basis of the data amount of the received packet, and when the calculated processing time exceeds a predetermined time, said control part temporarily disconnects the circuit.

* * * * *